US012792285B2

(12) United States Patent
Chalmers et al.

(10) Patent No.: US 12,792,285 B2
(45) Date of Patent: Nov. 10, 2026

(54) SYSTEMS AND METHODS FOR CAPTURING AND VIEWING SPATIAL IMAGES

(71) Applicant: Apple Inc., Cupertino, CA (US)

(72) Inventors: Devin W. Chalmers, Oakland, CA (US); Joshua J. Frost, Aptos, CA (US); Elena J. Nattinger, Menlo Park, CA (US); Anna L. Brewer, San Francisco, CA (US); Michael R. Alger, Mountain View, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 19/329,277

(22) Filed: Sep. 15, 2025

(65) Prior Publication Data

US 2026/0093432 A1 Apr. 2, 2026

Related U.S. Application Data

(60) Provisional application No. 63/879,567, filed on Sep. 10, 2025, provisional application No. 63/700,655, filed on Sep. 28, 2024.

(51) Int. Cl.
*G06F 3/14* (2006.01)
*G06F 3/02* (2006.01)
(Continued)

(52) U.S. Cl.
CPC .......... *G06F 3/1423* (2013.01); *G06F 3/0227* (2013.01); *G06F 3/04815* (2013.01); *G06F 3/1462* (2013.01); *H04N 13/344* (2018.05); *H04N 13/383* (2018.05); *H04N 13/398* (2018.05)

(58) Field of Classification Search
CPC .. G06F 3/1423; G06F 3/0227; G06F 3/04815; G06F 3/1462; H04N 13/344; H04N 13/383; H04N 13/398
See application file for complete search history.

(56) References Cited

U.S. PATENT DOCUMENTS

| | | | | |
|---|---|---|---|---|
| 10,078,377 | B2 | 9/2018 | Balan et al. | |
| 10,297,060 | B2 * | 5/2019 | Park ........................ | G06T 11/60 |

(Continued)

OTHER PUBLICATIONS

Non-Final Office Action received for U.S. Appl. No. 18/675,923, mailed on Jun. 24, 2025, 18 pages.

(Continued)

*Primary Examiner* — Dmitriy Bolotin
(74) *Attorney, Agent, or Firm* — Kubota & Basol LLP

(57) ABSTRACT

In some examples, a first electronic device is in communication with multiple displays while also interfacing with two external cameras, each capturing distinct viewpoints. In some examples, the first external camera captures first image data concurrently with the second external camera capturing second image data, with both contributing to generating spatial image data. In some examples, the first electronic device obtains the spatial image data from both external cameras or generates the spatial image data based on the first image data and the second image data. In some examples, when one or more first criteria are met, the first electronic device renders the spatial image data on one or more displays.

24 Claims, 34 Drawing Sheets

(51) Int. Cl.

| | |
|---|---|
| ***G06F 3/04815*** | (2022.01) |
| ***H04N 13/344*** | (2018.01) |
| ***H04N 13/383*** | (2018.01) |
| ***H04N 13/398*** | (2018.01) |

(56) References Cited

U.S. PATENT DOCUMENTS

| | | | | |
|---|---|---|---|---|
| 10,817,983 | B1 | 10/2020 | Da Silva Quelhas et al. | |
| 10,884,525 | B1 | 1/2021 | Vonsik et al. | |
| 10,984,242 | B1 | 4/2021 | Atlas et al. | |
| 11,023,035 | B1 | 6/2021 | Atlas et al. | |
| 12,153,727 | B1 | 11/2024 | Vertegaal et al. | |
| 12,210,676 | B1 | 1/2025 | Nizampatnam et al. | |
| 2007/0002037 | A1 | 1/2007 | Kuroki et al. | |
| 2008/0030461 | A1 | 2/2008 | Matsui et al. | |
| 2008/0106488 | A1 | 5/2008 | Okuno | |
| 2013/0050258 | A1* | 2/2013 | Liu | G06F 3/013 345/633 |
| 2016/0165211 | A1* | 6/2016 | Balasubramanian | B60R 1/24 348/38 |
| 2016/0171771 | A1 | 6/2016 | Pedrotti et al. | |
| 2016/0292922 | A1 | 10/2016 | Kasahara | |
| 2017/0307889 | A1 | 10/2017 | Newman | |
| 2018/0116601 | A1 | 5/2018 | Yi et al. | |
| 2019/0065026 | A1 | 2/2019 | Kiemele et al. | |
| 2019/0065027 | A1 | 2/2019 | Hauenstein et al. | |
| 2019/0102859 | A1 | 4/2019 | Hux et al. | |
| 2019/0325600 | A1 | 10/2019 | Balan et al. | |
| 2020/0174552 | A1 | 6/2020 | Stafford et al. | |
| 2020/0275086 | A1 | 8/2020 | Ishikawa | |
| 2020/0301500 | A1 | 9/2020 | Wilde et al. | |
| 2021/0011556 | A1* | 1/2021 | Atlas | G06T 19/006 |
| 2021/0240343 | A1 | 8/2021 | Kobayashi et al. | |
| 2021/0271081 | A1 | 9/2021 | Yun et al. | |
| 2021/0286502 | A1* | 9/2021 | Lemay | G06F 3/011 |
| 2021/0311320 | A1 | 10/2021 | Pike et al. | |
| 2021/0347053 | A1 | 11/2021 | Lee et al. | |
| 2021/0356743 | A1 | 11/2021 | Muldoon et al. | |
| 2021/0373672 | A1 | 12/2021 | Schwarz et al. | |
| 2022/0036622 | A1 | 2/2022 | Kondoh et al. | |
| 2022/0214743 | A1* | 7/2022 | Dascola | G06F 3/011 |
| 2022/0326967 | A1 | 10/2022 | Khan et al. | |
| 2022/0362667 | A1 | 11/2022 | Kuwahara et al. | |
| 2023/0007560 | A1 | 1/2023 | Aoki | |
| 2023/0150499 | A1* | 5/2023 | Choi | B60W 30/143 701/93 |
| 2023/0368458 | A1* | 11/2023 | Dryer | G06F 3/04815 |
| 2024/0087255 | A1 | 3/2024 | Ogata | |
| 2024/0104840 | A1 | 3/2024 | Couche et al. | |
| 2024/0320930 | A1* | 9/2024 | Ravasz | G06T 19/006 |
| 2024/0385699 | A1 | 11/2024 | Cazier | |
| 2024/0412475 | A1 | 12/2024 | Kamijo | |
| 2024/0422302 | A1 | 12/2024 | Coley et al. | |
| 2025/0104335 | A1* | 3/2025 | Huang | G06T 19/003 |
| 2025/0104367 | A1* | 3/2025 | Huang | G06T 19/006 |
| 2025/0316033 | A1* | 10/2025 | Khan | G06T 19/006 |
| 2025/0377909 | A1* | 12/2025 | Perry | G06F 9/451 |
| 2026/0093432 | A1* | 4/2026 | Chalmers | G06F 3/0227 |
| 2026/0095560 | A1* | 4/2026 | Chalmers | H04N 13/156 |

OTHER PUBLICATIONS

Final Office Action received for U.S. Appl. No. 18/675,923, mailed on Oct. 22, 2025, 22 pages.

Add a Touch of AR Magic to Your Videos, App Store Story [online]. Apple Inc., 2020 [retrieved on May 16, 2024], Retrieved from the Internet: <https://apps.apple.com/us/story/id1437949392>, 3 pages.

How can I connect my phone's camera to a VR headset so I can view my camera in the 1st person and take pictures as I walk along?, Retrieved online from: <https://www.quora.com/How-can-I-connect-my-phones-camera-to-a-VR-headset-so-I-can-view-my-camera-in-the-1st-person-and-take-pictures-as-I-walk-along>, [retrieved on Dec. 15, 2025], 5 pages.

Is There Any Way of Recording an AR Session in Unity Instead of Using a Screen Recorder, Stack Overflow [online], Stack Exchange Inc., Aug. 4, 2022 [retrieved on May 16, 2024], Retrieved from the Internet: <https://stackoverflow.com/questions/73231072/is-there-any-way-of-recording-an-ar-session-in-unity-instead-of-using-a-screen-r>, 1 page.

ThinkReality A3 Smart Glasses, Lenovo US, retrieved online from: <https://www.lenovo.com/us/en/thinkrealitya3/?utm_Medium=website&cid=us:sem%7Cse%7Cgoogle%7Cnonbrand_dsa_catchall%7Cnonbrand_dsa_catchall%7C%7C%7C12992692526%7C124891993914%7Cdsa-1303230222144%7Csearch%7C%7Cconsumer&gad_source=1>, [retrieved on: Dec. 15, 2025], 7 pages.

Will You Be Open to Using an Augmented Reality Headset as a Viewfinder When It Becomes an Option?, Retrieved online from: <https://www.reddit.com/r/photography/comments/14xjmvu/will_you_be_open_to_using_an_augmented_reality/>, [retrieved on: Dec. 15, 2025], 7 pages.

Andersen, et al., "AR HMD Guidance for Controlled Hand-Held 3D Acquisition", IEEE Transactions on Visualization and Computer Graphics, Aug. 2019, 12 pages.

Skovsen, et al., "Decoupled Localization and Sensing with HMD-based AR for Interactive Scene Acquisition", 4 pages.

Thinkreality, "AR in Financial Services: Making Mobile Productivity a Practical Reality", 2021, 2 pages.

* cited by examiner

Top-Down

SYSTEMS AND METHODS FOR CAPTURING AND VIEWING SPATIAL IMAGES

CROSS REFERENCE TO RELATED APPLICATIONS

This application claims the benefit of U.S. Provisional Application No. 63/879,567, filed Sep. 10, 2025 and U.S. Provisional Application No. 63/700,655, filed Sep. 28, 2024, the contents of which are herein incorporated by reference in their entireties for all purposes.

FIELD OF THE DISCLOSURE

This relates generally to systems and methods of providing extended reality experiences, and more specifically for presenting spatial images in extended reality based on images captured by one or more external cameras.

BACKGROUND OF THE DISCLOSURE

Some computer graphical environments provide two-dimensional and/or three-dimensional environments where at least some objects displayed for a user's viewing are virtual and generated by a computer. For example, the objects include images captured using a camera.

SUMMARY OF THE DISCLOSURE

Providing convenient ways of displaying images captured by a plurality of external cameras enhances user interactions with the electronic device by providing a real-time display of the images captured at a secondary display, such as a head mounted display, and reduces the need to view the captured images at a later time.

In some examples, a first electronic device with a plurality of displays is in communication with a plurality of external cameras each with a distinct viewpoint. In some examples, the plurality of cameras captures spatial image data of a three-dimensional environment and transmits the spatial image data to be displayed as a spatial image at the first electronic device in accordance with a determination that one or more criteria are satisfied.

In some examples, the plurality of external cameras is integrated into a second electronic device, such as a mobile phone, which is in communication with the first electronic device.

In some examples, the plurality of external cameras is integrated into a standalone camera which is in communication with the first electronic device.

In some examples, the second electronic device generates the spatial image based on the captured spatial image data from the plurality of external cameras and transmits the spatial image to the first electronic device.

In some examples, the first electronic device receives the spatial image data from the second electronic device and generates the spatial image based on the received spatial image data.

In some examples, the second electronic device includes a display, such as a touch panel display, configured to display a two-dimensional rendering of the captured spatial image data. In some examples, the two-dimensional rendering of the captured spatial image data corresponds to a rendering of the three-dimensional environment that lack depth information associated with the spatial image data.

In some examples, the first electronic device displays the received spatial image data as a spatial image or the two-dimensional rendering of the captured spatial image data discussed above.

In some examples, the first electronic device does not display the spatial image until receiving a command from the second electronic device to display the spatial image.

In some examples, the plurality of external cameras captures spatial video or a spatial image of the three-dimensional environment.

In some examples, the spatial image data captured by the plurality of external cameras comprise a plurality of images of the three-dimensional environment from varying viewpoints. In some examples, the first electronic device combines the plurality of images from the varying viewpoints to generate a singular spatial image that includes the varying viewpoints (e.g., depth information discussed above).

In some examples, the varying viewpoints of the plurality of images discussed above are too dissimilar. If this occurs, the first electronic device is unable to generate the spatial image and instead displays the two-dimensional rendering of the captured spatial image data discussed above. In some examples, the varying viewpoints of the plurality of images are the result of different focal lengths of the associated external camera of the plurality of external cameras. In some examples, the first electronic device determines a focal length disparity between the focal lengths of each of the plurality of external cameras, and if the focal length disparity is too great, the electronic device determines the spatial image cannot be generated using the spatial image data captured by the external cameras.

In some examples, the plurality of external cameras can only capture the spatial image data when the second electronic device is orientated parallel with the three-dimensional environment (e.g., "landscape mode"). In some examples, if the second electronic device detects that it is in an orientation that is not "landscape mode," the second electronic device will transmit a notification to the first electronic device, such as a visual pop-up, notifying the user of the first electronic device of the second electronic device's orientation. In some examples, if the second electronic device is rotated while staying parallel with the three-dimensional environment, the plurality of external cameras captures spatial image data reflective of the new orientation of the second electronic device. In some examples, the first electronic device receives the captured spatial image data reflective of the new orientation of the second electronic device and updates the displayed spatial image in response.

In some examples, the display of the second electronic device includes a control panel, such as a playback menu, configured to alter various aspects of the captured spatial image data. In some examples, the user of the second electronic device touches the display and "scrubs" through a playback of the captured spatial image data (e.g., moves the spatial video from a first time point to a second time point). In some examples, the control panel is an editing interface, configured to modify the spatial video data, such as altering the saturation of a spatial image.

In some examples, the first electronic device displays the spatial image data as a spatial image overlaying a portion of a display of the three-dimensional environment at the displays of the first electronic device, such as a rectangular box in the upper portion of the display of the first electronic device. In some examples, the user of the first electronic device may desire to view the spatial image at a larger scale and direct an input to the first electronic device, such as a scroll wheel, and "zoom" in on the spatial image, increasing the size of the spatial image in the display (e.g., spatial image completely overlays the three-dimensional environment at the display of the first electronic device). In some examples, the user may desire to move the location of the spatial image in the display and direct an input at the touch panel display of the second electronic device, such as a swiping motion to the left across the display. In response, the first electronic device moves the spatial image left across the display at the first electronic device, mirroring the gesture (e.g., input) made at the touch panel display of the second electronic device.

In some examples, the touch panel display of the second electronic device responds to the plurality of external cameras capturing the spatial image data by applying a filter to the touch panel display, such as a tint (e.g., darkening the screen). In some examples, the filter serves as a visual indication to the user that the plurality of external cameras is capturing the spatial image data.

The full descriptions of these examples are provided in the Drawings and the Detailed Description, and it is understood that this Summary does not limit the scope of the disclosure in any way.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

BRIEF DESCRIPTION OF THE DRAWINGS

For improved understanding of the various examples described herein, reference should be made to the Detailed Description below along with the following drawings. Like reference numerals often refer to corresponding parts throughout the drawings.

DETAILED DESCRIPTION

Figure 1:
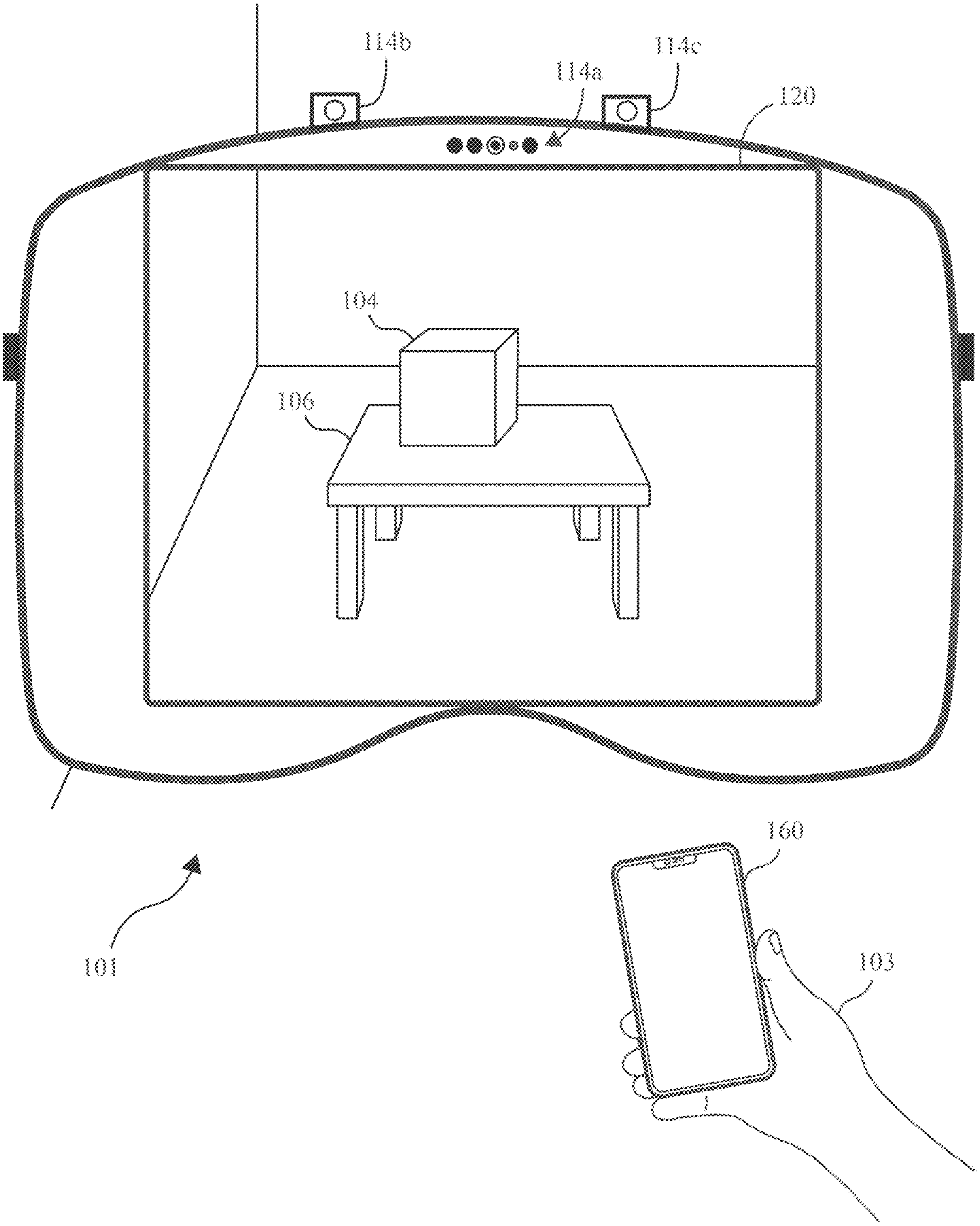
FIG. 1 illustrates an electronic device presenting an extended reality environment according to some examples of the disclosure.

In the following description of examples, reference is made to the accompanying drawings which form a part hereof, and in which it is shown by way of illustration specific examples that are optionally practiced. It is to be understood that other examples are optionally used, and structural changes are optionally made without departing from the scope of the disclosed examples.

In some examples, a first electronic device with a plurality of displays is in communication with a plurality of external cameras each with a distinct viewpoint. In some examples, the plurality of cameras captures spatial image data of a three-dimensional environment and transmits the spatial image data to be displayed as a spatial image at the first electronic device in accordance with a determination that one or more criteria are satisfied.

In some examples, the plurality of external cameras is integrated into a second electronic device, such as a mobile phone, which is in communication with the first electronic device.

In some examples, the second electronic device generates the spatial image based on the captured spatial image data from the plurality of external cameras and transmits the spatial image to the first electronic device.

In some examples, the first electronic device receives the spatial image data from the second electronic device and generates the spatial image based on the received spatial image data.

In some examples, the second electronic device includes a display, such as a touch panel display, configured to display a two-dimensional rendering of the captured spatial image data. In some examples, the two-dimensional rendering of the captured spatial image data corresponds to a rendering of the three-dimensional environment that lack depth information associated with the spatial image data.

In some examples, the first electronic device displays the received spatial image data as a spatial image or the two-dimensional rendering of the captured spatial image data discussed above.

In some examples, the first electronic device does not display the spatial image until receiving a command from the second electronic device to display the spatial image.

In some examples, the plurality of external cameras captures spatial video or a spatial image of the three-dimensional environment.

In some examples, the spatial image data captured by the plurality of external cameras comprise a plurality of images of the three-dimensional environment from varying viewpoints. In some examples, the first electronic device combines the plurality of images from the varying viewpoints to generate a singular spatial image that includes the varying viewpoints (e.g., depth information discussed above).

In some examples, the varying viewpoints of the plurality of images discussed above are too dissimilar. If this occurs, the first electronic device is unable to generate the spatial image and instead displays the two-dimensional rendering of the captured spatial image data discussed above. In some examples, the varying viewpoints of the plurality of images are the result of different focal lengths of the associated external camera of the plurality of external cameras. In some examples, the first electronic device determines a focal length disparity between the focal lengths of each of the plurality of external cameras, and if the focal length disparity is too great, the electronic device determines the spatial image cannot be generated using the spatial image data captured by the external cameras.

In some examples, the plurality of external cameras can only capture the spatial image data when the second electronic device is orientated parallel with the three-dimensional environment (e.g., "landscape mode"). In some examples, if the second electronic device detects that it is in an orientation that is not "landscape mode," the second electronic device will transmit a notification to the first electronic device, such as a visual pop-up, notifying the user of the first electronic device of the second electronic device's orientation. In some examples, if the second electronic device is rotated while staying parallel with the three-dimensional environment, the plurality of external cameras captures spatial image data reflective of the new orientation of the second electronic device. In some examples, the first electronic device receives the captured spatial image data reflective of the new orientation of the second electronic device and updates the displayed spatial image in response.

In some examples, the display of the second electronic device includes a control panel, such as a playback menu, configured to alter various aspects of the captured spatial image data. In some examples, the user of the second electronic device touches the display and "scrubs" through a playback of the captured spatial image data (e.g., moves the spatial video from a first time point to a second time point). In some examples, the control panel is an editing interface, configured to modify the spatial video data, such as altering the saturation of a spatial image.

In some examples, the first electronic device displays the spatial image data as a spatial image overlaying a portion of a display of the three-dimensional environment at the displays of the first electronic device, such as a rectangular box in the upper portion of the display of the first electronic device. In some examples, the user of the first electronic device may desire to view the spatial image at a larger scale and direct an input to the first electronic device, such as a scroll wheel, and "zoom" in on the spatial image, increasing the size of the spatial image in the display (e.g., spatial image completely overlays the three-dimensional environment at the display of the first electronic device). In some examples, the user may desire to move the location of the spatial image in the display and direct an input at the touch panel display of the second electronic device, such as a swiping motion to the left across the display. In response, the first electronic device moves the spatial image left across the display at the first electronic device, mirroring the gesture (e.g., input) made at the touch panel display of the second electronic device.

In some examples, the touch panel display of the second electronic device responds to the plurality of external cameras capturing the spatial image data by applying a filter to the touch panel display, such as a tint (e.g., darkening the screen). In some examples, the filter serves as a visual indication to the user that the plurality of external cameras is capturing the spatial image data.

Providing convenient ways of displaying images captured by a plurality of external cameras enhances user interactions with the electronic device by providing a real-time display of the images captured at a secondary display, such as a head mounted display, and reduces the need to view the captured images at a later time. In one or more examples, displaying content captured by a plurality of cameras on a display that can display spatial images (e.g., images with depth) can allow for previewing spatial content even when the device associated with the plurality of cameras (e.g., for instance a mobile phone) only includes a display that can only display 2D images. Additionally, by previewing images captured by a camera on a device that is separate from the device being used to capture the images provides flexibility in camera types used to capture spatial images. For instance, in one or more examples, the camera can be portable (e.g., moveable) and can capture scenes that may not normally be able to be viewed by one or more cameras that are part of the head mounted device.

Although the following description uses terms "first," "second," etc. to describe various elements, these elements should not be limited by the terms. These terms are only used to distinguish one element from another. For example, a first touch could be termed a second touch, and, similarly, a second touch could be termed a first touch, without departing from the scope of the various described examples. The first touch and the second touch are both touches, but they are not the same touch.

The terminology used in the description of the various described examples herein is for the purpose of describing particular examples only and is not intended to be limiting. As used in the description of the various described examples and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

The term "if" is, optionally, construed to mean "when" or "upon" or "in response to determining" or "in response to detecting," depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]," depending on the context.

FIG. 1 illustrates an electronic device 101 presenting an extended reality (XR) environment (e.g., a computer-generated environment optionally including representations of physical and/or virtual objects) according to some examples of the disclosure. In some examples, as shown in FIG. 1, electronic device 101 is a head-mounted display or other head-mountable device configured to be worn on a head of a user of the electronic device 101. Examples of electronic device 101 are described below with reference to the architecture block diagram of FIG. 2A. As shown in FIG. 1, electronic device 101 and table 106 are located in a physical environment. The physical environment may include physical features such as a physical surface (e.g., floor, walls) or a physical object (e.g., table, lamp, etc.). In some examples, electronic device 101 may be configured to detect and/or capture images of physical environment including table 106 (illustrated in the field of view of electronic device 101).

In some examples, as shown in FIG. 1, electronic device 101 includes one or more internal image sensors 114*a* oriented towards a face of the user (e.g., eye tracking cameras described below with reference to FIGS. 2A-2B). In some examples, internal image sensors 114*a* are used for eye tracking (e.g., detecting a gaze of the user). Internal image sensors 114*a* are optionally arranged on the left and right portions of display 120 to enable eye tracking of the user's left and right eyes. In some examples, electronic device 101 also includes external image sensors 114*b* and 114*c* facing outwards from the user to detect and/or capture the physical environment of the electronic device 101 and/or movements of the user's hands or other body parts.

In some examples, display 120 has a field of view visible to the user (e.g., that may or may not correspond to a field of view of external image sensors 114*b* and 114*c*). Because display 120 is optionally part of a head-mounted device, the field of view of display 120 is optionally the same as or similar to the field of view of the user's eyes. In other examples, the field of view of display 120 may be smaller than the field of view of the user's eyes. In some examples, electronic device 101 may be an optical see-through device in which display 120 is a transparent or translucent display through which portions of the physical environment may be directly viewed. In some examples, display 120 may be included within a transparent lens and may overlap all or only a portion of the transparent lens. In other examples, electronic device may be a video-passthrough device in which display 120 is an opaque display configured to display images of the physical environment captured by external image sensors 114*b* and 114*c*. While a single display 120 is shown, it should be appreciated that display 120 may include a stereo pair of displays.

In some examples, in response to a trigger, the electronic device 101 may be configured to display a virtual object 104 in the XR environment represented by a cube illustrated in FIG. 1, which is not present in the physical environment, but is displayed in the XR environment positioned on the top of real-world table 106 (or a representation thereof). Optionally, virtual object 104 can be displayed on the surface of the table 106 in the XR environment displayed via the display 120 of the electronic device 101 in response to detecting the planar surface of table 106 in the physical environment 100.

It should be understood that virtual object 104 is a representative virtual object and one or more different virtual objects (e.g., of various dimensionality such as two-dimensional or other three-dimensional virtual objects) can be included and rendered in a three-dimensional XR environment. For example, the virtual object can represent an application or a user interface displayed in the XR environment. In some examples, the virtual object can represent content corresponding to the application and/or displayed via the user interface in the XR environment. In some examples, the virtual object 104 is optionally configured to be interactive and responsive to user input (e.g., air gestures, such as air pinch gestures, air tap gestures, and/or air touch gestures), such that a user may virtually touch, tap, move, rotate, or otherwise interact with, the virtual object 104.

In some examples, the electronic device 101 may be configured to communicate with a second electronic device that can be communicatively coupled (e.g., via a wire or wirelessly) to the electronic device 101. For example, as illustrated in FIG. 1, the electronic device 101 may be in communication with second electronic device 160. In some examples, the second electronic device 160 corresponds to a mobile electronic device, such as a smartphone, a tablet computer, a smart watch, or other electronic device. Additional examples of second electronic device 160 are described below with reference to the architecture block diagram of FIG. 2B. In some examples, the electronic device 101 and the second electronic device 160 are associated with a same user. For example, in FIG. 1, the electronic device 101 may be positioned (e.g., mounted) on a head of a user and the second electronic device 160 may be positioned near electronic device 101, such as in a hand 103 of the user (e.g., the hand 103 is holding of the second electronic device 160), and the electronic device 101 and the second electronic device 160 are associated with a same user account of the user (e.g., the user is logged into the user account on the electronic device 101 and the second electronic device 160). Additional details regarding the communication between the electronic device 101 and the second electronic device 160 are provided below with reference to FIGS. 2A-2B.

In some examples, displaying an object in a three-dimensional environment may include interaction with one or more user interface objects in the three-dimensional environment. For example, initiation of display of the object in the three-dimensional environment can include interaction with one or more virtual options/affordances displayed in the three-dimensional environment. In some examples, a user's gaze may be tracked by the electronic device as an input for identifying one or more virtual options/affordances targeted for selection when initiating display of an object in the three-dimensional environment. For example, gaze can be used to identify one or more virtual options/affordances targeted for selection using another selection input. In some examples, a virtual option/affordance may be selected using hand-tracking input detected via an input device in communication with the electronic device. In some examples, objects displayed in the three-dimensional environment may be moved and/or reoriented in the three-dimensional environment in accordance with movement input detected via the input device.

In the discussion that follows, an electronic device that is in communication with a display generation component and one or more input devices is described. It should be understood that the electronic device optionally is in communication with one or more other physical user-interface devices, such as a touch-sensitive surface, a physical keyboard, a mouse, a joystick, a hand tracking device, an eye tracking device, a stylus, etc. Further, as described above, it should be understood that the described electronic device, display and touch-sensitive surface are optionally distributed amongst two or more devices. Therefore, as used in this disclosure, information displayed on the electronic device or by the electronic device is optionally used to describe information outputted by the electronic device for display on a separate display device (touch-sensitive or not). Similarly, as used in this disclosure, input received on the electronic device (e.g., touch input received on a touch-sensitive surface of the electronic device, or touch input received on the surface of a stylus) is optionally used to describe input received on a separate input device, from which the electronic device receives input information.

The device typically supports a variety of applications, such as one or more of the following: a drawing application, a presentation application, a word processing application, a website creation application, a disk authoring application, a spreadsheet application, a gaming application, a telephone application, a video conferencing application, an e-mail application, an instant messaging application, a workout support application, a photo management application, a digital camera application, a digital video camera application, a web browsing application, a digital music player application, a television channel browsing application, and/or a digital video player application.

Figure 2A:
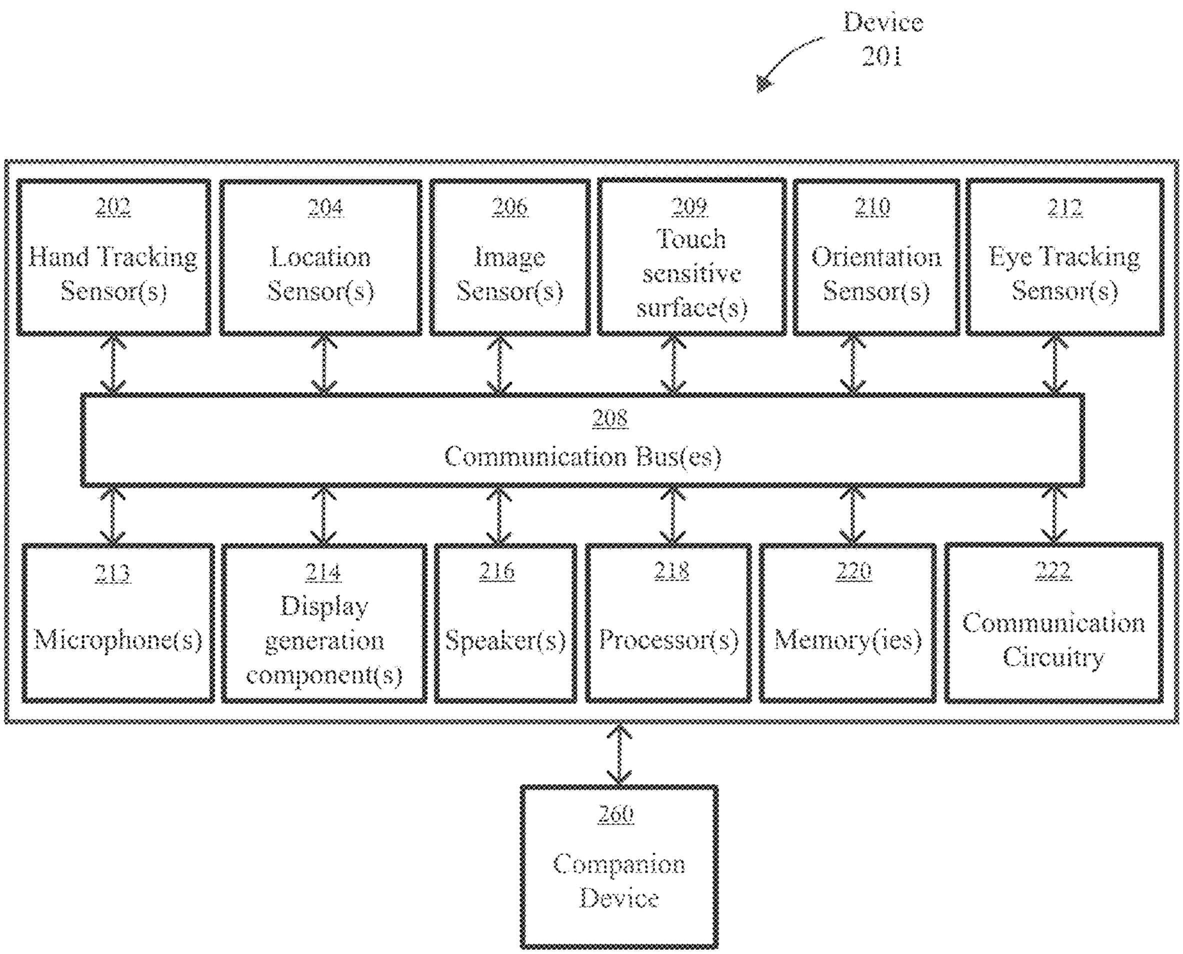
FIGS. 2A-2B illustrate various block diagrams of example architectures for a device according to some examples of the disclosure.
Figure 2B:
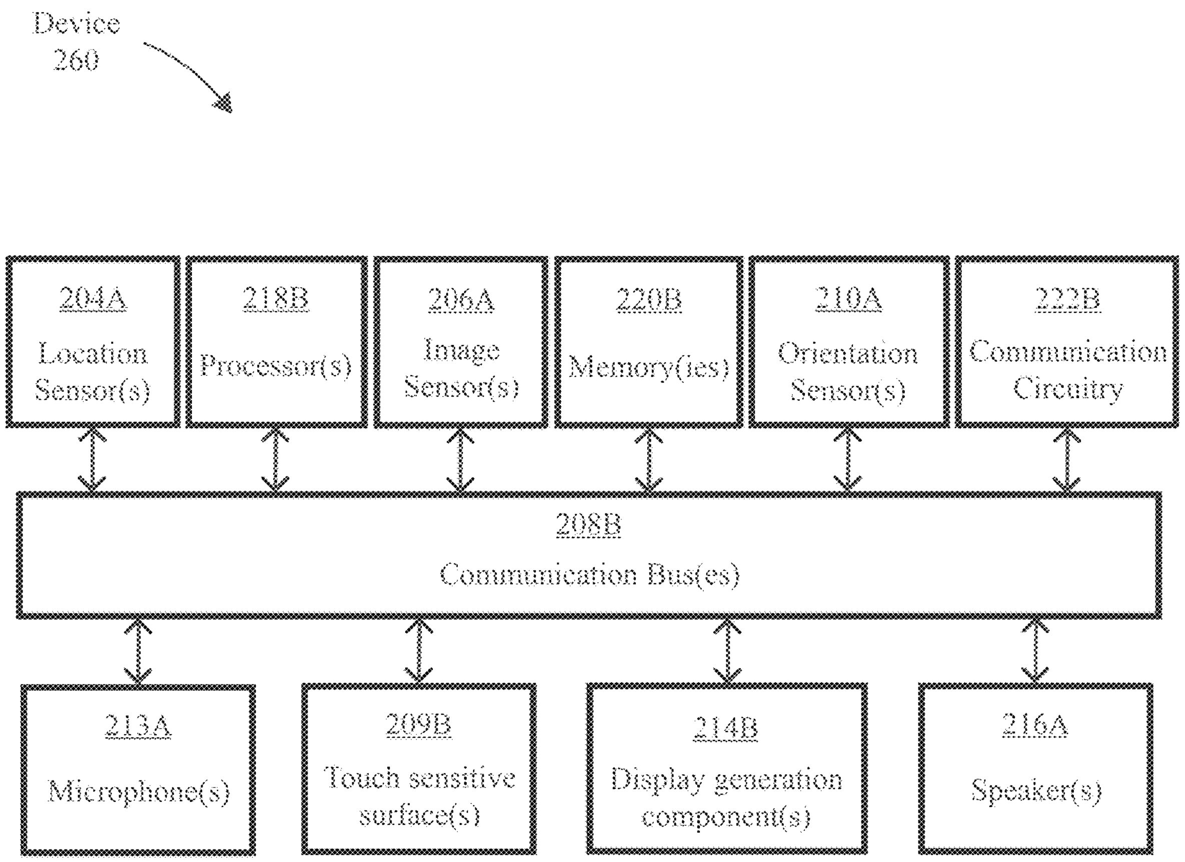

FIGS. 2A-2B illustrate block diagrams of example architectures for electronic devices 201 and 260 according to some examples of the disclosure. In some examples, electronic device 201 and/or electronic device 260 include one or more electronic devices. For example, the electronic device 201 may be a portable device, an auxiliary device in communication with another device, a head-mounted display, etc., respectively. In some examples, electronic device 201 corresponds to electronic device 101 described above with reference to FIG. 1. In some examples, electronic device 260 corresponds to second electronic device 160 described above with reference to FIG. 1.

As illustrated in FIG. 2A, the electronic device 201 optionally includes various sensors, such as one or more hand tracking sensors 202, one or more location sensors 204A, one or more image sensors 206A (optionally corresponding to internal image sensors 114*a* and/or external image sensors 114*b* and 114*c* in FIG. 1), one or more touch-sensitive surfaces 209A, one or more motion and/or orientation sensors 210A, one or more eye tracking sensors 212, one or more microphones 213A or other audio sensors, one or more body tracking sensors (e.g., torso and/or head tracking sensors), one or more display generation components 214A, optionally corresponding to display 120 in FIG. 1, one or more speakers 216A, one or more processors 218A, one or more memories 220A, and/or communication circuitry 222A. One or more communication buses 208A are optionally used for communication between the above-mentioned components of electronic devices 201. Additionally, as shown in FIG. 2B, the electronic device 260 optionally includes one or more location sensors 204B, one or more image sensors 206B, one or more touch-sensitive surfaces 209B, one or more orientation sensors 210B, one or more microphones 213B, one or more display generation components 214B, one or more speakers 216B, one or more processors 218B, one or more memories 220B, and/or communication circuitry 222B. One or more communication buses 208B are optionally used for communication between the above-mentioned components of electronic device 260. The electronic devices 201 and 260 are optionally configured to communicate via a wired or wireless connection (e.g., via communication circuitry 222A, 222B) between the two electronic devices. For example, as indicated in FIG. 2A, the electronic device 260 may function as a companion device to the electronic device 201.

Communication circuitry 222A, 222B optionally includes circuitry for communicating with electronic devices, networks, such as the Internet, intranets, a wired network and/or a wireless network, cellular networks, and wireless local area networks (LANs). Communication circuitry 222A, 222B optionally includes circuitry for communicating using near-field communication (NFC) and/or short-range communication, such as Bluetooth®.

Processor(s) 218A, 218B include one or more general processors, one or more graphics processors, and/or one or more digital signal processors. In some examples, memory 220A or 220B is a non-transitory computer-readable storage medium (e.g., flash memory, random access memory, or other volatile or non-volatile memory or storage) that stores computer-readable instructions configured to be executed by processor(s) 218A, 218B to perform the techniques, processes, and/or methods described below. In some examples, memory 220A and/or 220B can include more than one non-transitory computer-readable storage medium. A non-transitory computer-readable storage medium can be any medium (e.g., excluding a signal) that can tangibly contain or store computer-executable instructions for use by or in connection with the instruction execution system, apparatus, or device. In some examples, the storage medium is a transitory computer-readable storage medium. In some examples, the storage medium is a non-transitory computer-readable storage medium. The non-transitory computer-readable storage medium can include, but is not limited to, magnetic, optical, and/or semiconductor storages. Examples of such storage include magnetic disks, optical discs based on compact disc (CD), digital versatile disc (DVD), or Blu-ray technologies, as well as persistent solid-state memory such as flash, solid-state drives, and the like.

In some examples, display generation component(s) 214A, 214B include a single display (e.g., a liquid-crystal display (LCD), organic light-emitting diode (OLED), or other types of display). In some examples, display generation component(s) 214A, 214B includes multiple displays. In some examples, display generation component(s) 214A, 214B can include a display with touch capability (e.g., a touch screen), a projector, a holographic projector, a retinal projector, a transparent or translucent display, etc. In some examples, electronic devices 201 and 260 include touch-sensitive surface(s) 209A and 209B, respectively, for receiving user inputs, such as tap inputs and swipe inputs or other gestures. In some examples, display generation component(s) 214A, 214B and touch-sensitive surface(s) 209A, 209B form touch-sensitive display(s) (e.g., a touch screen integrated with each of electronic devices 201 and 260 or external to each of electronic devices 201 and 260 that is in communication with each of electronic devices 201 and 260).

In some examples, electronic devices 201 and 260 optionally include image sensor(s) 206A and 206B, respectively. Image sensors(s) 206A, 206B optionally include one or more visible light image sensors, such as charged coupled device (CCD) sensors, and/or complementary metal-oxide-semiconductor (CMOS) sensors operable to obtain images of physical objects from the real-world environment. Image sensor(s) 206A, 206B also optionally include one or more infrared (IR) sensors, such as a passive or an active IR sensor, for detecting infrared light from the real-world environment. For example, an active IR sensor includes an IR emitter for emitting infrared light into the real-world environment. Image sensor(s) 206A, 206B also optionally include one or more cameras configured to capture movement of physical objects in the real-world environment. Image sensor(s) 206A, 206B also optionally include one or more depth sensors configured to detect the distance of physical objects from electronic device 201, 260. In some examples, information from one or more depth sensors can allow the device to identify and differentiate objects in the real-world environment from other objects in the real-world environment. In some examples, one or more depth sensors can allow the device to determine the texture and/or topography of objects in the real-world environment.

In some examples, electronic device 201, 260 uses CCD sensors, event cameras, and depth sensors in combination to detect the physical environment around electronic device 201, 260. In some examples, image sensor(s) 206A, 206B include a first image sensor and a second image sensor. The first image sensor and the second image sensor work in tandem and are optionally configured to capture different information of physical objects in the real-world environment. In some examples, the first image sensor is a visible light image sensor, and the second image sensor is a depth sensor. In some examples, electronic device 201, 260 uses image sensor(s) 206A, 206B to detect the position and orientation of electronic device 201, 260 and/or display generation component(s) 214A, 214B in the real-world environment. For example, electronic device 201, 260 uses image sensor(s) 206A, 206B to track the position and orientation of display generation component(s) 214A, 214B relative to one or more fixed objects in the real-world environment.

In some examples, electronic devices 201 and 260 include microphone(s) 213A and 213B, respectively, or other audio sensors. Electronic device 201, 260 optionally uses microphone(s) 213A, 213B to detect sound from the user and/or the real-world environment of the user. In some examples, microphone(s) 213A, 213B includes an array of microphones (a plurality of microphones) that optionally operate in tandem, such as to identify ambient noise or to locate the source of sound in space of the real-world environment.

In some examples, electronic devices 201 and 260 include location sensor(s) 204A and 204B, respectively, for detecting a location of electronic device 201A and/or display generation component(s) 214A and a location of electronic device 260 and/or display generation component(s) 214B, respectively. For example, location sensor(s) 204A, 204B can include a global positioning system (GPS) receiver that receives data from one or more satellites and allows electronic device 201, 260 to determine the device's absolute position in the physical world.

In some examples, electronic devices 201 and 260 include orientation sensor(s) 210A and 210B, respectively, for detecting orientation and/or movement of electronic device 201 and/or display generation component(s) 214A and orientation and/or movement of electronic device 260 and/or display generation component(s) 214B, respectively. For example, electronic device 201, 260 uses orientation sensor(s) 210A, 210B to track changes in the position and/or orientation of electronic device 201, 260 and/or display generation component(s) 214A, 214B, such as with respect to physical objects in the real-world environment. Orientation sensor(s) 210A, 210B optionally include one or more gyroscopes and/or one or more accelerometers.

In some examples, electronic device 201 includes hand tracking sensor(s) 202 and/or eye tracking sensor(s) 212 (and/or other body tracking sensor(s), such as leg, torso and/or head tracking sensor(s)), in some examples. Hand tracking sensor(s) 202 are configured to track the position/location of one or more portions of the user's hands, and/or motions of one or more portions of the user's hands with respect to the extended reality environment, relative to the display generation component(s) 214A, and/or relative to another defined coordinate system. Eye tracking sensor(s) 212 are configured to track the position and movement of a user's gaze (eyes, face, or head, more generally) with respect to the real-world or extended reality environment and/or relative to the display generation component(s) 214A. In some examples, hand tracking sensor(s) 202 and/or eye tracking sensor(s) 212 are implemented together with the display generation component(s) 214A. In some examples, the hand tracking sensor(s) 202 and/or eye tracking sensor(s) 212 are implemented separate from the display generation component(s) 214A. In some examples, electronic device 201 alternatively does not include hand tracking sensor(s) 202 and/or eye tracking sensor(s) 212. In some such examples, the display generation component(s) 214A may be utilized by the electronic device 260 to provide an extended reality environment and utilize input and other data gathered via the other sensor(s) (e.g., the one or more location sensors 204A, one or more image sensors 206A, one or more touch-sensitive surfaces 209A, one or more motion and/or orientation sensors 210A, and/or one or more microphones 213A or other audio sensors) of the electronic device 201 as input and data that is processed by the processor(s) 218B of the electronic device 260. Additionally or alternatively, electronic device 201 optionally does not include other components shown in FIG. 2B, such as location sensors 204B, image sensors 206B, touch-sensitive surfaces 209B, etc. In some such examples, the display generation component(s) 214A may be utilized by the electronic device 260 to provide an extended reality environment and the electronic device 260 utilize input and other data gathered via the one or more motion and/or orientation sensors 210A (and/or one or more microphones 213A) of the electronic device 201 as input.

In some examples, the hand tracking sensor(s) 202 (and/or other body tracking sensor(s), such as leg, torso and/or head tracking sensor(s)) can use image sensor(s) 206 (e.g., one or more IR cameras, 3D cameras, depth cameras, etc.) that capture three-dimensional information from the real-world including one or more body parts (e.g., hands, legs, or torso of a human user). In some examples, the hands can be resolved with sufficient resolution to distinguish fingers and their respective positions. In some examples, one or more image sensors 206A are positioned relative to the user to define a field of view of the image sensor(s) 206A and an interaction space in which finger/hand position, orientation and/or movement captured by the image sensors are used as inputs (e.g., to distinguish from a user's resting hand or other hands of other persons in the real-world environment). Tracking the fingers/hands for input (e.g., gestures, touch, tap, etc.) can be advantageous in that it does not require the user to touch, hold or wear any sort of beacon, sensor, or other marker.

In some examples, eye tracking sensor(s) 212 includes at least one eye tracking camera (e.g., infrared (IR) cameras) and/or illumination sources (e.g., IR light sources, such as LEDs) that emit light towards a user's eyes. The eye tracking cameras may be pointed towards a user's eyes to receive reflected IR light from the light sources directly or indirectly from the eyes. In some examples, both eyes are tracked separately by respective eye tracking cameras and illumination sources, and a focus/gaze can be determined from tracking both eyes. In some examples, one eye (e.g., a dominant eye) is tracked by one or more respective eye tracking cameras/illumination sources.

Electronic devices 201 and 260 are not limited to the components and configuration of FIGS. 2A-2B, but can include fewer, other, or additional components in multiple configurations. In some examples, electronic device 201 and/or electronic device 260 can each be implemented between multiple electronic devices (e.g., as a system). In some such examples, each of (or more) electronic device may each include one or more of the same components discussed above, such as various sensors, one or more display generation components, one or more speakers, one or more processors, one or more memories, and/or communication circuitry. A person or persons using electronic device 201 and/or electronic device 260, is optionally referred to herein as a user or users of the device.

Attention is now directed towards interactions capturing spatial images that are displayed in a three-dimensional environment presented at an electronic device (e.g., corresponding to electronic device 201). In some examples, spatial images of the one or more physical objects are captured by a mobile electronic device (e.g., second electronic device 160), and transmitted to be presented at the electronic device 101. Due to the nature of displays typically included at mobile devices, while capable of capturing spatial images (e.g., typically with one or more cameras), mobile devices are often unable to present spatial images using their respective two-dimensional display (e.g., without a depth component). Including the depth component of spatial images is most often achieved through the use of two or more displays, such as the displays provided at the electronic device 101. In the following examples, various configurations of presenting spatial images in a portion of the field of view of a user of a head-mounted display (e.g., electronic device 101) are presented.

Figure 3A:
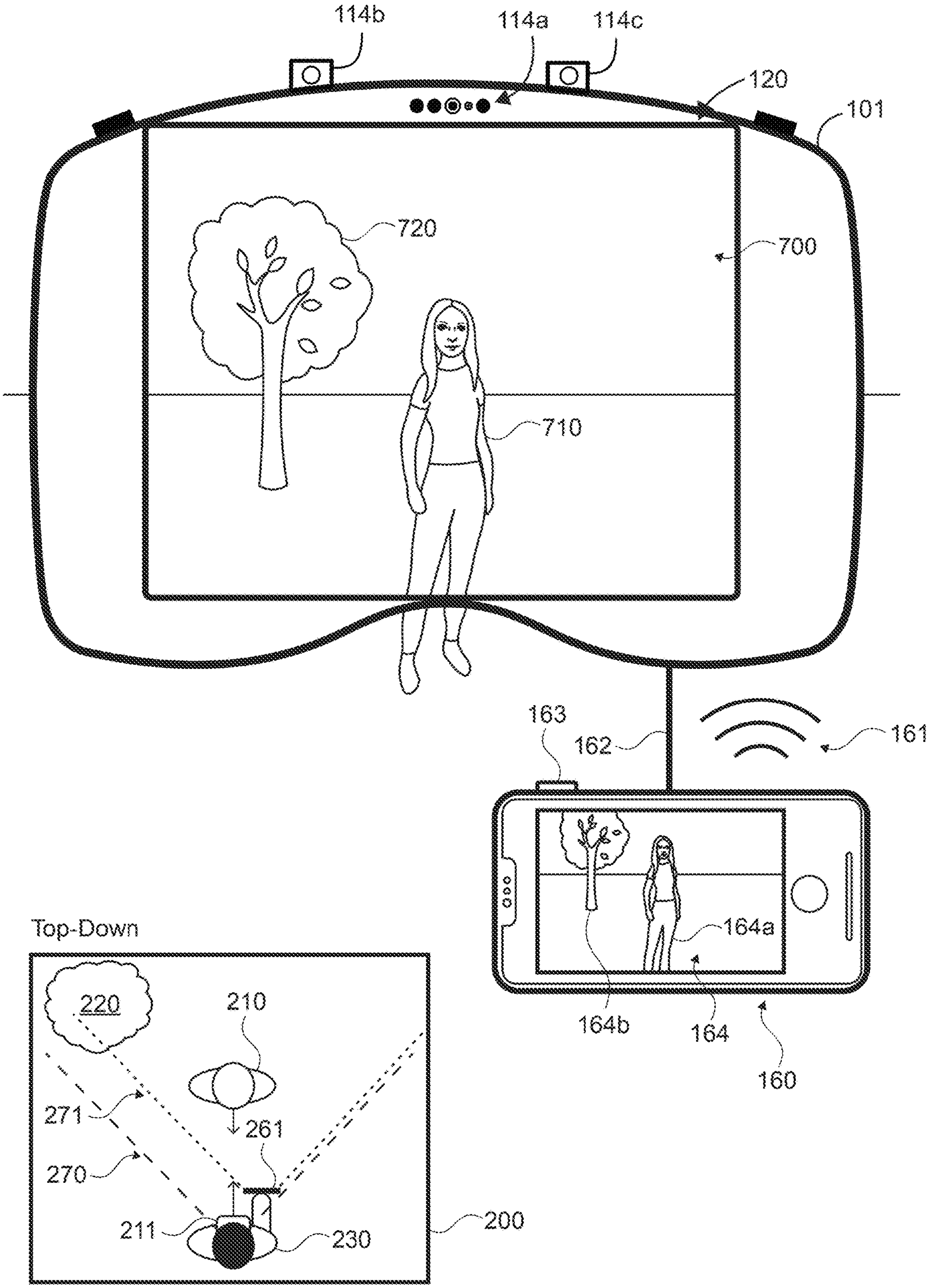
FIGS. 3A-3K illustrate various examples of capturing spatial images in a three-dimensional environment while concurrently displaying the captured spatial images at an electronic device according to some examples of the disclosure.

FIG. 3A illustrates an example of the electronic device 101 presenting a three-dimensional environment 700 from a first perspective including a plurality of objects corresponding to physical objects within a physical environment (e.g., the physical environment discussed above with reference to FIG. 1) while in communication with the second electronic device 160. In some examples, as shown in FIG. 3A, the electronic device 101 and the second electronic device 160 are in wireless communication 161 and/or wired communication 162. In some examples, the wireless communication 161 optionally corresponds to a Bluetooth connection, cellular broad band, Wi-Fi, or radio. In one or more examples, both electronic device 101 and the second electronic device 160 include one or more outward facing cameras that view a common three-dimensional scene. In one or more examples, electronic device 101 displays the scene taken by the outward facing cameras of the electronic device 101 on display 120. Similarly, the second electronic device 160 displays the scene captured from one or more outward facing cameras (described in further detail below) on display 164 of the second electronic device 160. In some examples, as shown in the top-down view 200, the outward facing cameras are disposed at the second electronic device 261 (e.g., second electronic device 160) include a field of view 271 projected outward in the same direction as the field of view 270 corresponding to a field of view of the electronic device 211 (e.g., electronic device 101). In some examples, the field of view 271 and the field of view 270 overlap according to the orientation of the second electronic device 261 but are not necessarily the same fields of view as discussed in further detail below. In some examples, as shown in FIG. 3A, the second electronic device 160 includes button 163 optionally configured to receive a user input. In some examples, the second electronic device 160 includes a display 164 configured to display a representation of the three-dimensional environment 700 from a second perspective, different than the first perspective (with the difference in perspectives owning to the fact that the cameras of electronic device 101 and second electronic device 160 are in different positions with respect to the common scene they are capturing image data from). In some examples, the representation of the three-dimensional environment 700 includes a representation of a person 164*a* and a representation of a tree 164*b*. In some examples, the aforementioned representations correspond to physical objects within the three-dimensional environment 700 as discussed in further detail below. In some examples, the second electronic device 160 obtains the representation of the three-dimensional environment 700 from one or more external cameras (not shown) as discussed in further detail below with reference to FIG. 3B. In some examples, the representation of the three-dimensional environment 700 corresponds to a live-video feed of the three-dimensional environment 700, optionally updating the representation according to updates in the three-dimensional environment as discussed in further detail below. In some examples, as shown in FIG. 3A, the second electronic device displays the representation of the three-dimensional environment 700 in the same manner as the electronic device 101 displays the three-dimensional environment 700.

In some examples, as shown in FIG. 3A, the electronic device displays the plurality of objects (discussed above) including person 710 in the three-dimensional environment 700 positioned centrally within the field of view of the electronic device 101, and tree 720 positioned on a left portion within the field of view of the electronic device 101. In some examples, the plurality of physical objects corresponds to the representation of the person 164*a* and the representation of the tree 164*b*. In some examples, the electronic device 101 displays only a portion of the person 710 as included in the three-dimensional environment. For example, as shown in FIG. 3A, the display 120 optionally includes an upper portion of the person 710. In some examples, the electronic device 101 displays only the upper portion of the person 710 to indicate a closer positional relationship between the user of the electronic device 101 relative to the positional relationship between the user of the electronic device 101 and the tree 720 as shown in further detail by the top-down view 200.

In some examples, as shown by the top-down view 200, the user of the electronic device 101 (e.g., representation of the user 230) is facing three-dimensional environment 700. In some examples, as shown by the top-down view 200, electronic device 211 includes the field of view 271 encompassing a representation of a tree 220 (e.g., tree 720 and/or representation of the tree 164*b*) and a representation of a person 210 (e.g., person 710 and/or representation of the person 164*a*). In some examples, the field of view 271 corresponds to the three-dimensional environment 700 at the display 120. In some examples, the user 230 is positioned at a location in the three-dimensional environment 700 directly facing the representation of the user 230 and centrally located within the field of view of the electronic device 101. In some examples, as shown in the top-down view 200, the representation of the tree 220 is located further from the representation of the user 230 relative to the location of the user 230. In some examples, user 230 positions the second electronic device 261 such that the display 120 does not display the second electronic device 160 within the three-dimensional environment 700 (e.g., the second electronic device is low enough to be out of the field of view of electronic device 211).

In some examples, the first external camera 171 and the second external camera 170 capture a common scene (e.g., three-dimensional environment 700) from a first perspective and a second perspective, respectively. In capturing the scene from multiple angles, the second electronic device 160 is able generate images that capture depth information associated with the spatial relationship between various objects in the scene.

Figure 3B:
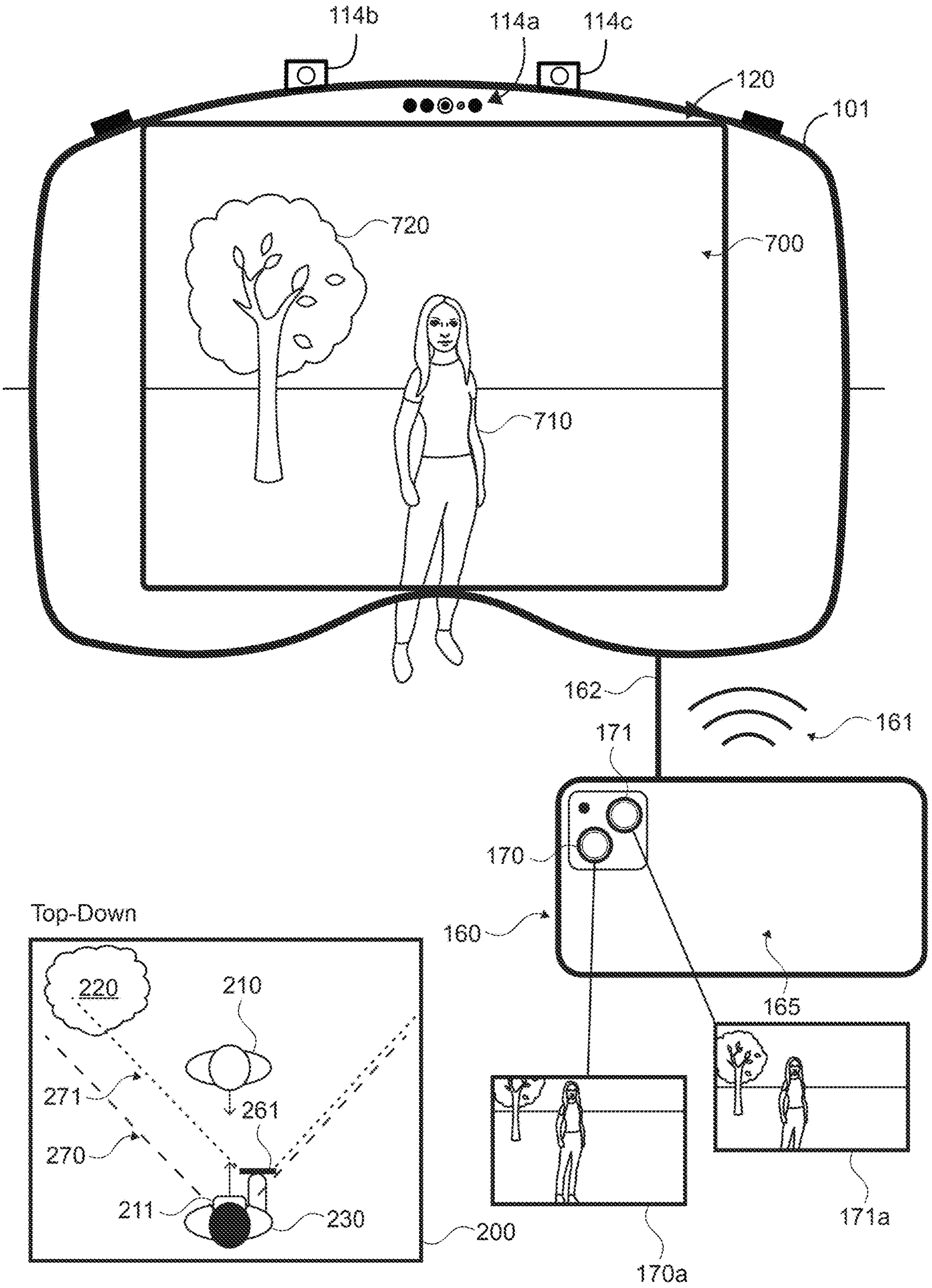

FIG. 3B illustrates an example of the second electronic device capturing, via a first external camera 171 and a second external camera 170, spatial image data (e.g., data that can be used to create spatial images that include three-dimensional depth information) comprising first image data 171*a* taken by first external camera 171 and second image data 170*a* taken by second external camera 170, while the electronic device 101 views the three-dimensional environment 700. In some examples, as shown in FIG. 3B, the first external camera 171 and the second external camera 170 capture images of the three-dimensional environment 700 from different perspective because first external camera 171 and second external camera 170 are positioned at slightly different location with respect to the three-dimensional environment 700. In some examples, as compared between the first image data 171*a* and the second image data 170*a*, the first external camera 171 captures the three-dimensional environment 700 from a first perspective that includes an upper portion of the person 710 and tree 720 in its entirety (e.g., first image data 171*a*) while the second external camera 170 captures the three-dimensional environment 700 from a second perspective that includes the person 710 in its entirety and a lower portion of the tree 720 (e.g., second image data 170*a*). In some examples, the second electronic device records the first image data 171*a* and the second image data 170*a* to produce spatial image data displayed by a viewfinder discussed in further detail below. In some examples, as shown in FIG. 3B, the first external camera 171 and the second external camera 170 are disposed on a rear face 165 of the second electronic device. In some examples, the rear face 165 of the second electronic device including the first external camera 171 and the second external camera 172 directly face the person 710 as shown by the corresponding representation of the second electronic device 261 in the top-down view 200. In some examples, the second electronic device 160 consolidates the first image data 171*a* and the second image data 170*a* into the spatial image data as discussed above and transmits the spatial image data to the electronic device 101 via wireless communication 161 and/or wired communication 162, or transmits the first image data 171*a* and/or the second image data to the electronic device 101, and electronic device 101 consolidates the received spatial images into the spatial image data as discussed in further detail below. In some examples, the second electronic device 160 displays, at the display 164, the spatial image data as a two-dimensional representation of the three-dimensional environment 700 while transmitting the spatial image data to the electronic device to be displayed at the viewfinder 300 as a spatial image.

In some examples, as discussed above, the display 164 is a two-dimensional display (lacking multiple displays) and is unable to display the first image data 171*a* and/or the second image data 170*a* as a spatial image. Instead, the second electronic device 160 transmits the first image data 171*a* and/or the second image data 170*a* to be displayed by the displays at the electronic device 101 (e.g., display 120 including viewfinder 300) as illustrated in further detail below.

Figure 3C:
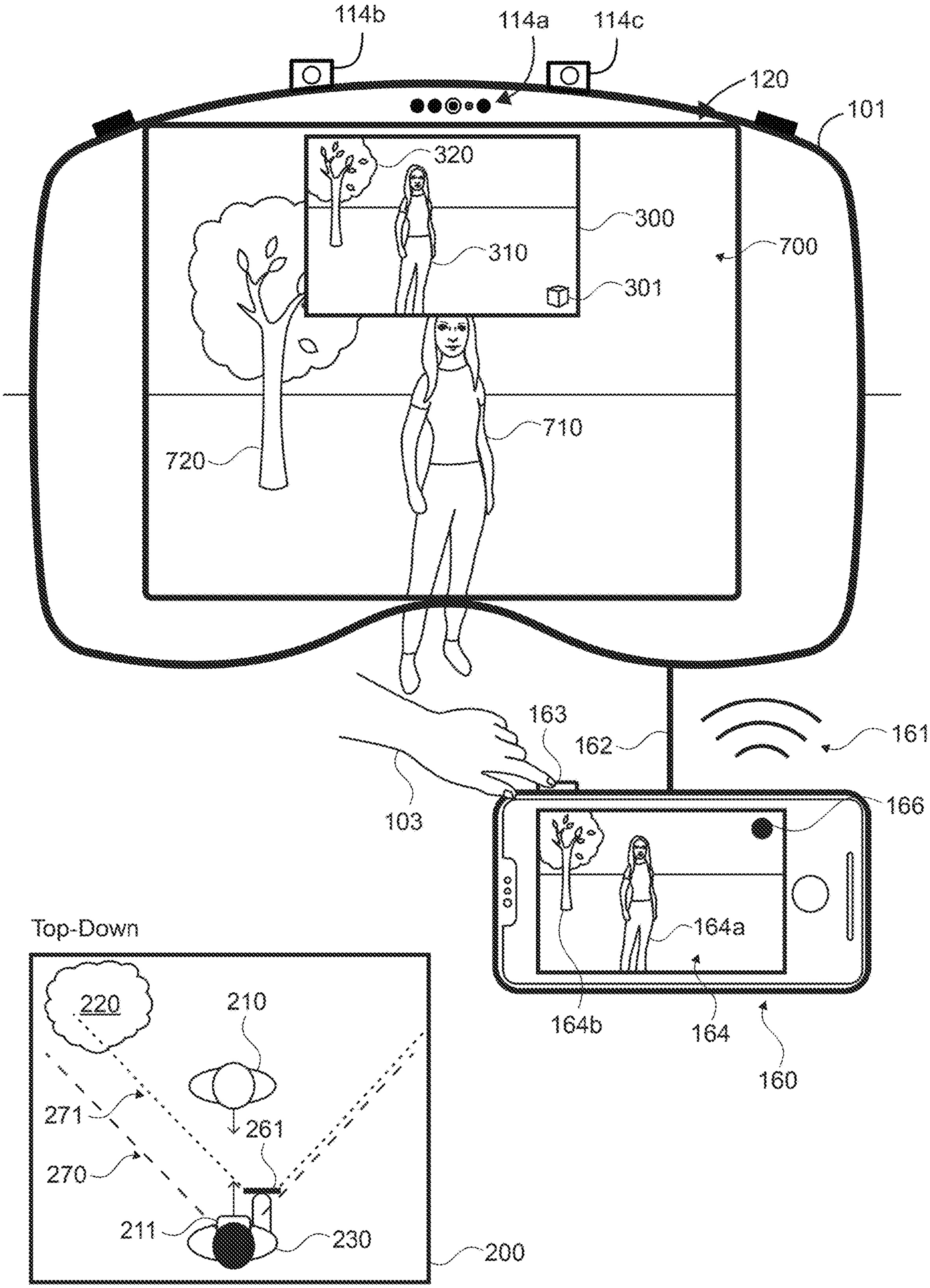

FIG. 3C illustrates an example of the second electronic device 160 transmitting the spatial image data (e.g., combination of the first image data 171*a* and second image data 170*a*) to viewfinder 300 at the display 120 in response to a user input directed at the button 163 while the electronic device 101 displays the three-dimensional environment 700. In some examples, as shown by FIG. 3C, the user input is provided by the hand 103 optionally corresponding to the user of the electronic device 101 and second electronic device 160. As discussed above, the second electronic device 160 includes only a two-dimensional display (e.g., display 164) and cannot include the depth information associated with the spatial image data (e.g., first image data 171*a*, second image data 170*a*). To display the depth information associated with the spatial image data, a plurality of displays is required, such as the displays provided at the electronic device 101. As a result, in response to the first external camera 171 and/or the second external camera 170 capturing the spatial image data, the second electronic device 160 transmits the spatial image data to the electronic device 101 as discussed in further detail below. In some examples, in response to the user input provided by hand 103, the second electronic device 160 sends a command to the first external camera 171 and/or the second external camera 170 (shown above) to begin capturing the first image data 171*a* and/or the second image data 170*a* (shown above). In some examples, as shown by FIG. 3C, the second electronic device 160 displays, via display 164, recording indication 166 in response to the user input provided at button 163, indicating that the first external camera 171 and the second external camera 170 are capturing the first image data 171*a* and the second image data 170*a*. In some examples, the electronic device 101 receives the spatial image data from the second electronic device 160 via the wireless communication 161 and/or wired communication 162 and displays the spatial image data in the viewfinder 300 at the display 120. In some examples, as shown in FIG. 3C, the viewfinder 300 overlays at least a portion of the three-dimensional environment 700. It should be noted that the location of the viewfinder 300 overlay is not necessarily restricted to what is presented in the following figures and should be taken as examples for possible locations of the viewfinder 300 at the display 120. In some examples, the electronic device 101 displays the spatial image data at viewfinder 300 as a spatial image (e.g., an image including depth information as discussed above with reference to FIG. 3B), as indicated by cube 301. Display 120 at the electronic device 101 optionally includes a plurality of displays, such that a first display associated with the first image data 171*a* and a second display associated with the second image data 170*a* are disposed opposing a user's eyes to create the illusion of depth (e.g., depth information). In some examples, as shown in FIG. 3C, the viewfinder 300 displays the three-dimensional environment 700 from a perspective corresponding to the perspective of the three-dimensional environment 700 relative to the user of the electronic device 101 (e.g., display 120). In some examples, as shown in FIG. 3C, the viewfinder includes a representation of a person 310 and a representation of a tree 320 that corresponds to the person 710 and the tree 720 in the three-dimensional environment. In some examples, the spatial image data at the viewfinder 300 and the three-dimensional environment 700 correspond to a live-video feed of a real-world environment.

Figure 3D:
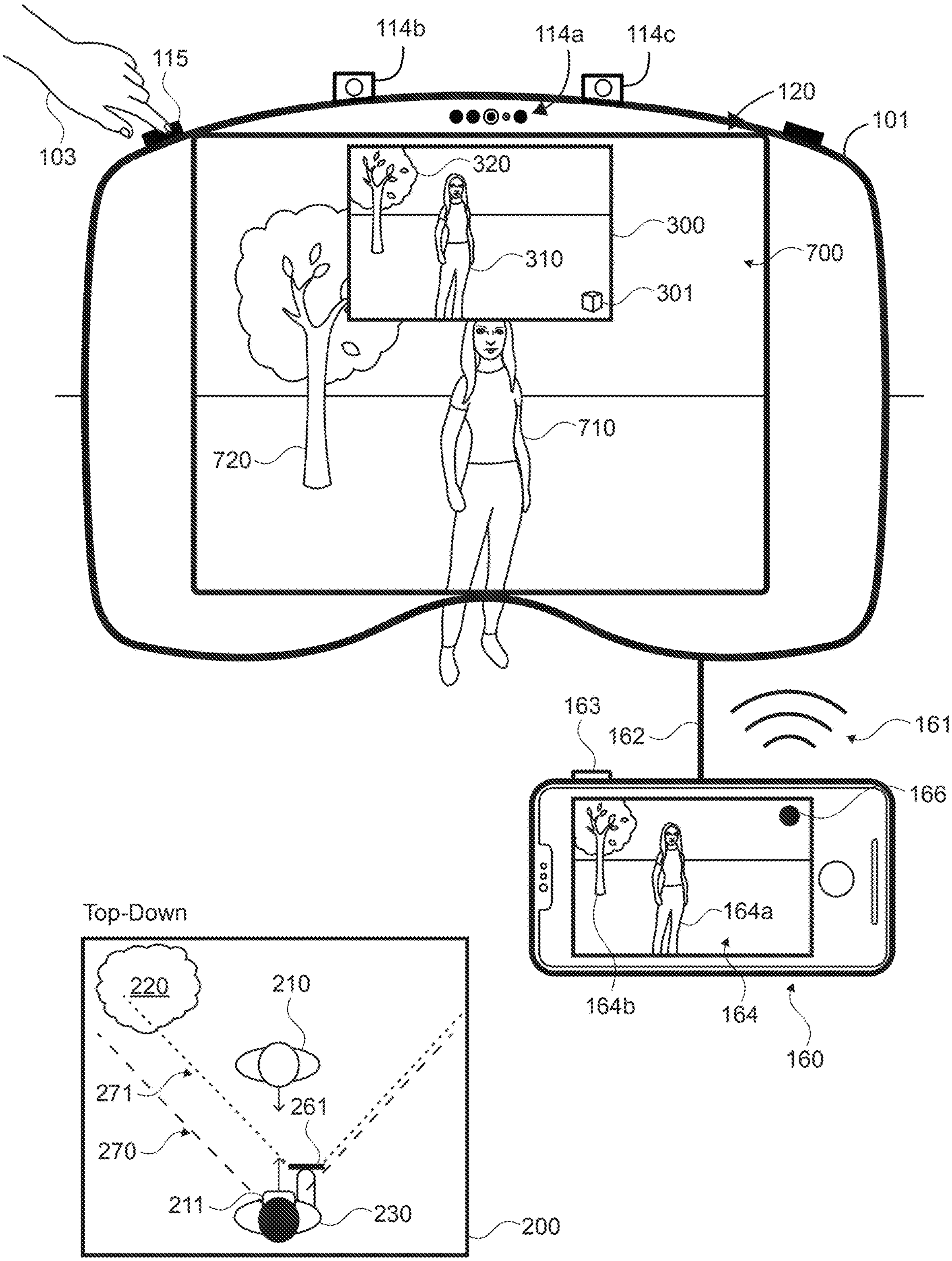

FIG. 3D illustrates an alternate example of FIG. 3C where the user input provided by hand 103 is directed at button 115 at the first electronic device. In some examples, in response to the user input provided by hand 103 directed at button 115, the electronic device 101 transmits a command to the second electronic device 160 to begin capturing the spatial image data (e.g., combination of the first image data 171*a* and second image data 170*a*) via the first external camera 171 and the second external camera 170 (see FIG. 3B). In some examples, in response to receiving the command to begin capturing the spatial image data, the second electronic device 160 transmits the spatial image data to be displayed at the viewfinder 300 displayed on electronic device 101 in a similar manner as discussed above in FIG. 3C.

In some examples, the user of the second electronic device 160 optionally modifies the orientation of the second electronic device 160 such that the external cameras capture a different portion of the three-dimensional environment 700. As a result, the spatial image data transmitted to the electronic device 101 includes updated depth information and/or objects in the three-dimensional environment. In response to receiving the updated spatial image data, the electronic device 101 optionally updates the viewfinder 300 to display the updated spatial image data including the updated depth information and/or objects as discussed in further detail below with reference to FIG. 3E.

Figure 3E:
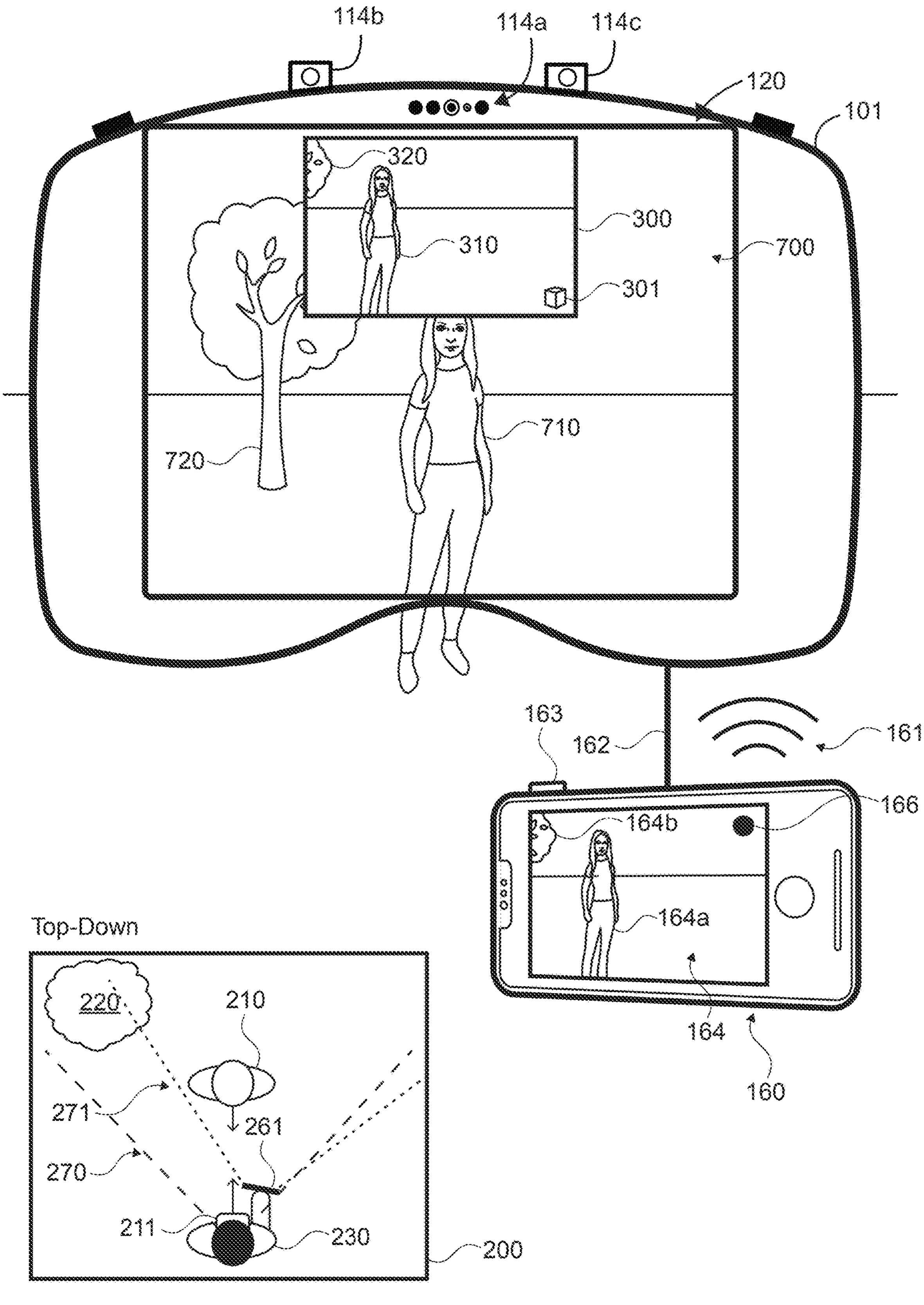

FIG. 3E illustrates an example of the user of the electronic device 101 and the second electronic device 160 updating an orientation (e.g., rotates) of the second electronic device 160 while the electronic device 101 maintains displaying the three-dimensional environment 700 from the perspective of FIGS. 3A-3D. In some examples, as shown in FIG. 3E, the orientation of the second electronic device 160 is updated such that the field of view of second electronic device, and specifically the cameras of the second electronic device, is shifted to the left as compared to the example of FIG. 3D. In some examples, the user of the electronic device 101 directs a user input (not shown) at the second electronic device 160 to update its orientation from the orientation displayed by the top-down view 200 of FIG. 3D to the top-down view 200 of FIG. 3E (for instance by rotating, e.g., in the yaw axis, the second electronic device with their hand). In some examples, as shown in FIG. 3E, the second electronic device 160 continues to capture (as indicated by recording indication 166) the spatial image data in the updated orientation. In some examples, the first external camera 171 and the second external camera 170 capture the three-dimensional environment from a perspective different than the perspective of the display 120 as a result in the change in orientation of the second electronic device 160. In some examples, as shown by the top-down view 200, the orientation of the second electronic device 160 is rotated (e.g., right, such as rotation in the yaw axis,) such that a field of view of the second electronic device 160 is outside a right portion of the field of view of the first electronic device (e.g., capturing a right-side portion of the three-dimensional environment 700). In some examples, as a result of the change in orientation of the second electronic device 160, the display 164 includes a right-side portion of the representation of the tree **164*b*. In some examples, the above discussed change in orientation results in the first external camera 171 and the second external camera 170 capturing only the right-side portion of the tree 720 as shown by the representation of the tree 164*b*. In some examples, the change in orientation of the second electronic device is a rotation of the second electronic device from a position directly facing outwards from the user of the second electronic device 160 to an orientation at an angle 45 degrees to the right relative to the user. In some examples, while the second electronic device 160 is rotated, the user of the electronic device 101 maintains a forward-facing orientation, as shown by the top-down view 200, resulting in an unchanged display of the three-dimensional environment 700 (e.g., field of view 270) by the display 120 as compared to previous figures. In some examples, as shown by the top-down view 200, the field of view 271 (area of the three-dimensional environment 700 captured by the external cameras) extends outside the field of view 270, resulting in the first image data 171*a* and/or the second image data 170*a* capturing aspects of a right-side portion of the three-dimensional environment 700 not viewable by the display 120 (e.g., correspond to field of view 270). In some examples, while and/or after the change in orientation, the second electronic device 160 transmits the updated perspective of the three-dimensional environment 700 (e.g., spatial image data) to the electronic device 101 to be displayed by the viewfinder 300. In some examples, in response to receiving the updated perspective of the three-dimensional environment 700, the electronic device 101 replaces the spatial image data at the viewfinder 300 shown in FIG. 3D with the updated perspective of the three-dimensional environment 700**.

Figure 3F:
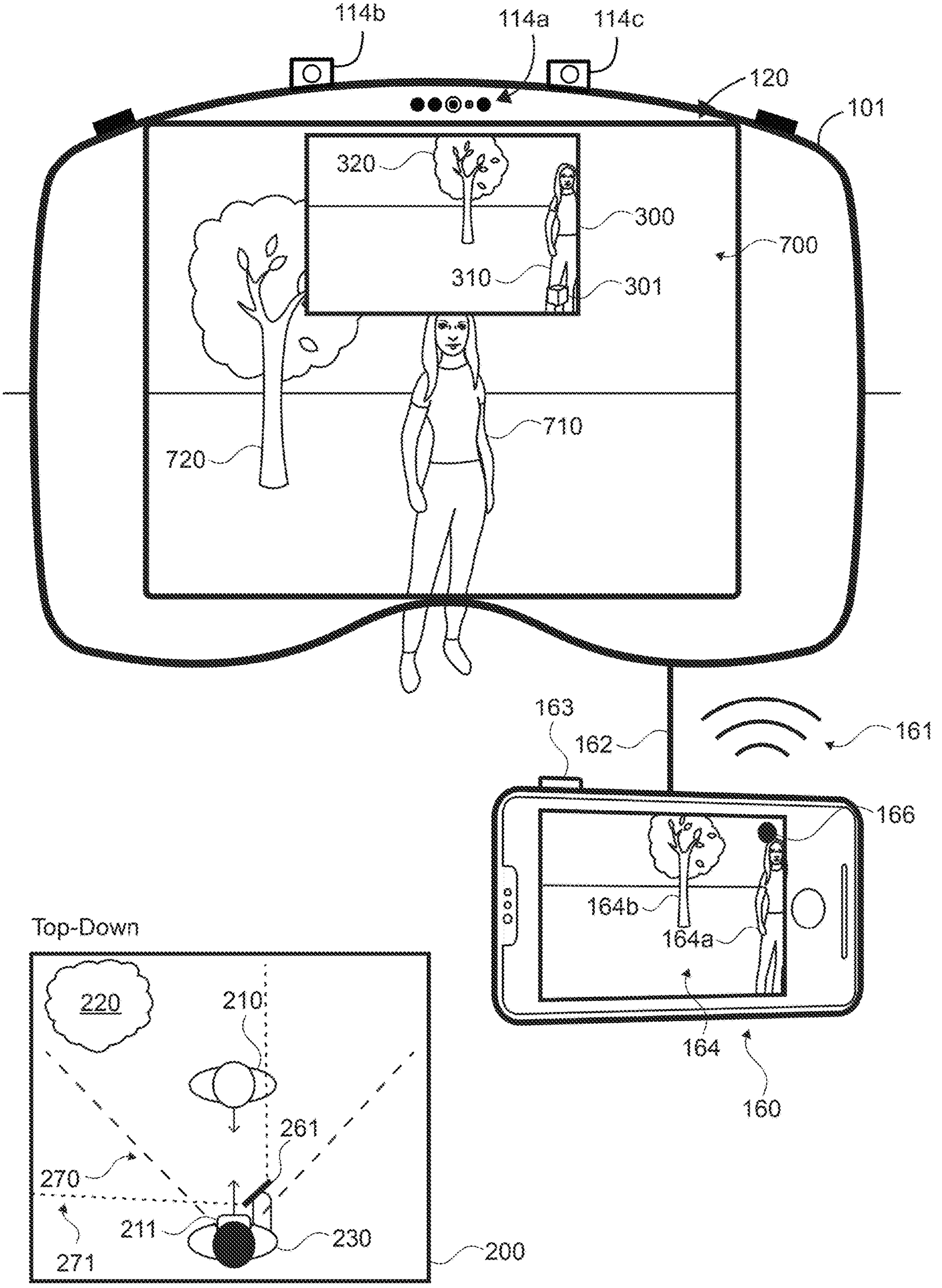

FIG. 3F illustrates an alternative example of FIG. 3E where the user of the electronic device 101 and the second electronic device 160 alternatively updates an orientation (e.g., rotates) of the second electronic device 160 to view a left-side portion of the three-dimensional environment 700. In some examples, the user of the electronic device 101 directs an input at the second electronic device 160 to update its orientation in a similar manner as discussed above. In some examples, in response to the change in orientation, the electronic device 101 receives an updated perspective (e.g., spatial image data) of the three-dimensional environment 700 and updates the viewfinder 300 in a similar manner as discussed above. In some examples, similar to as discussed in FIG. 3E, the updated orientation of the second electronic device 160 results in the field of view 271 encompassing a left-side portion of the three-dimensional environment 700 not viewable by the field of view 270 (e.g., display 120). In some examples, the user of the electronic device 101 maintains the forward-facing orientation in a similar manner as discussed above. In some examples, as shown by the top-down view 200, the orientation of the second electronic device 160 is rotated (e.g., left, such as in the yaw axis) such that a field of view of the second electronic device 160 is outside a left portion of the field of view of the electronic device (e.g., capturing a left-side portion of the three-dimensional environment 700). In some examples, as a result of the change in orientation of the second electronic device 160, the display 164 includes a left-side portion of the representation of the person **164*a*. In some examples, the above discussed change in orientation results in the first external camera 171 and the second external camera 170 capturing only the left-side portion of the person 710 as shown by the representation of the person 164*a*. In some examples, the change in orientation is a rotation of the second electronic device from a position directly facing outwards from the user of the second electronic device 160 to an orientation at an angle 45 degrees to the left relative to the user. In some examples, the user of the electronic device 101 may optionally update the orientation (e.g., rotating such that the second electronic device 160 is perpendicular to the three-dimensional environment 700 presented by the first electronic device) of the second electronic device 160 such that the first external camera 171 and the second external camera are unable to capture the first image data 171*a* and the second image data 170*a*** as discussed in further detail below.

Figure 3G:
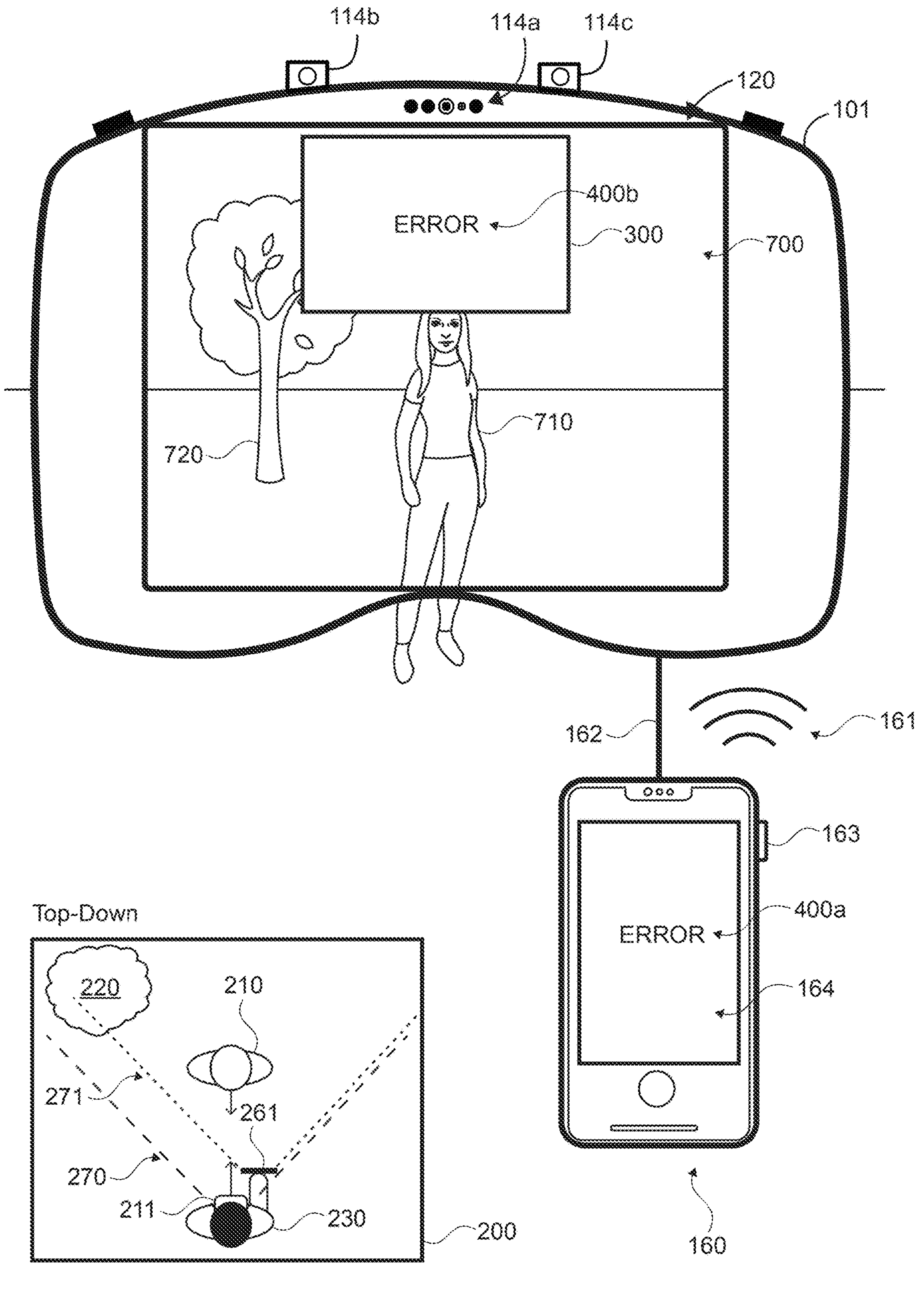

FIG. 3G illustrates an example orientation of the second electronic device 160 triggering an indication **400*b* (e.g., "ERROR") at the viewfinder 300 displayed on electronic device 101 and/or indication 400*a* (e.g., "ERROR") at the display 164 of the second electronic device 160 in response to a change in orientation of the second electronic device while the electronic device 101 maintains displaying the three-dimensional environment 700. In some examples, the orientation of the second electronic device 160 is altered via a user input in a similar manner as discussed above. In some examples, as shown in FIG. 3G, the orientation of the second electronic device 160 is updated from an orientation parallel with the three-dimensional environment 700 (e.g., landscape mode, see FIG. 3D) to an orientation perpendicular with the three-dimensional environment (e.g., portrait mode), and in response, the second electronic device 160 displays indication 400*a*. In some examples, the second electronic device 160 ceases displaying (via display 164) the representation of the three-dimensional environment 700, and generates the indication 400*a* (e.g., "ERROR"). In some examples, in response to detecting the updated orientation, the second electronic device 160 ceases capturing the spatial image data via the first external camera 171 and the second external camera 170 and transmits the indication 400*b* to the electronic device 101. In some examples, as shown in FIG. 3G, the electronic device 101 displays at the viewfinder 300 the indication 400*a* in response to detecting the updated orientation of the second electronic device 160. In some examples, as shown in FIG. 3G, the second electronic device 160 displays the indication 400*a* at an orientation corresponding to portrait mode, and concurrently sends a command to the electronic device 101 to display the indication 400***b*. In some examples, the indication 400*a* and/or indication 400*b* are optionally accompanied by haptic feedback and/or auditorial feedback (not shown). In some examples, as shown in the top-down view 200, the representation of the second electronic device 261 maintains an orientation parallel to the user 230 while in portrait mode. In some examples, the second electronic device 160 continues to command the first external camera 171 and/or the second external camera 170 to capture the three-dimensional environment 700 in the updated orientation as discussed in further detail below.

Figure 3H:
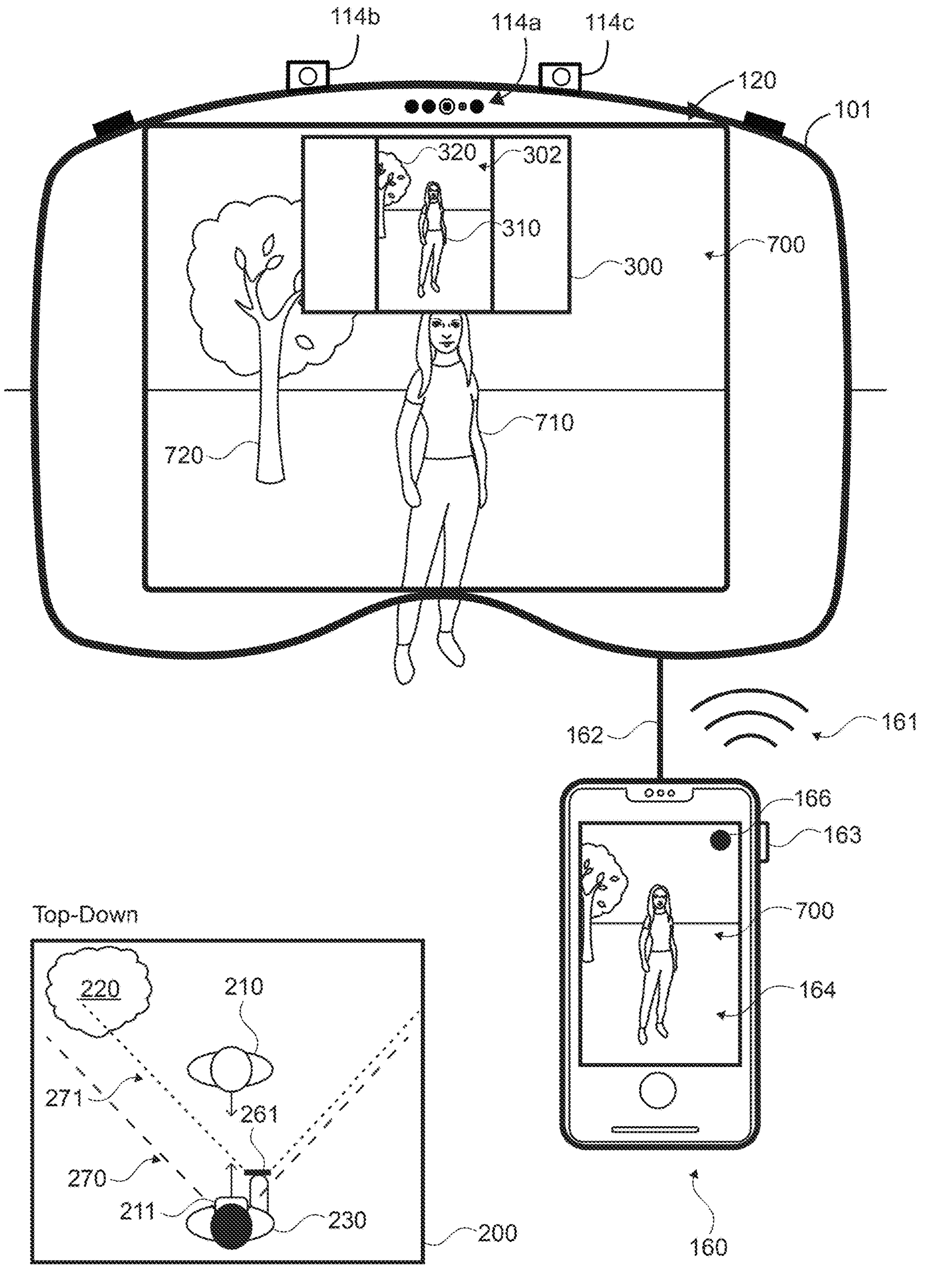

FIG. 3H illustrates an example orientation (e.g., orientation illustrated in FIG. 3G) of the second electronic device 160 triggering a non-spatial image 302 at viewfinder 300 and/or a non-spatial image of the three-dimensional environment 700 at the display 164 in response to a change in orientation of the second electronic device while the electronic device 101 maintains displaying the three-dimensional environment 700. In contrast to the example of FIG. 3G, in the example of FIG. 3H, the viewfinder 300 of electronic device 101 maintains display of the image data provided by the second electronic device 160 but does not display the image as a spatial image (e.g., stereoscopic image), and instead displays the image as a two-dimensional (e.g., monoscopic) image. In some examples, the orientation of the second electronic device 160 is updated in a similar manner as discussed above with reference to FIG. 3G. In some examples, as shown in FIG. 3H, the second electronic device 160 displays the recording indication 166, indicating that the external camera(s) are continuing to capture the three-dimensional environment 700, albeit, capturing the non-spatial image of the three-dimensional environment 700. In some examples, the second electronic device 160 transmits the non-spatial image of the three-dimensional environment 700 to the electronic device 101, and in response, the electronic device 101 displays the non-spatial image of the three-dimensional environment 700 at the viewfinder 300. In some examples, as shown in FIG. 3H, the display 120 includes an updated shape (e.g., length and width dimension) of the viewfinder 300, reflecting the updated orientation of the image(s) (non-spatial) captured and transmitted by the second electronic device 160. In some examples, as shown by the top-down view 200, the representation of the second electronic device 261 maintains an orientation parallel to the user 230 while in portrait mode. In some examples, the second electronic device 160 sends a command to the electronic device 101 to display the spatial image data at the viewfinder 300 in response to the orientation of the second electronic device 160 resuming an orientation conducive to capturing the spatial image data as discussed in further detail below.

In some examples, while the second electronic device 160 is in the orientation conducive to capturing the spatial image data, the second electronic device 160 optionally displays a controls user interface 360 configured to control various aspects of the spatial image data including the manner in which the spatial image data is displayed at the viewfinder 300.

Figure 3I:
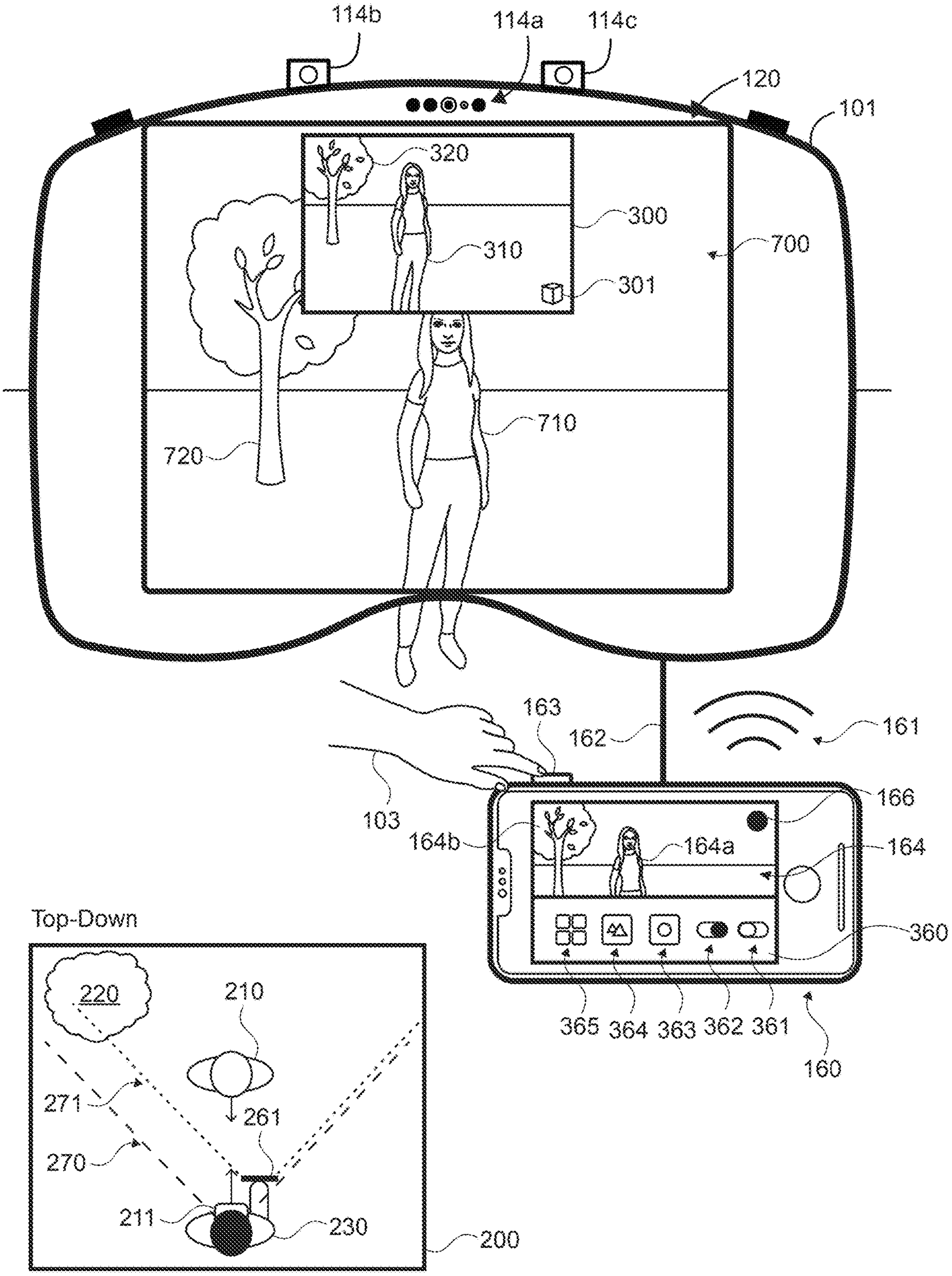

FIG. 3I illustrates an example of the second electronic device 160 displaying the controls user interface 360 in response to the hand 103 of the user directing an input at button 163 while the electronic device 101 displays (at display 120) the three-dimensional environment 700 and the spatial image data at the viewfinder 300. In some examples, as shown in FIG. 3I, the second electronic device 160 is in an orientation conducive to capturing the spatial image data and transmits the spatial image data to the electronic device 101 to be displayed at the viewfinder 300, as indicated by cube 301. In some examples, the second electronic device 160 captures the spatial image data as shown by recording indication 166 and displays the three-dimensional environment 700 at display 164 partially overlaid by the controls user interface 360. In some examples, as shown in FIG. 3I, the controls user interface 360 includes a plurality of controls 361 through 365. In some examples, the plurality of controls 361 through 365 are optionally configured to alter one or more aspects of the capturing of the spatial image discussed in further detail below, such as displaying a spatial image as shown in FIG. 4B. In some examples, as shown in FIG. 3I, the controls user interface 360 is opaque and overlays a lower portion of the three-dimensional environment 700 at the display 164. In some examples, the second electronic device 160 transmits the spatial image data (e.g., spatial image of the three-dimensional environment 700) while displaying only a portion of the three-dimensional environment 700 at the display 164. In some examples, the controls user interface 360 is displayed by the second electronic device 160 at display 164 in response to the second electronic device 160 capturing (via the external cameras) the spatial image data. This capture of the spatial image is optionally triggered by, as shown by FIG. 3I, in response to detection of a user input provided by hand 103 directed at button 163.

In some examples, the second electronic device 160 alternately displays, at display 164, a tint 515 in response to the user input provided by hand 103 directed at button 163. In one or more examples, and as described in further detail below, tint 515 is configured to provide a visual indication to the user that electronic device 101 is displaying the images that are being captured by second electronic device 160. In some examples, detecting the input provided by hand 103 signals the second electronic device 160 to command the first external camera 171 and/or the second external camera 170 to begin capturing the image data.

Figure 3J:
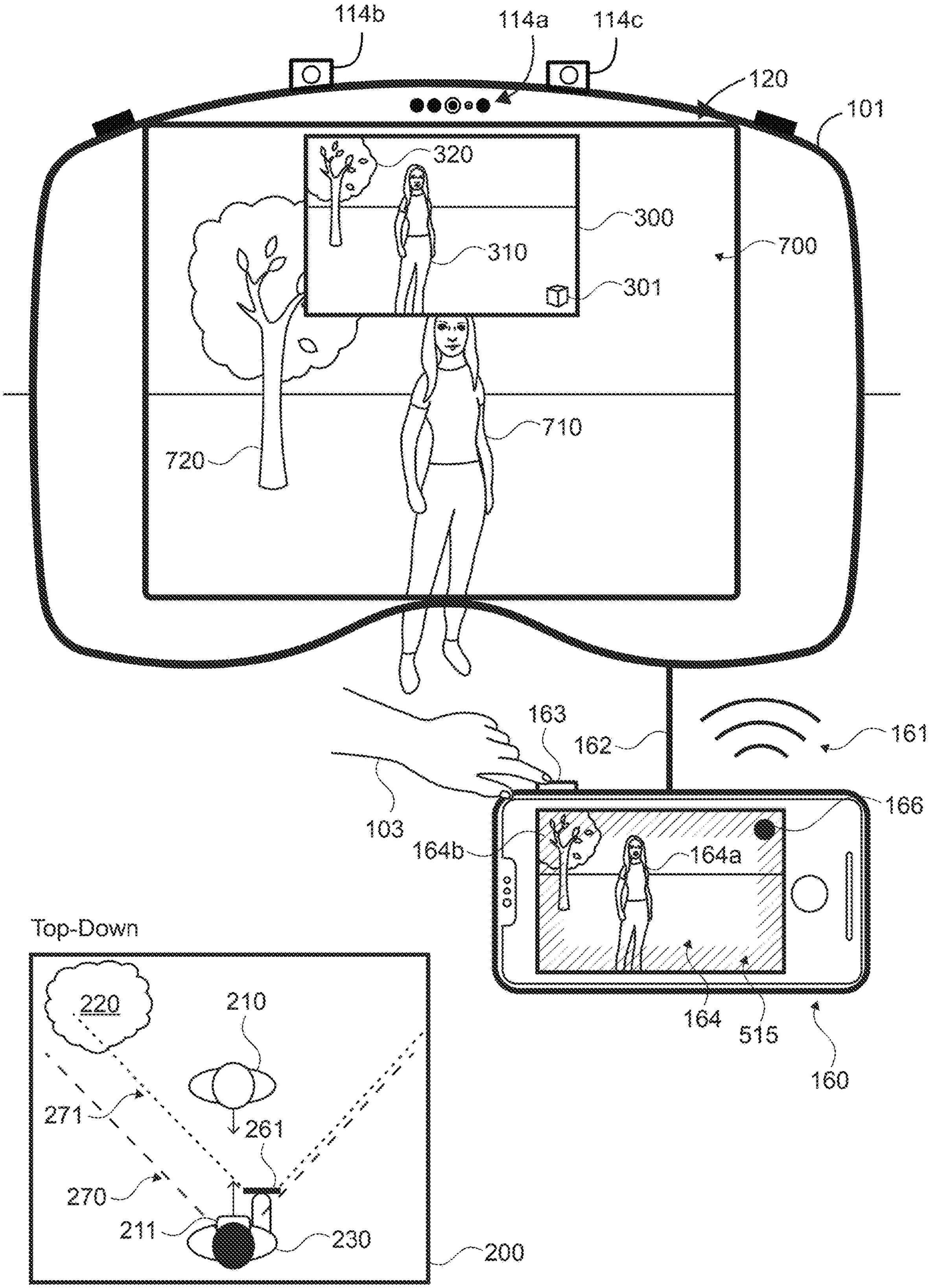

FIG. 3J illustrates an alternative example of the second electronic device 160 displaying the three-dimensional environment 700 with tint 515 at the display 164 in response to the input provided by the hand 103 at the button 163, while capturing the spatial image data and transmitting the spatial image data to the electronic device to be displayed at the viewfinder 300 while the electronic device 101 displays the three-dimensional environment 700 at the display 120. In some examples, in response to the user (e.g., corresponding to hand 103) providing an input to begin capturing the spatial image data (e.g., via first external camera 171 and second external camera 170), the second electronic device 160 automatically applies tint 515 to the image of the three-dimensional environment 700 displayed at display 164, indicating to the user of the second electronic device 160 that the second electronic device is capturing the spatial image data and optionally transmitting the spatial image data to the electronic device 101. In some examples, as shown by FIG. 3J, the display 164 displays the tint 515 as a partially opaque coloring surrounding a perimeter of the display 164 overlaying the image of the three-dimensional environment 700. In some examples, the tint 515 is automatically configured such that the representation of the person 164*a* and the representation of a tree 164*b* are partially visible through the tint 515. In some examples, as shown by FIG. 3J, the second electronic device 160 is configured to display the tint 515 partially overlaying the image of the three-dimensional environment 700 while transmitting the spatial image data to the electronic device 101 to be displayed at the viewfinder

300 without the tint 515. In some examples, the second electronic device 160 omits the tint 515 in response to initiating the capture of the spatial image and alternatively displays a static image of the three-dimensional environment 700 as discussed in further detail below.

Figure 3K:
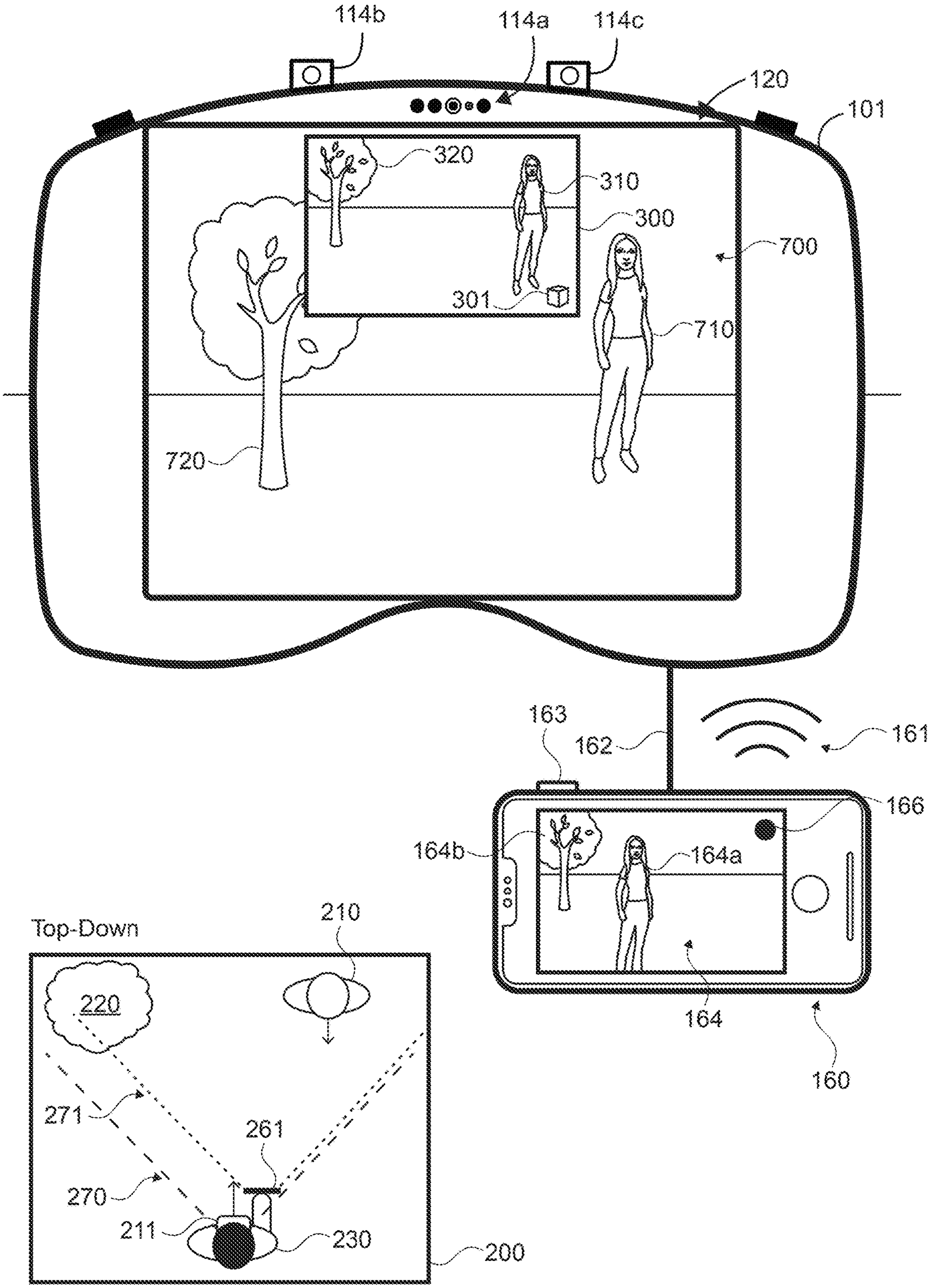

FIG. 3K illustrates an alternative example of the second electronic device 160 indicating to the user that the spatial image data is being captured (e.g., in response to the hand 103 as discussed above) by displaying a static image of the three-dimensional environment 700 at the display 164 while capturing the spatial image data and transmitting the spatial image data to the electronic device to be displayed at the viewfinder 300 while the electronic device 101 displays the three-dimensional environment 700 at the display 120. In some examples, the second electronic device 160 detects an input (not shown, optionally hand 103 discussed above) to begin capturing the spatial image data, via first external camera 171 and/or second external camera 170, and in response, displays a static (e.g., frozen, still) image of the three-dimensional environment 700 at the moment of detecting the input. In some examples, the display 164 continues to include recording indication 166 but does not include an updated image of the three-dimensional environment 700 as shown by the display 120. In some examples, as shown by FIG. 3K, the electronic device 101 receives the updated spatial image data from the second electronic device 160 with the person 710 in a different position (e.g., at a left-side portion of the viewpoint of the user of the electronic device 101) in the three-dimensional environment 700 as compared to FIG. 3K, indicating that the person has moved in the real-world. In some examples, this movement (e.g., person 710) is not reflected at the display 164, instead the second electronic device 160 displays the image of the three-dimensional environment 700 at the moment of detecting the input (e.g., a time prior to the movement of person 710). In some examples, while the second electronic device 160 maintains displaying the static image of the three-dimensional environment 700 while transmitting the (updated) spatial image data to the electronic device 101 as indicated by the cube 301.

In some examples, after capturing the spatial image data, the user of the electronic device 101 may want to view the spatial image data captured in a playback application. In some examples, after the capture of the spatial image data is complete, the user of the electronic device directs an input at the controls user interface 360 discussed above, triggering the second electronic device 160 to display the captured spatial image data at the display 164 and/or the viewfinder 300 as discussed in further detail below. In some examples, once the second electronic device 160 displays the captured spatial image data (e.g., optionally in a playback application), the user of the second electronic device performs various operations related to the captured spatial image data as discussed in further detail below.

Figure 4A:
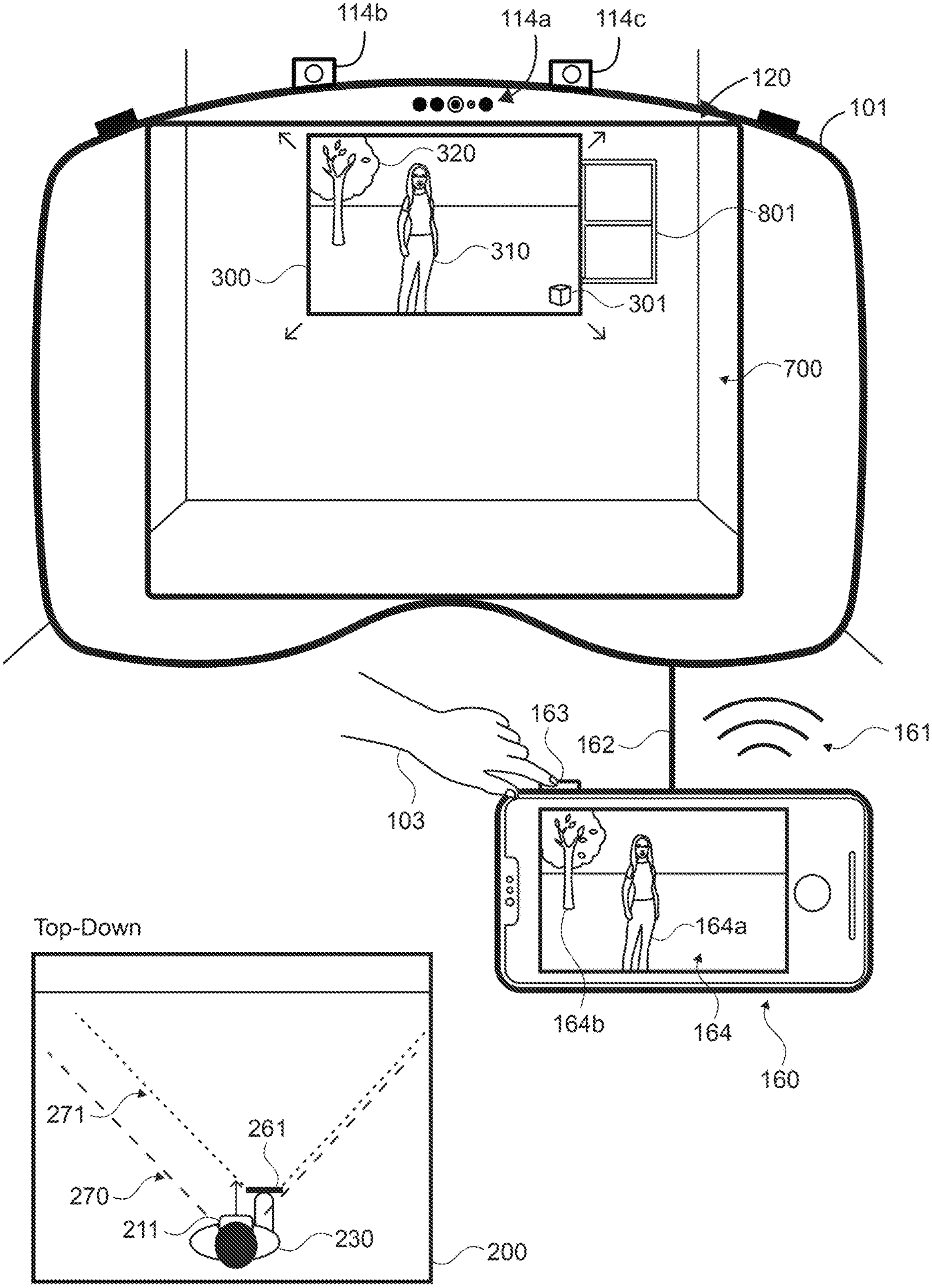
FIGS. 4A-4H illustrate various examples of displaying previously captured spatial images of the three-dimensional environment according to some examples of the disclosure.
Figure 4B:
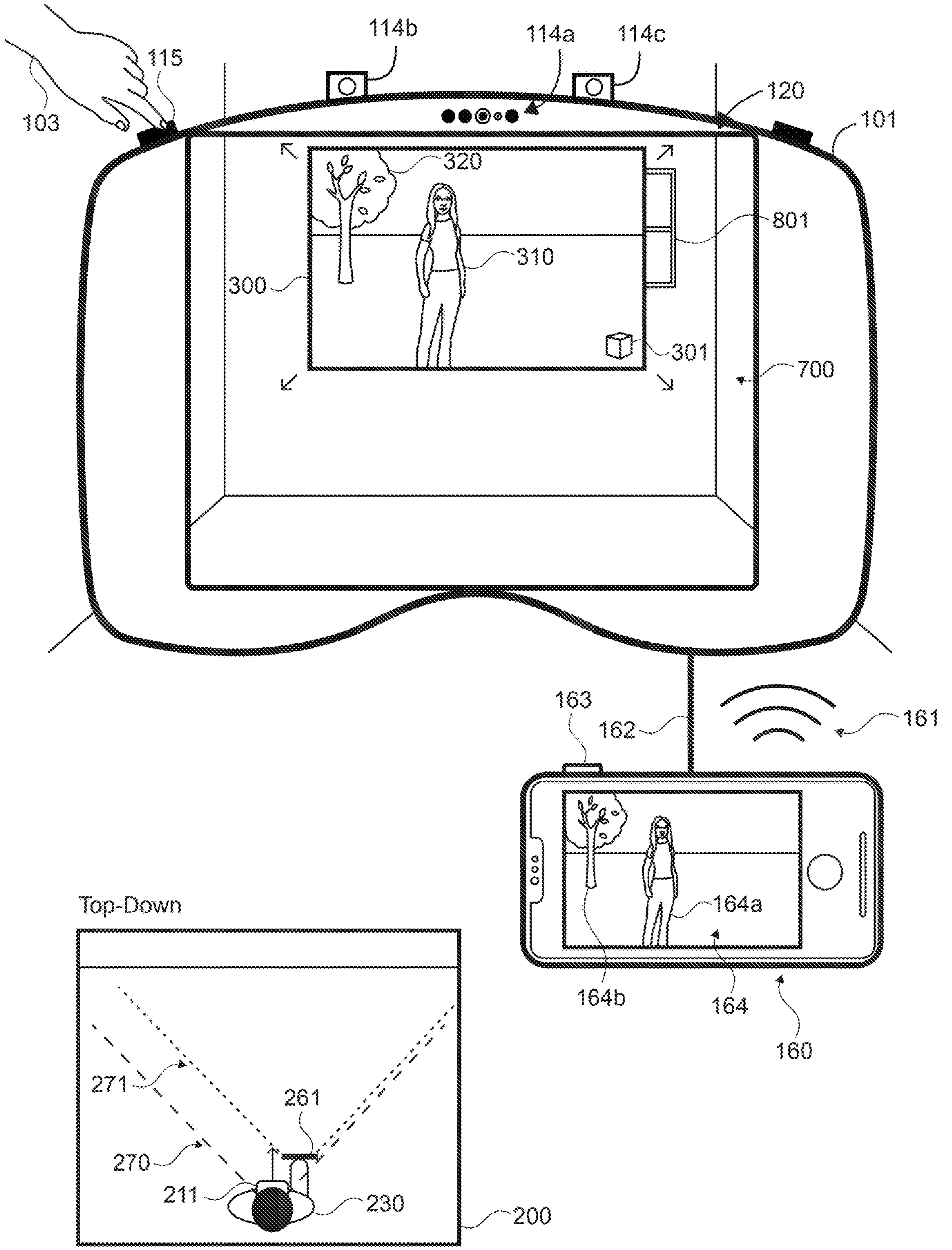

FIG. 4A illustrates an example of the user of the electronic device 101 and the second electronic device 160 in a second three-dimensional environment 800 while the electronic device 101 displays the second three-dimensional environment 800, and the spatial image data (e.g., corresponding to the three-dimensional environment 700) at the viewfinder 300 received from the second electronic device 160, while the second electronic device 160 displays the image of the three-dimensional environment 700. In some examples, as discussed above with reference to FIG. 3I, the user of the electronic device 101 may optionally direct an input at any of the controls 361 through 365, and in response, the second electronic device 160 displays a previously captured spatial image data (e.g., three-dimensional environment 700) at display 164 and transmits the spatial image data to the electronic device 101 to be displayed at the viewfinder 300 as a spatial image as indicated by cube 301. In some examples, as shown in FIG. 4A, relative to the viewpoint of the user of the electronic device 101, the display 120 displays a portion of the second three-dimensional environment 800 including window 801 while displaying the viewfinder 300 overlaying a portion of the second three-dimensional environment 800. In some examples, as shown by FIG. 4A, the display 120 is configured to display the viewfinder 300 in a similar manner as the figures above (e.g., overlaying an upper portion of the three-dimensional environment 700/second three-dimensional environment 800). In some examples, as shown in the top-down view 200, the user 230 (e.g., corresponding to the user of the electronic device 101) is positioned facing the window 801 in a similar manner to the user of the electronic device 101 faces person 710 and tree 720 as discussed above. In some examples, the second electronic device 160 detects an input provided by hand 103 directed at button 163 and in response, transmits a command to the electronic device 101 to increase the size of the viewfinder 300, as indicated by the arrows at the corners of viewfinder 300. In some examples, the electronic device 101 continues to display the second three-dimensional environment 800 while increasing the size of the viewfinder 300. In some examples, as shown by FIG. 4A, the electronic device 101 maintains displaying the spatial image data as indicated by cube 301 while increasing the size of the viewfinder 300. In some examples, the electronic device 101 increases the size of the viewfinder 300 to a size the completely occupies display 120 as discussed in further detail below.

FIG. 4B illustrates an example of the user of the electronic device 101 and the second electronic device 160 in a second three-dimensional environment 800 while the electronic device 101 displays the second three-dimensional environment 800. While the electronic device 101 optionally displays the second three-dimensional environment 800, the electronic device 101 optionally displays the spatial image data (e.g., corresponding to the three-dimensional environment 700) at the viewfinder 300 received from the second electronic device 160. In some examples, the spatial image data is displayed while the second electronic device 160 displays the image of the three-dimensional environment 700. In some examples, the electronic device 101 increases the size of the viewfinder 300 in response to the input (discussed above) directed at the electronic device 101. In some examples, as shown in FIG. 4B, the electronic device 101 detects the input provided by hand 103 directed at button 115, and in response, initiates the increase in size of the viewfinder 300 as indicated by the arrows at the corners of the viewfinder 300. In some examples, while the electronic device 101 detects the input (e.g., hand 103), the second electronic device 160 maintains displaying the image of the three-dimensional environment 700.

Figure 4C:
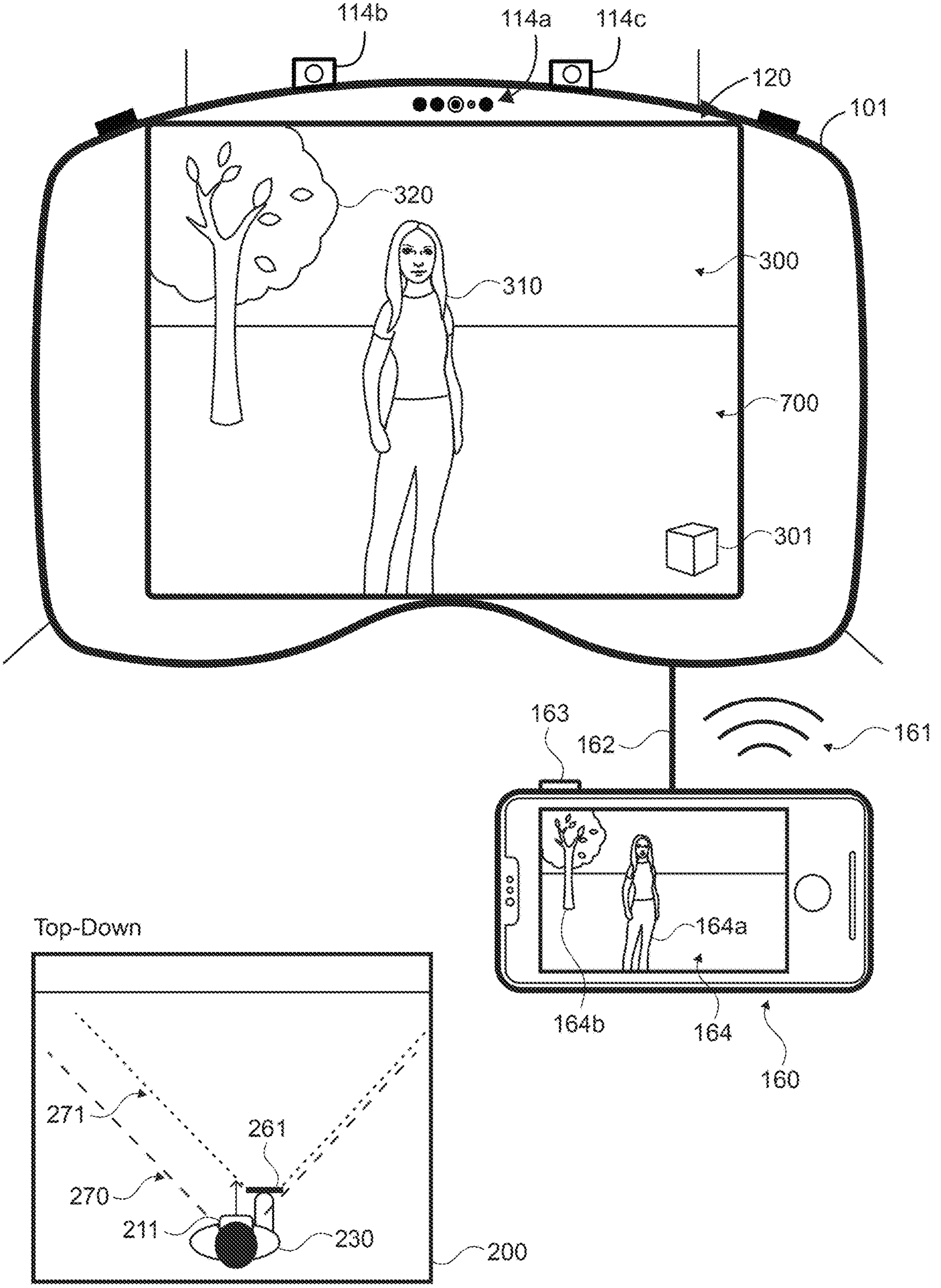

FIG. 4C illustrates the electronic device 101 displaying, via display 120, the viewfinder 300 overlaying the second three-dimensional environment 800 relative to the field of view of the user of the electronic device 101 (e.g., the spatial image is shown in full immersion such that the spatial image occupies the entirety of the viewport of the user) while the second electronic device 160 transmits the spatial image to the electronic device 101. In some examples, the representation of the person 310 and the representation of the tree 320 are displayed with the same positional spacing as compared to FIG. 4A. In some examples, the electronic device 101 receives a command to display the spatial image at full immersion (e.g., viewfinder 300) from the second electronic device 160 as discussed above with reference to FIG. 4A. In some examples, as shown by FIG. 4C, the electronic device 101 continues to display the three-dimensional environment 700 at the viewfinder 300 as a spatial image as indicated by cube 301. In some examples, the viewfinder 300 displays the three-dimensional environment 700 from the same perspective as the second electronic device 160 displays the three-dimensional environment 700 at the display 164. In some examples, the electronic device 101 modifies the display of the viewfinder 300 in several different manners as discussed in further detail below.

Figure 4D:
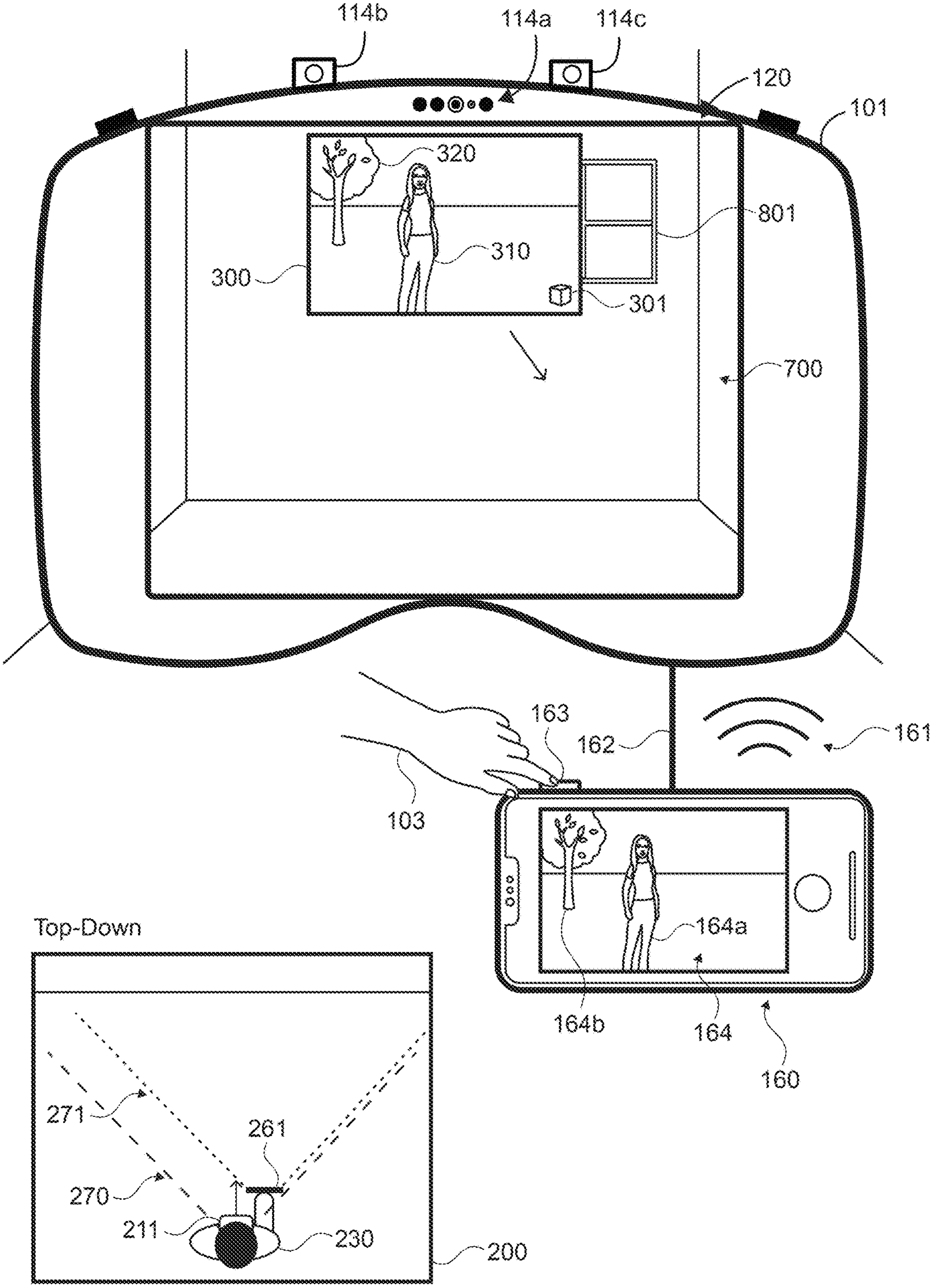

FIG. 4D illustrates an example of the second electronic device 160 displaying the image of the three-dimensional environment 700 (e.g., captured spatial image data) and detecting an input provided by hand 103 at button 163. The electronic device 101 continues to display the above discussed images (e.g., second three-dimensional environment 800, viewfinder 300), while the second electronic device 160 displays the image of the three-dimensional environment 700 and detects the input. In some examples, the electronic device 101 returns the viewfinder 300 to the display size and configuration state of FIG. 4A in response to a user input at the electronic device 101 and/or the second electronic device 160 (not shown). In some examples, the user of the electronic device additionally provides the input (e.g., hand 103) directed at button 163, and in response, the second electronic device 160 transmits a command to the electronic device 101 to update the position of the viewfinder 300 in the display 120. In some examples, as shown by FIG. 4D, the electronic device 101 receives the command (e.g., input provided by hand 103) to update the position of the viewfinder 300 and begins to move the viewfinder 300 as indicated by the arrow attached to the viewfinder 300. In some examples, the input includes a direction (not shown) that the user of the electronic device 101 intends for the viewfinder 300 to move in the display 120. For example, as shown by FIG. 4D, in response to receiving the input transmitted by the second electronic device 160, the electronic device 101 begins to move the viewfinder downward relative to the viewpoint of the user of the electronic device 101.

Figure 4E:
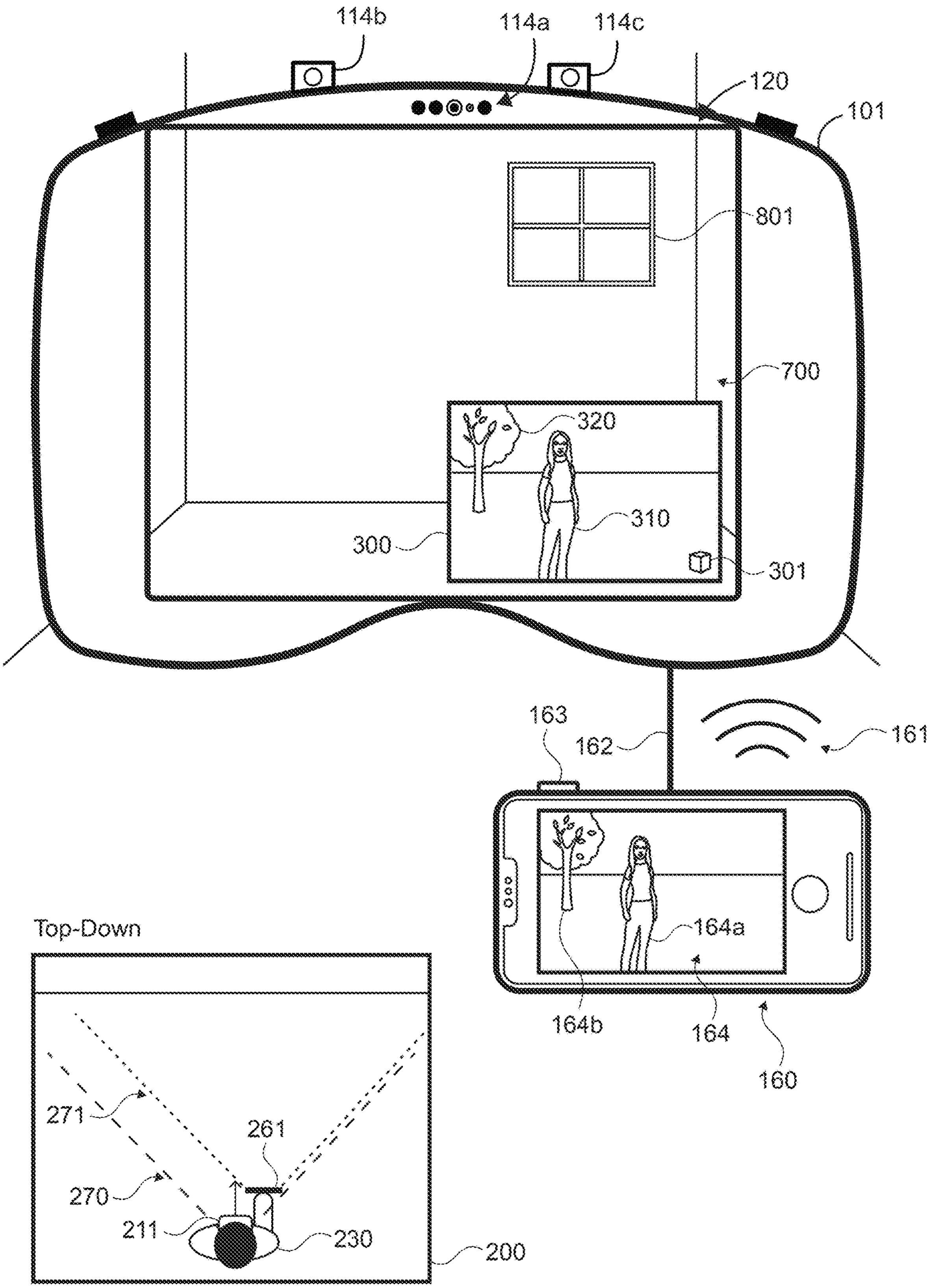

FIG. 4E illustrates an example of the electronic device 101 continuing to display the above discussed images (e.g., second three-dimensional environment 800, viewfinder 300), and an updated position of the viewfinder 300, while the second electronic device 160 displays the image of the three-dimensional environment 700. In some examples, the electronic device 101 updates the position of the viewfinder from a position in the upper-middle region of the display 120 (shown above in FIG. 4D), to a position in the lower-right corner of the display 120 in response to the input discussed above with reference to FIG. 4D. In some examples, the updated position of the viewfinder 300 is such that, relative to the viewpoint of the user of the electronic device 101, the window 801 is fully visible in the three-dimensional environment 700. It should be understood that the position of the viewfinder 300 is not limited to the position illustrated by FIG. 4E and may be optionally positioned anywhere at the display 120 in accordance with the input discussed above with reference to FIG. 4D. In some examples, the second electronic device 160 continues to transmit the spatial image data to the electronic device 101 and display the three-dimensional environment 700. In some examples, as indicated by cube 301, the electronic device continues to display the spatial image data (e.g., three-dimensional environment 700) as a spatial image as described in the above figures. In some examples, the electronic device 101 updates the display of the spatial image data (e.g., three-dimensional environment 700) according to further inputs transmitted by the second electronic device 160 as discussed in further detail below.

In some examples, the user of the electronic device 101 may further manipulate aspects of the display of the captured spatial image data. For example, as discussed in further detail below, the user may begin playback of the spatial image data and optionally desire to begin playback of the spatial image data at various time points utilizing an image control user interface as illustrated by FIGS. 4F and 4G.

Figure 4F:
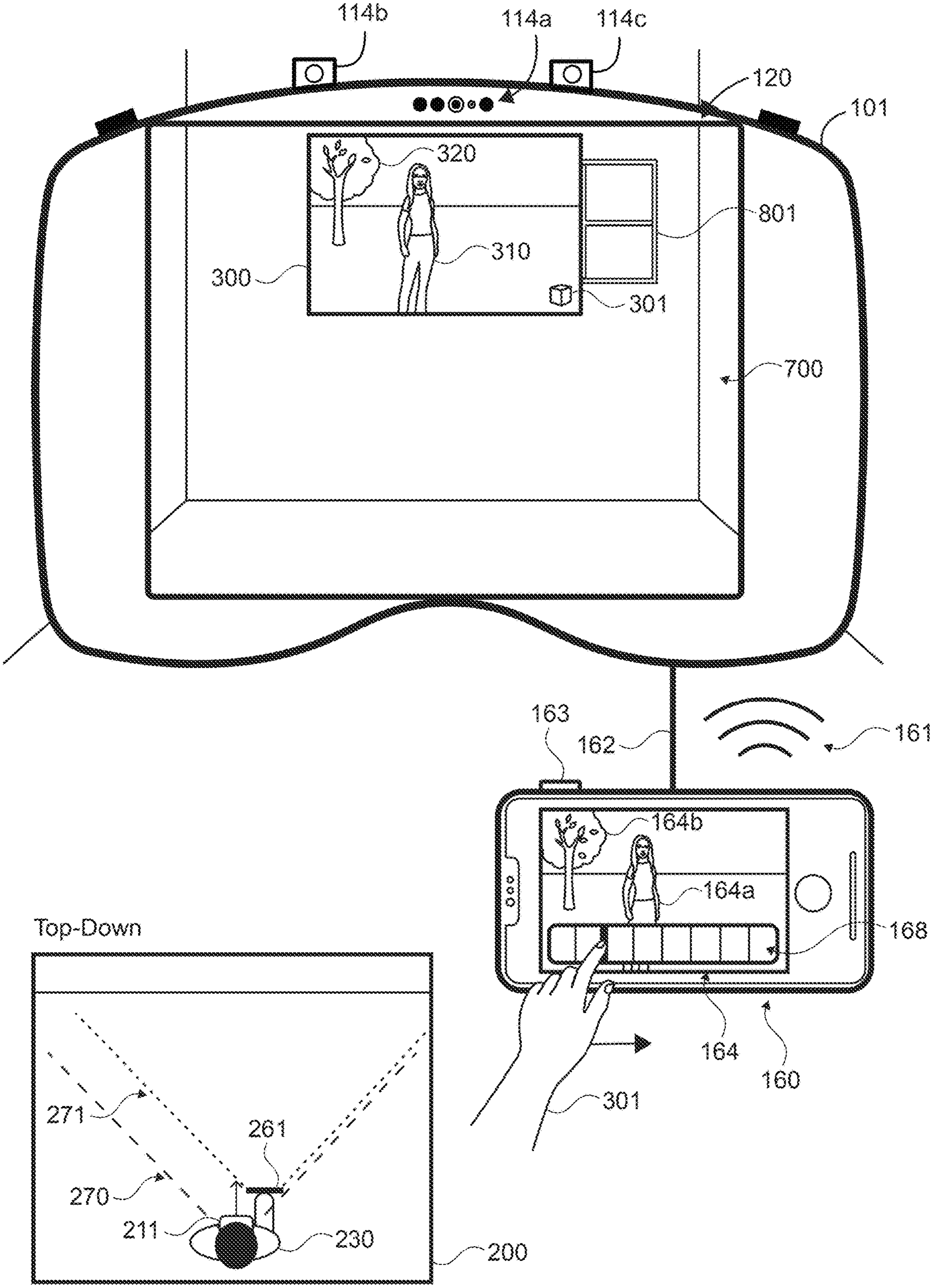

FIG. 4F illustrates an example of the electronic device 101 continuing to display the above discussed images (e.g., second three-dimensional environment 800, viewfinder 300), while the second electronic device 160 displays the image of the three-dimensional environment 700 and an image control user interface 168. In some examples, prior to FIG. 4F, the second electronic device 160 detects an input provided by hand 103 directed at one of the controls 361 through 365 (illustrated by FIG. 3I), and in response, displays the image control user interface 168 partially overlaying the image of the three-dimensional environment 700 at the display 164. This image controls user interface 168 (e.g., scrubber bar) is optionally configured to modify the time point at which the captured spatial image data is displayed as mentioned previously, such as updating the captured spatial image data from a first time point to a second time point. In some examples, as shown in FIG. 4F, the second electronic device 160 displays the image control user interface 168 as a bar (including a darkened bar indicating a point in time of the spatial image) in a lower portion of the display 164 configured to receive the input provided by hand 103. In some examples, the input provided by hand 103 corresponds to a swiping gesture directed at the darkened bar at the image control user interface 168 (illustrated by the right-facing arrow) triggering the second electronic device 160 to transmit a command to the electronic device 101 to update the spatial image data (viewed at viewfinder 300) from the first time point to the second time point discussed in further detail below.

Figure 4G:
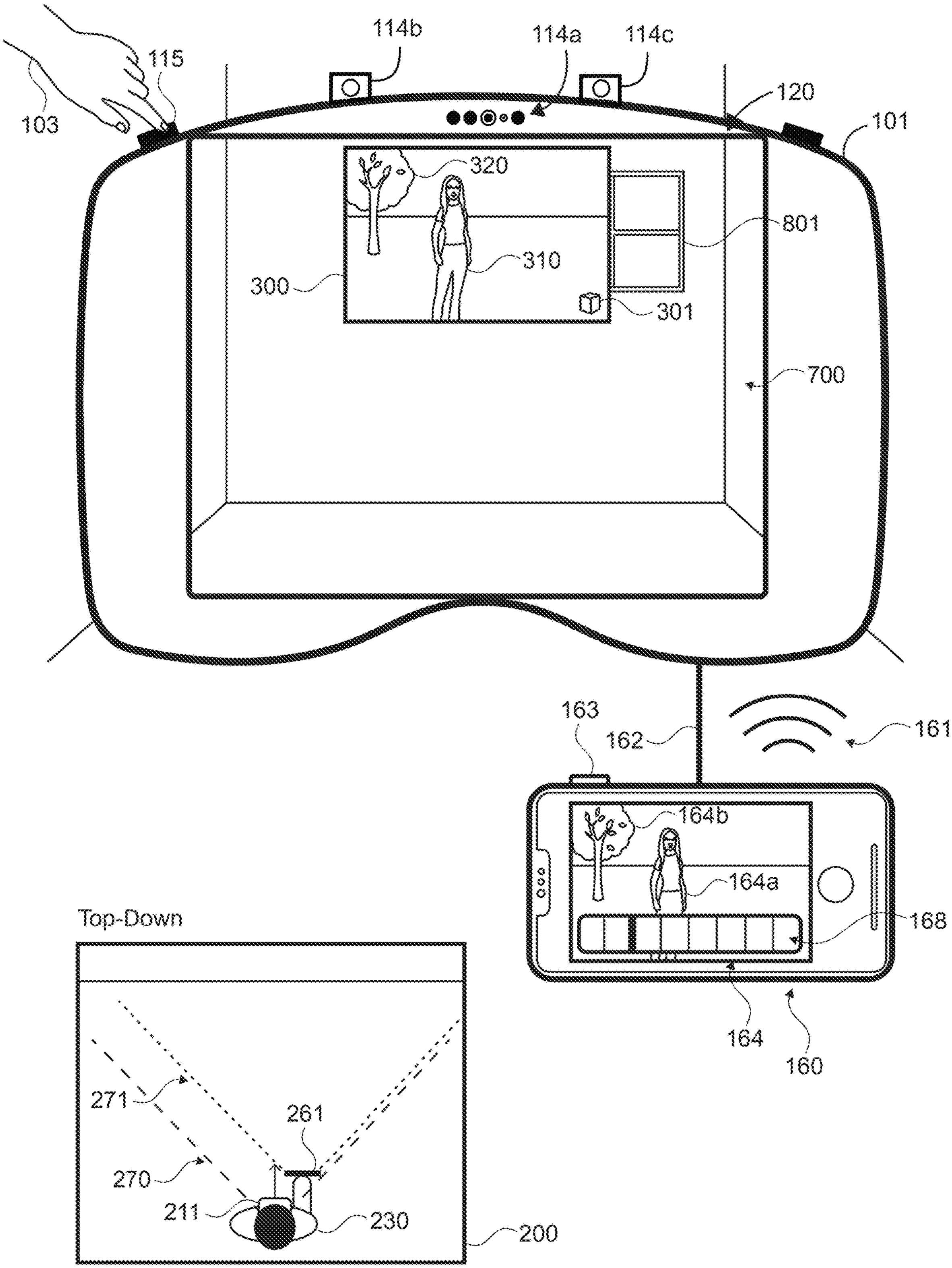

FIG. 4G illustrates an alternative example of updating the spatial image data from the first time point to the second time point as illustrated in FIG. 4F where the electronic device 101 detects the input provided by hand 103 at button 115 instead of the image control user interface 168. In some examples, the electronic device 101 and the second electronic device 160 behave in a similar manner as discussed above by FIG. 4F in response to the input provided by the hand 103. In some examples, the electronic device 101 transmits the input provided by the hand 103 according to a magnitude of the input detected by button 115 (e.g., scrolling gesture at the button 115) and in response, the second electronic device initiates updating the spatial image data from the first time point to the second time point as illustrated below by FIG. 4H.

Figure 4H:
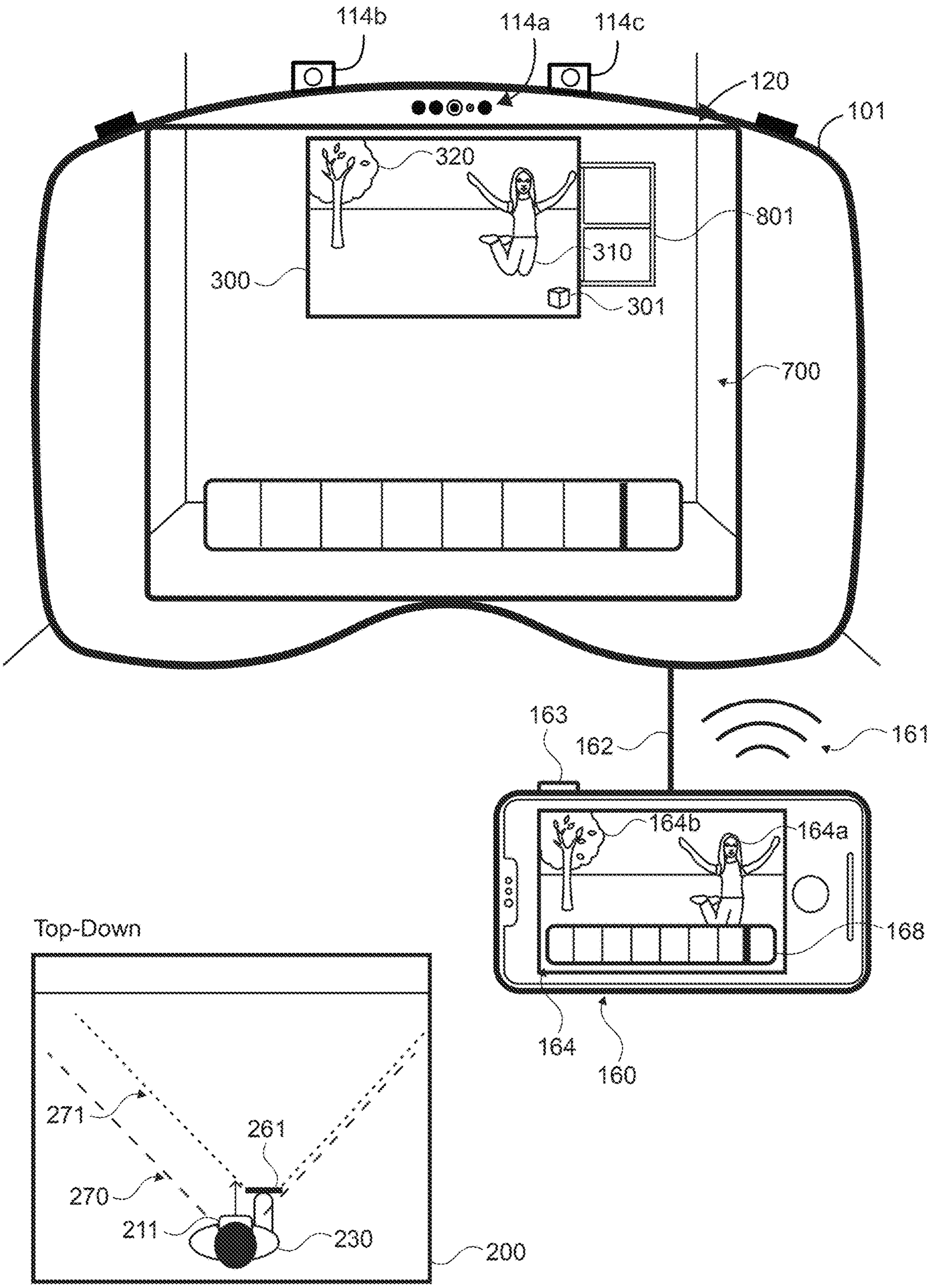

FIG. 4H illustrates an example of the electronic device 101 continuing to display the above discussed images (e.g., second three-dimensional environment 800, viewfinder 300), while the second electronic device 160 displays an updated image of the three-dimensional environment 700 (e.g., spatial image data) and the image control user interface 168. In some examples, in accordance with the input provided by the hand 103, the second electronic device 160 updates the display of the darkened bar at the image control user interface 168 from a left-side position (see FIG. 4F) to a right-side position, indicating that the spatial image data being displayed is at the second time point. In some examples, as shown by FIG. 4H, the second electronic device 160 updates the display 164 to display the darkened bar at the left-side position at the image control user interface 168 according to the direction of the input provided by hand 103 illustrated above by FIG. 4F. In some examples, the second electronic device 160 detects the input provided by hand 103 is at a position at the image control user interface 168 corresponding to the second point in time and in response, transmits the spatial image data (e.g., the three-dimensional environment 700) at the second time point to the electronic device 101. In some examples, as shown in FIG. 4H, the electronic device receives the spatial image data at the second time point, and while displaying the second three-dimensional environment 800, updates the viewfinder 300 to display the spatial image data at the second time point. In some examples, as shown by FIG. 4H, the updated spatial image data at the viewfinder 300 includes an updated spatial position of the person 710 (e.g., representation of the person 310) as a person jumping.

Figure 5:
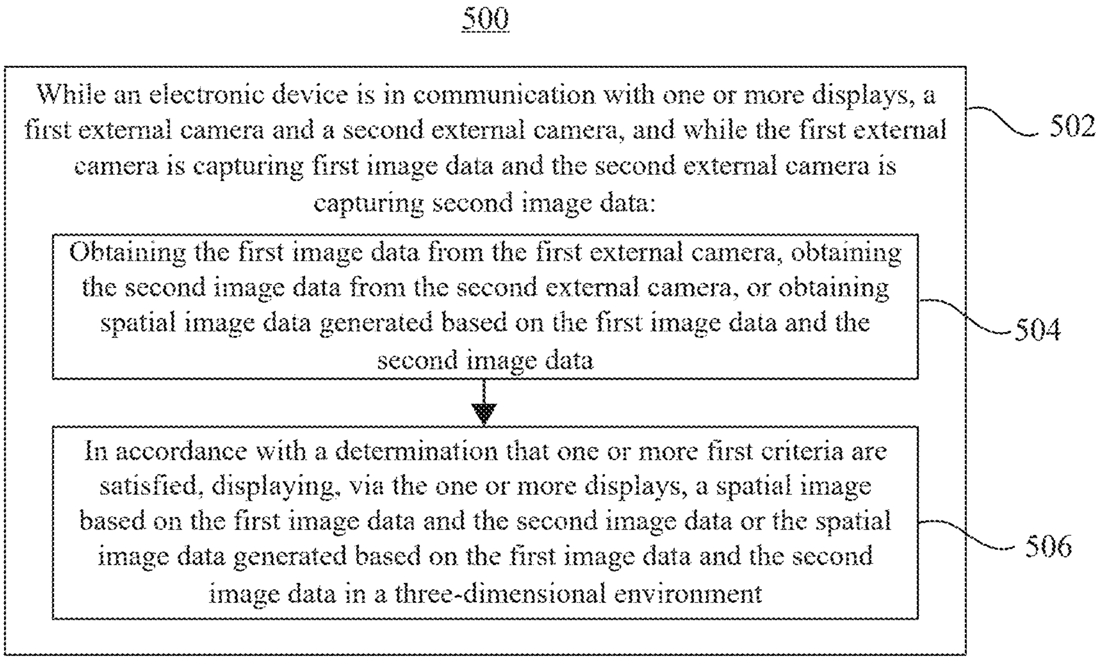
FIG. 5 is a flowchart illustrating an example method of displaying spatial images in a three-dimensional environment according to some examples of the disclosure.

FIG. 5 illustrates a flow diagram illustrating a method 500 for displaying the spatial image data obtained from the second electronic device 160 according to some examples of the disclosure. The method is optionally performed at any of the electronic devices described above with reference to FIGS. 1-4H. In some examples, performing the method 500 includes executing instructions stored using a non-transitory computer readable storage medium at an electronic device with one or more processors. Some operations in the method 500 are, optionally, combined and/or the order of some operations, is optionally changed.

In some examples, at block 502, in accordance with the method 500, involves a first electronic device (e.g., electronic device 101) in communication with a first external camera (e.g., first external camera 171) and a second external camera (e.g., second external camera 170) while the first external camera and the second external camera are capturing first image data (e.g., first image data 171*a*) and second image data (e.g., second image data 170*a*) respectively. In some examples, while the first external camera and the second external camera are capturing the first image data and the second image data, the first electronic device is additionally in communication with one or more displays corresponding to display 120 with reference to at least FIGS. 3A-4H as discussed above. In some examples, the first external camera is positioned to view the three-dimensional environment 700 from a first viewpoint. In some examples, the second external camera is positioned to view the three-dimensional environment 700 from a second viewpoint, different from the first viewpoint. In some examples, the first external camera and the second external camera are disposed at the second electronic device 160 as discussed above with reference to FIGS. 3A-4H.

In some examples, at block 504, in accordance with the method 500, involves obtaining the first image data (e.g., first image data 171*a*) and the second image data (e.g., second image data 170*a*), optionally with the second electronic device 160, according to some examples of the disclosure. In some examples, the second electronic device 160 obtains the first image data and the second image data and optionally transmits the first image data and the second image data to the first electronic device (e.g., electronic device 101) to obtain the spatial image data based on the first image data and the second image data. In some examples, the second electronic device 160 obtains the spatial image data based on the first image data and the second image data.

In some examples, at 506, method 500 determines that one or more first criteria are satisfied, and in response, displaying the spatial image at the first electronic device based according to some examples in the disclosure. In some examples, the first electronic device (e.g., electronic device 101) determines that the one or more first criteria are satisfied. In some examples, the second electronic device 160 determines that the one or more first criteria are satisfied. In some examples, the one or more first criteria are satisfied when the second electronic device 160 is in landscape mode as discussed above with reference to FIG. 3G. As discussed above at block 504, the second electronic device 160 optionally obtains the spatial image data based on the first image data and second image data. In this example, the one or more first criteria are optionally satisfied when the first electronic device detects a transmission of the spatial image data from the second electronic device 160.

It is understood that the method 500 is an example and that more, fewer, or different operations can be performed in the same or in a different order. Additionally, the operations in method 500 described above are, optionally, implemented by running one or more functional modules in an information processing apparatus such as general-purpose processors (e.g., as described with respect to FIGS. 2A-2B) or application specific chips, and/or by other components of FIG. 2A-2B.

Attention is now directed towards interactions capturing spatial images that are displayed in a three-dimensional environment presented at an electronic device (e.g., corresponding to electronic device 101 in FIG. 1). In some examples, spatial images of one or more physical objects in a physical environment are captured by a standalone camera (e.g., a consumer electronic camera or other mirrorless camera or external camera that is in communication with the electronic device and that includes a plurality of cameras (e.g., a stereo pair of cameras)), and transmitted for presentation at the electronic device 101. Due to the nature of displays typically included in standalone cameras (e.g., mirrorless cameras) and/or the absence of displays, standalone cameras are often unable to present spatial images using their respective two-dimensional display (e.g., without a depth component). Including the depth component of spatial images is most often achieved through the use of two or more displays, such as the displays provided at the electronic device 101. In the following examples, various configurations of presenting previews of and capturing spatial images in a portion of the field of view of a user of a head-mounted display (e.g., electronic device 101) are presented.

FIGS. 6A-6J illustrate examples of capturing spatial images in a three-dimensional environment at an electronic device that is in communication with a standalone camera according to some examples of the disclosure.

Figure 6A:
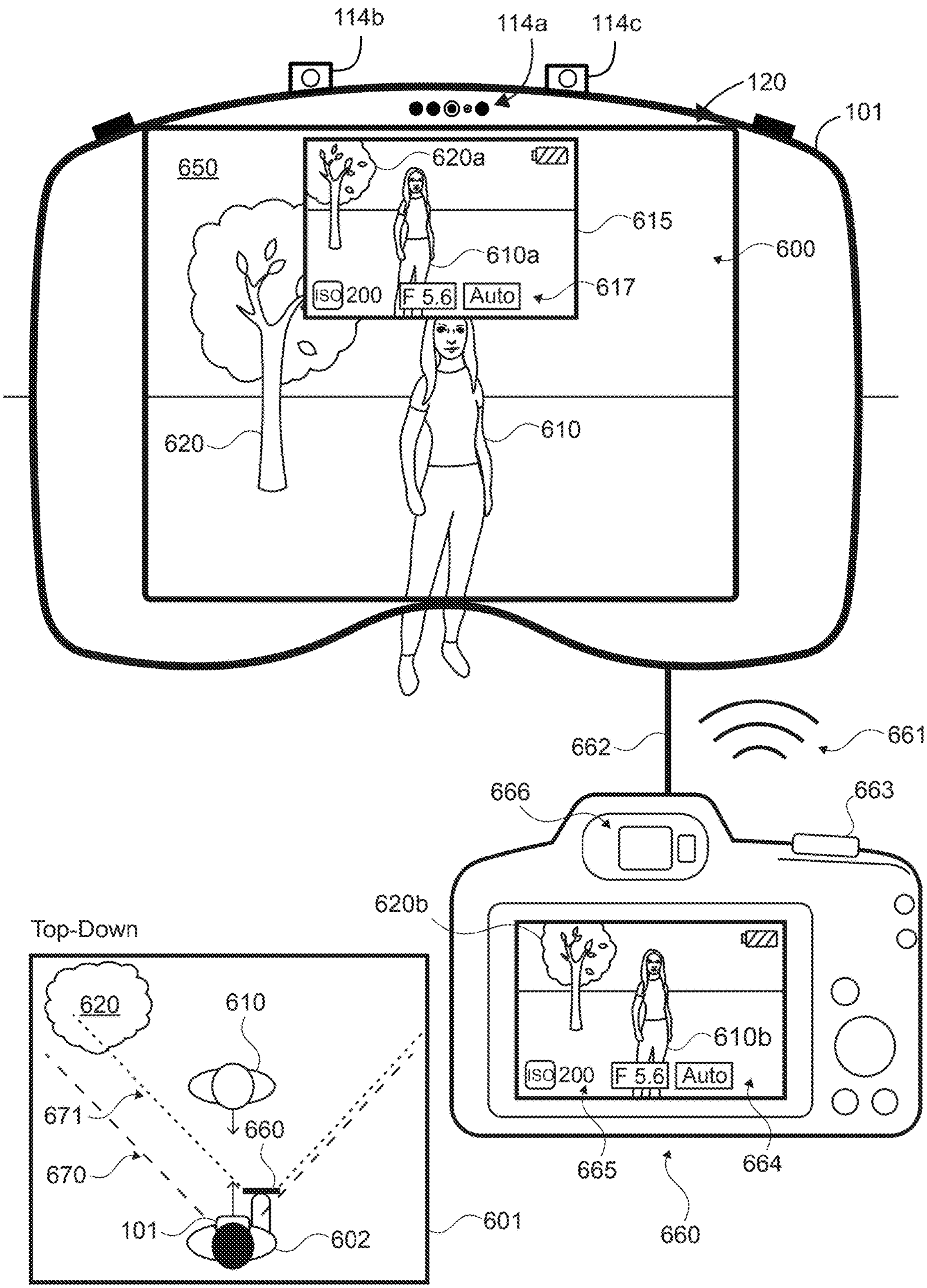
FIGS. 6A-6J illustrate examples of capturing spatial images in a three-dimensional environment at an electronic device that is in communication with a standalone camera according to some examples of the disclosure.

FIG. 6A illustrates an example of the electronic device 101 presenting a three-dimensional environment 650 from a first viewpoint including a plurality of objects corresponding to physical objects within a physical environment 600 (e.g., the physical environment discussed above with reference to FIGS. 3A-3K) while in communication with standalone camera 660 (e.g., a mirrorless camera or other consumer electronic camera). In some examples, as shown in FIG. 6A, the electronic device 101 and the standalone camera 660 are in wireless communication 661 and/or wired communication 662. In some examples, the wireless communication 661 optionally corresponds to a Bluetooth connection, cellular broad band, Wi-Fi, or radio connection. In some examples, both electronic device 101 and the standalone camera 660 include one or more outward facing cameras that view a common physical scene (e.g., portions of the physical environment 600). In some examples, electronic device 101 displays and/or presents portions of the physical scene taken by the outward facing cameras (e.g., corresponding to external image sensors 114*b* and 114*c* in FIG. 6A) of the electronic device 101 on display 120 (e.g., in three-dimensional environment 650). Similarly, the standalone camera 660 optionally displays portions of the physical scene captured from one or more outward facing cameras of the standalone camera 660 on display 664, as shown in FIG. 6A.

In some examples, as shown in the top-down view 601, the outward facing cameras that are disposed at the standalone camera 660 include a field of view 671 projected outward in the same direction as field of view 670 corresponding to a field of view of the electronic device 101 in FIG. 6A. In some examples, the field of view 671 and the field of view 670 overlap according to the orientation of the standalone camera 660 but are not necessarily the same fields of view as discussed in further detail below.

In some examples, as shown in FIG. 6A, the standalone camera 660 includes button 663 (e.g., a hardware button or element) optionally configured to receive a user input, such as a click or press. In some examples, the standalone camera 660 includes the display 664 configured to display a representation (e.g., two-dimensional representation) of the three-dimensional environment 600 presented at the electronic device 101 from a second viewpoint, different from the first viewpoint of the electronic device 101 (e.g., where the difference in viewpoints being attributed to the fact that the cameras of electronic device 101 and the standalone camera 660 are in different positions and/or orientations relative to the common physical scene the cameras are capturing image data from). Additionally, in some examples, the standalone camera 660 includes viewfinder 666.

In some examples, as shown in FIG. 6A, the representation of the physical environment 600 displayed on the display 664 includes a representation of a person 610*b* and a representation of a tree 620*b*. In some examples, the aforementioned representations correspond to physical objects within the physical environment 600 that are included in the three-dimensional environment 600 as discussed in further detail below. In some examples, the standalone camera 660 obtains the representation of the physical environment 600 from one or more external lenses (not shown) of the standalone camera 660. In some examples, the representation of the physical environment 600 corresponds to a live-video feed of the physical environment 600, which is optionally updated according to updates in the physical environment 600 and/or updates in the second viewpoint of the standalone camera 660 as discussed in further detail below. In some examples, as shown in FIG. 6A, the standalone camera 660 displays the representation of the physical environment 600 in a same or similar manner in which the electronic device 101 displays the three-dimensional environment 650. In some examples, as shown in FIG. 6A, the display 664 is also displaying information 665 (e.g., overlaid on and/or below the representations of the person 610*b* and the tree 620*b*). For example, as illustrated in FIG. 6A, the display 664 includes image capture information and/or camera operation information, such as an indication of a battery power of the standalone camera 660, aperture setting, focus mode, shutter speed, brightness setting, and the like.

In some examples, as shown in FIG. 6A, the electronic device 101 is displaying or presenting the plurality of objects (discussed above) including person 610 and the tree 620 that are in the field of view of the electronic device 101 in the three-dimensional environment 600. For example, as shown in FIG. 6A, the three-dimensional environment 650 includes a representation of (e.g., a computer-generated representation or passthrough representation of) the person 610 that is positioned centrally within the field of view of the electronic device 101 and a representation of the tree 620 that is positioned in a left portion within the field of view of the electronic device 101 from the first viewpoint of the electronic device 101. In some examples, the plurality of physical objects corresponds to the representation of the person 610*b* and the representation of the tree 620*b* displayed on the display 664 of the standalone camera 660. However, as illustrated in FIG. 6A and as described in more detail below, the view of the person 610 and the tree 620 in the three-dimensional environment 600 at the electronic device 101 is optionally different from the view of the representation of the person 610*b* and the representation of the tree 620*b* on the display 664 at the standalone camera 660 due to the different viewpoints of the electronic device 101 and the standalone camera 660. For example, as shown in FIG. 6A, the display 120 optionally includes a whole or entire portion of the tree 620, whereas the display 664 of the standalone camera 660 includes a partially clipped or cut-off portion of the tree 620, as indicated by the representation of the tree 620*b*.

In some examples, as shown by the top-down view 601 in FIG. 6A, the user 602 of the electronic device 101 is directly facing the person 610 in the physical environment 600. For example, as shown by the top-down view 601, the person 610 (e.g., corresponding to the person 610 in the three-dimensional environment 650 and/or representation of the person 610*b* on the display 664) is located in a center of the field of view 670 of the electronic device 101. In some examples, the field of view 670 corresponds to the three-dimensional environment 650 at the display 120. In some examples, as shown in the top-down view 601, the tree 620 is located further from the user 602 relative to the location of the user 602 and/or electronic device 101 in the physical environment 600. In some examples, as illustrated in FIG. 6A, user 602 positions (e.g., holds) the standalone camera 660 such that the standalone camera 660 is not visible in the field of view of the electronic device 101 and therefore is not included within the three-dimensional environment 650 (e.g., the standalone camera 660 is being held low enough to be outside of the field of view of electronic device 101).

In some examples, as discussed above, the display 664 of the standalone camera 660 is a two-dimensional display (lacking multiple displays) and is therefore unable to display the image data captured by the one or more cameras of the standalone camera 660 as a spatial image. Accordingly, in some examples, while the standalone camera 660 is in communication with the electronic device 101, the standalone camera 660 transmits the image data to the electronic device 101 to be displayed by the display 120 of the electronic device 101 (e.g., display 120 including virtual viewfinder 615) as discussed in further detail below.

In some examples, as shown in FIG. 6A, the electronic device 101 is displaying, via the display 120, virtual viewfinder 615 in the three-dimensional environment 650. For example, as illustrated in FIG. 6A, the electronic device 101 is displaying the virtual viewfinder (e.g., as a virtual window or similar user interface element that is displayed in a head-locked orientation) overlaid on the portions of the physical environment 600 that are visible in and/or represented in the three-dimensional environment 650. Particularly, in some examples, as mentioned above, the standalone camera 660 transmits the image data captured by the one or more cameras of the standalone camera 660 to the electronic device 101, which the electronic device 101 utilizes to generate and display the virtual viewfinder 615 on the display 120. In some examples, the electronic device 101 is displaying the virtual viewfinder 615 in response to a user input for displaying the virtual viewfinder 615 (e.g., previously) detected by the electronic device 101 while the electronic device 101 is displaying the three-dimensional environment 650, such as the launching of a particular application associated with the standalone camera 660 on the electronic device 101. In some examples, the electronic device 101 is displaying the virtual viewfinder 615 on the display 120 (e.g., automatically) in response to detecting an establishing of the communication (e.g., the wireless communication 661 or the wired communication 662) between the electronic device 101 and the standalone camera 660.

In some examples, as discussed above, the standalone camera 660 includes only a two-dimensional display (e.g., display 664) and thus cannot include the depth information associated with the image data captured by the one or more cameras of the standalone camera 660. To display the depth information associated with the image data, a plurality of displays is optionally required, such as the displays (e.g., including display 120) provided at the electronic device 101. As a result, in response to the one or more cameras of the standalone camera 660 capturing the image data corresponding to the physical environment 600, the standalone camera 660 transmits the image data that includes spatial image data to the electronic device 101, which is utilized to generate and display the virtual viewfinder 615 in FIG. 6A. In some examples, the virtual viewfinder 615 includes and/or corresponds to a spatial image of the (e.g., two-dimensional) image displayed on the display 664 of the standalone camera 660. For example, in FIG. 6A, the virtual viewfinder 615 includes and/or corresponds to an image that includes depth information. In some examples, as shown in FIG. 6A, the virtual viewfinder 615 includes a representation of the physical environment 600 as captured from a perspective of (e.g., the second viewpoint discussed above) the standalone camera 660. For example, as shown in FIG. 6A, the virtual viewfinder 615 includes a representation of the person 610*a* and a representation of the tree 620*a* that correspond to the person 610 and the tree 620 in the physical environment 600. In some examples, the spatial image data at the virtual viewfinder 615 corresponds to a live-video feed of the physical environment 600 (e.g., as captured by the one or more cameras of the standalone camera 660). For example, as indicated in FIG. 6A, the image provided in the virtual viewfinder 615 is the same as or is similar to the image displayed on the display 664 of the standalone camera 660. Accordingly, in some examples, the virtual viewfinder 615 displayed at the electronic device 101 provides a virtual representation of the physical environment 600 that would be viewable through the physical viewfinder 666 of the standalone camera 660 from the second viewpoint of the standalone camera 660, without requiring the user to physically look through the physical viewfinder 666, which improves user interaction and operation of the standalone camera 660, as one advantage. Additionally, in some examples, as illustrated in FIG. 6A, the virtual viewfinder 615 includes or is displayed with information 617 corresponding to the information 665 that is displayed on or is configured to be displayed on the display 664 of the standalone camera 660. It should be noted that the location of the virtual viewfinder 615 illustrated in FIG. 6A is not necessarily restricted to what is presented in the following figures and should be taken as examples for possible locations of the virtual viewfinder 615 on the display 120.

Figure 6B:
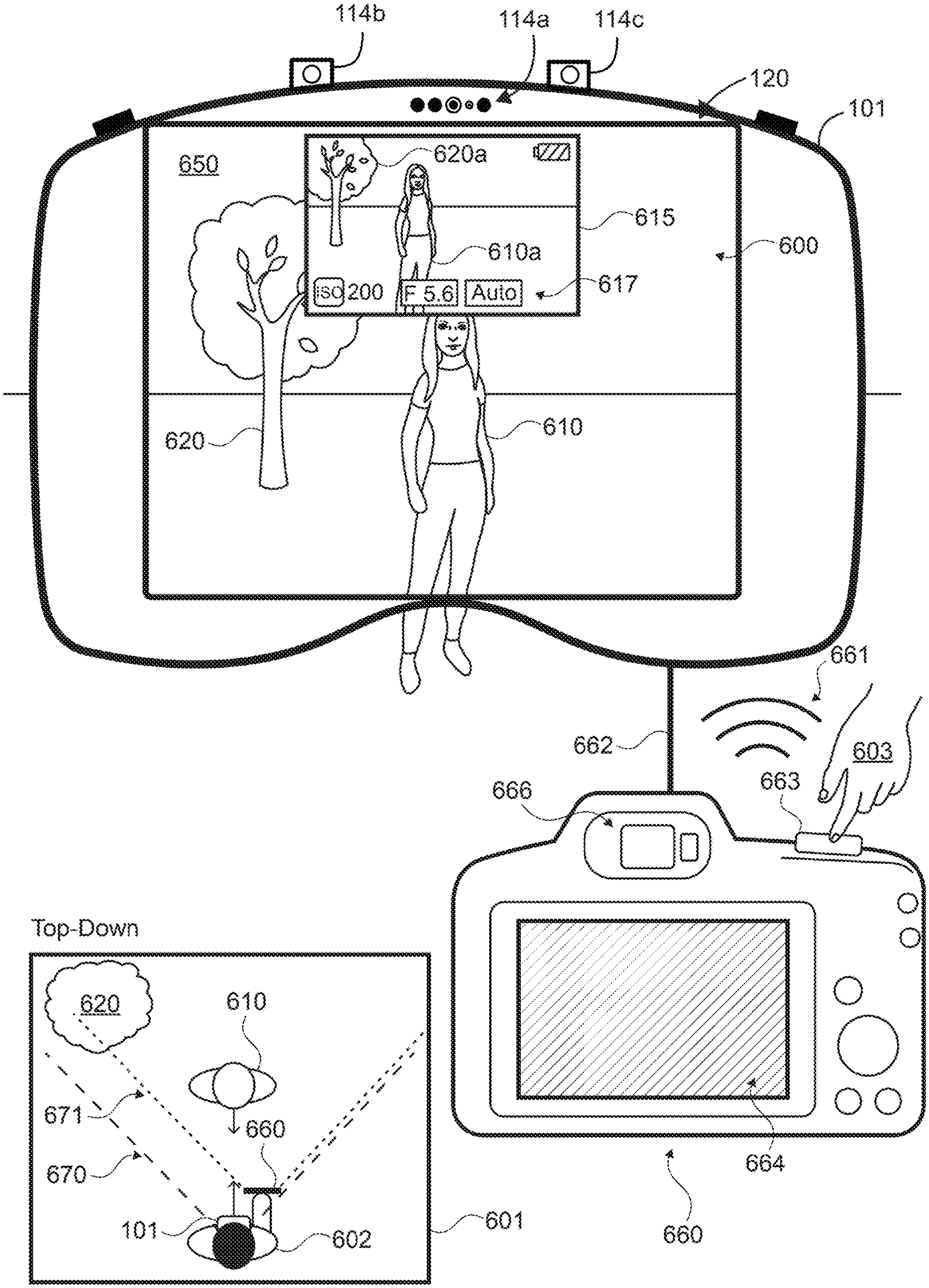

In some examples, while the virtual viewfinder 615 is displayed on the display 120 of the electronic device 101, the display 664 of the standalone camera 660 is optionally off or is set in a low power mode or state. For example, as shown in FIG. 6B, while the standalone camera 660 is in communication with the electronic device 101 and while the electronic device 101 is displaying the virtual viewfinder 615, the display 664 is not displaying the image illustrated in the virtual viewfinder 615. In some examples, the standalone camera 660 remains powered on despite the display 664 being powered off or being set in the low power mode or state (e.g., to enable the standalone camera 660 to continue to receive user input, such as user input for capturing one or more images, as discussed in more detail below). In some examples, the standalone camera 660 turns off or powers down the display 664 in response to receiving data or other instructions or commands from the electronic device 101 for turning off or powering down the display 664. Causing the standalone camera 660 to power down the display 664 while the virtual viewfinder 615 is provided on the display 120 of the electronic device 101 helps conserve power and battery life of the standalone camera and/or helps avoid duplicate display of information (e.g., particularly the image provided in the virtual viewfinder 615), which could otherwise be distracting for the user 602 when using the electronic device 101 and/or the standalone camera 660, as one benefit.

In some examples, the user 602 is able to provide user input directed to the standalone camera 660 for capturing one or more images, such as spatial images, while using the virtual viewfinder 615 presented at the electronic device 101 as a visual guide in the three-dimensional environment 650. For example, as illustrated in FIG. 6B, while the electronic device 101 is displaying the virtual viewfinder 615, the standalone camera 660 detects an input corresponding to a request to capture a first spatial image, such as a selection of (e.g., press or push of) capture button 663 provided by the hand 603 of the user 602.

Figure 6C:
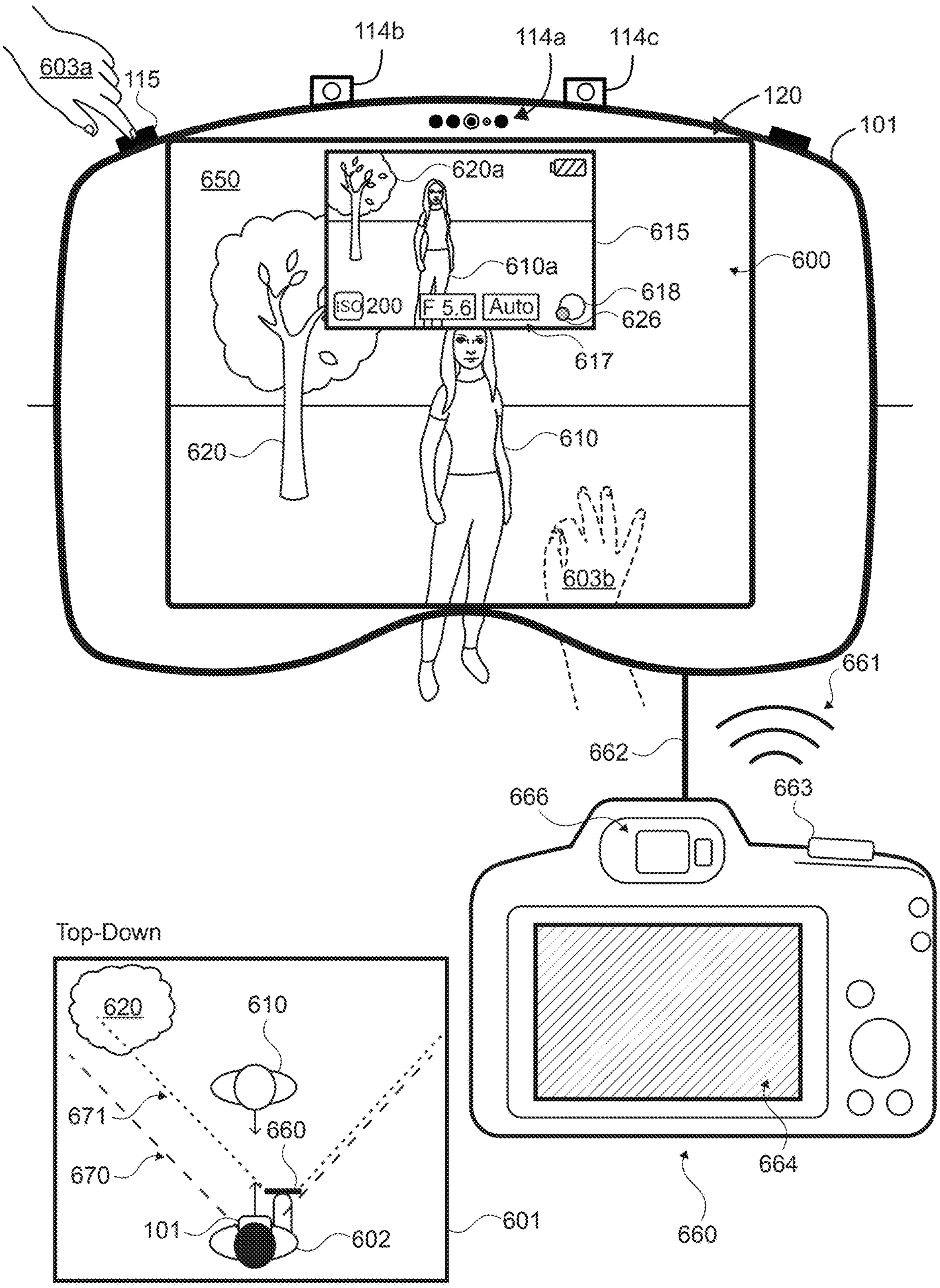

Additionally or alternatively, in some examples, the user 602 is able to provide user input to the electronic device 101 for capturing one or more images, such as spatial images, while using the virtual viewfinder 615 presented at the electronic device 101 as a visual guide in the three-dimensional environment 650. For example, as shown in FIG. 6C, while the electronic device 101 is displaying the virtual viewfinder 615, the electronic device 101 detects an input corresponding to a request to capture a first spatial image. In some examples, the input includes a selection of (e.g., press or push of) a hardware element or button of the electronic device 101. For example, in FIG. 6C, the electronic device 101 detects a selection of hardware button 115 of the electronic device 101 provided by hand 603*a* of the user 602 corresponding to a request to cause the standalone camera 660 to capture a spatial image corresponding to the view provided in the virtual viewfinder 615. As another example, the input alternatively includes a selection of a selectable option (e.g., a virtual button or element) that is displayed with the virtual viewfinder 615 in the three-dimensional environment 650. For example, as shown in FIG. 6C, the electronic device 101 detects a selection of virtual capture option 618 that is displayed with (e.g., overlaid on) the virtual viewfinder 615 in the three-dimensional environment 650, such as via an air pinch gesture performed by hand 603*b* of the user 602, optionally while gaze 626 of the user 602 is directed to the virtual capture option 618 in the three-dimensional environment 650.

In some examples, in response to the user input described above provided by the user 602 in FIG. 6B or FIG. 6C, the standalone camera 660 initiates capturing image data corresponding to a spatial image (e.g., the first spatial image discussed above). In some examples, while and/or during the capturing of the image data corresponding to the spatial image, the standalone camera displays a visual indication (e.g., on the display 664) indicating that the standalone camera 660 are capturing the image data, as similarly shown previously in FIG. 3C by the display of recording indication 166 at the second electronic device 160. In some examples, when and/or after the image data is captured by the standalone camera 660, the electronic device 101 receives the image data from the standalone camera 660 (e.g., transmitted by the standalone camera 660), such as via the wireless communication 661 and/or wired communication 662 in FIG. 6D.

Figure 6D:
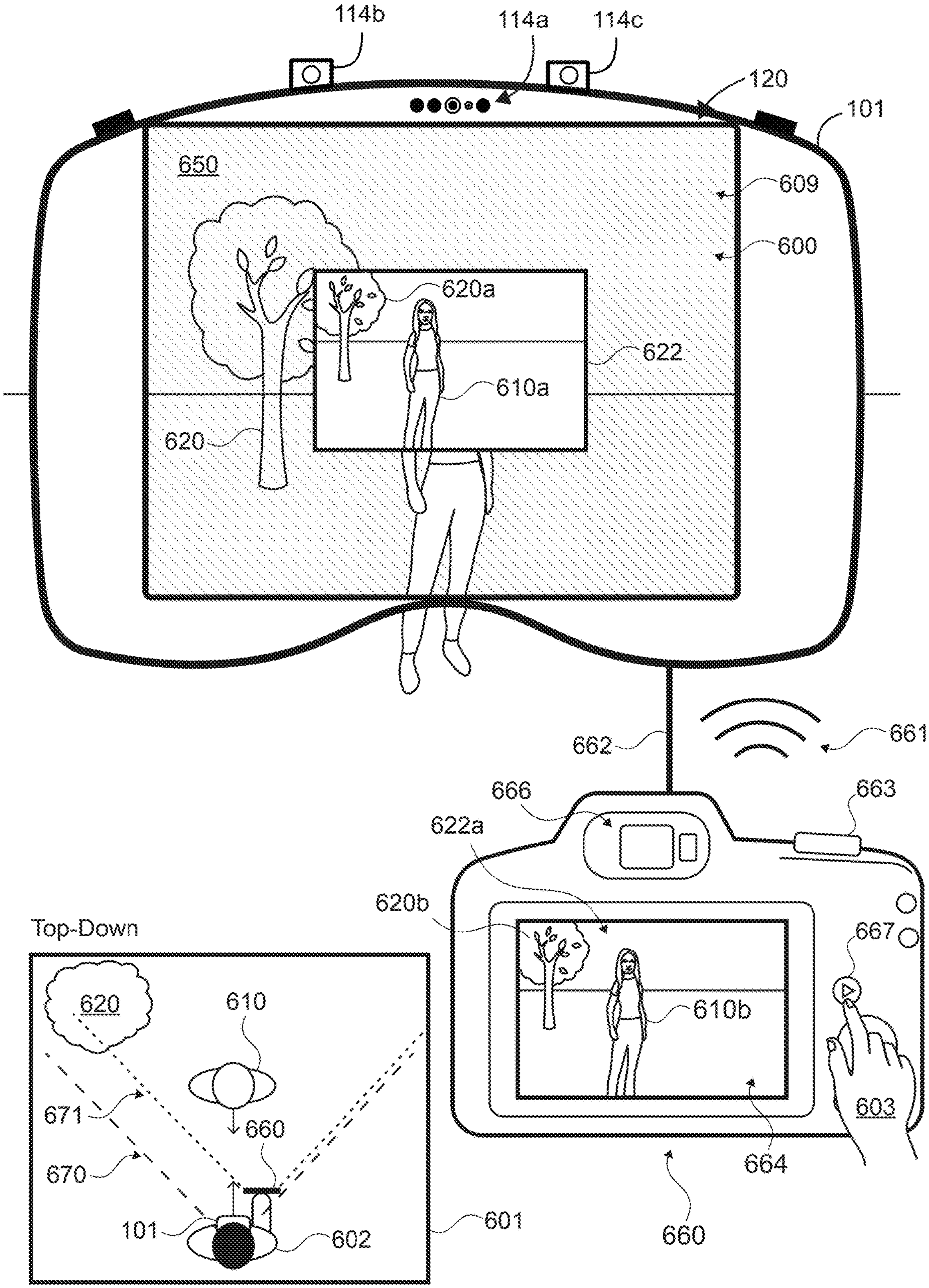
Figure 6E:
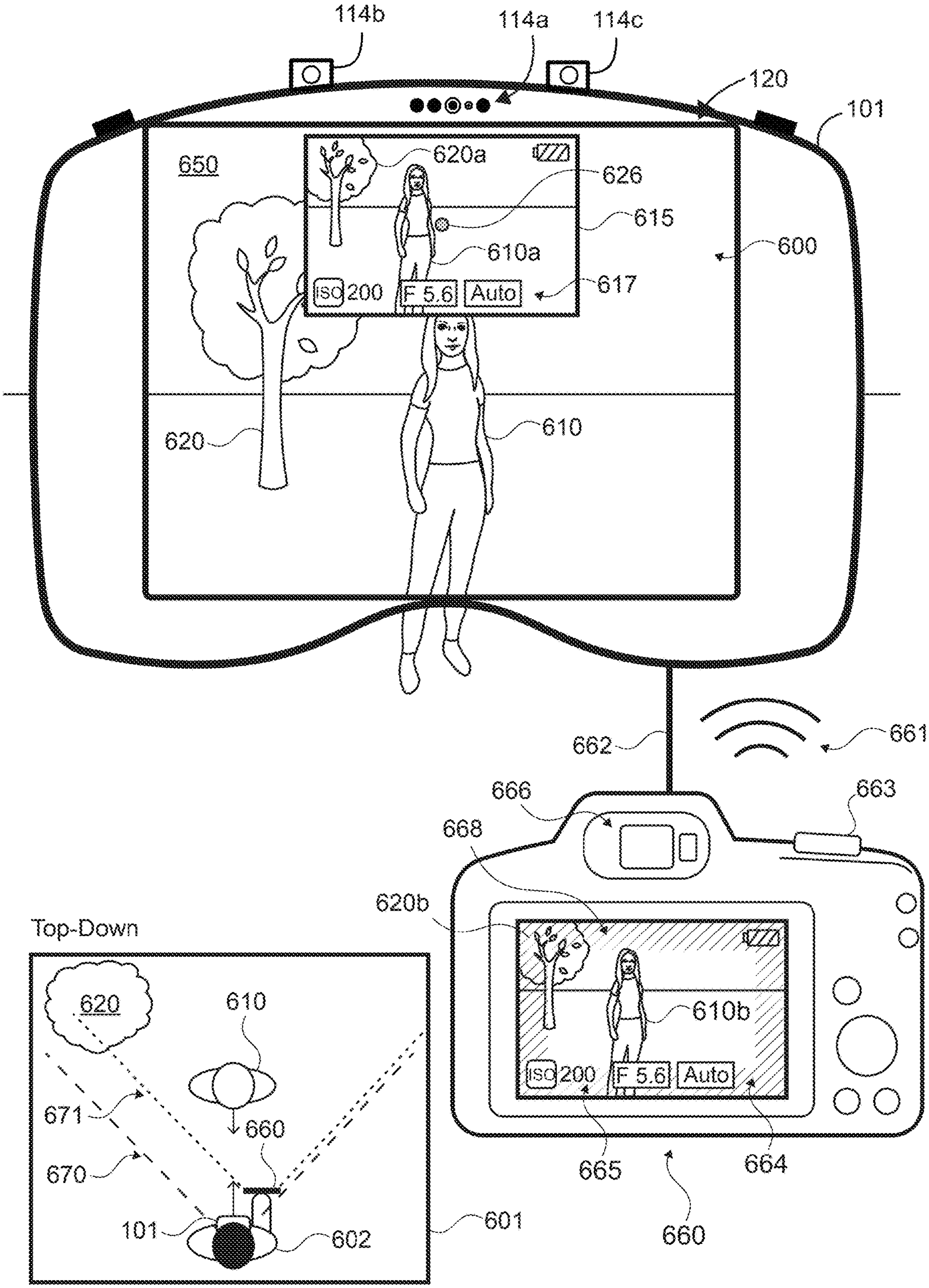
Figure 6F:
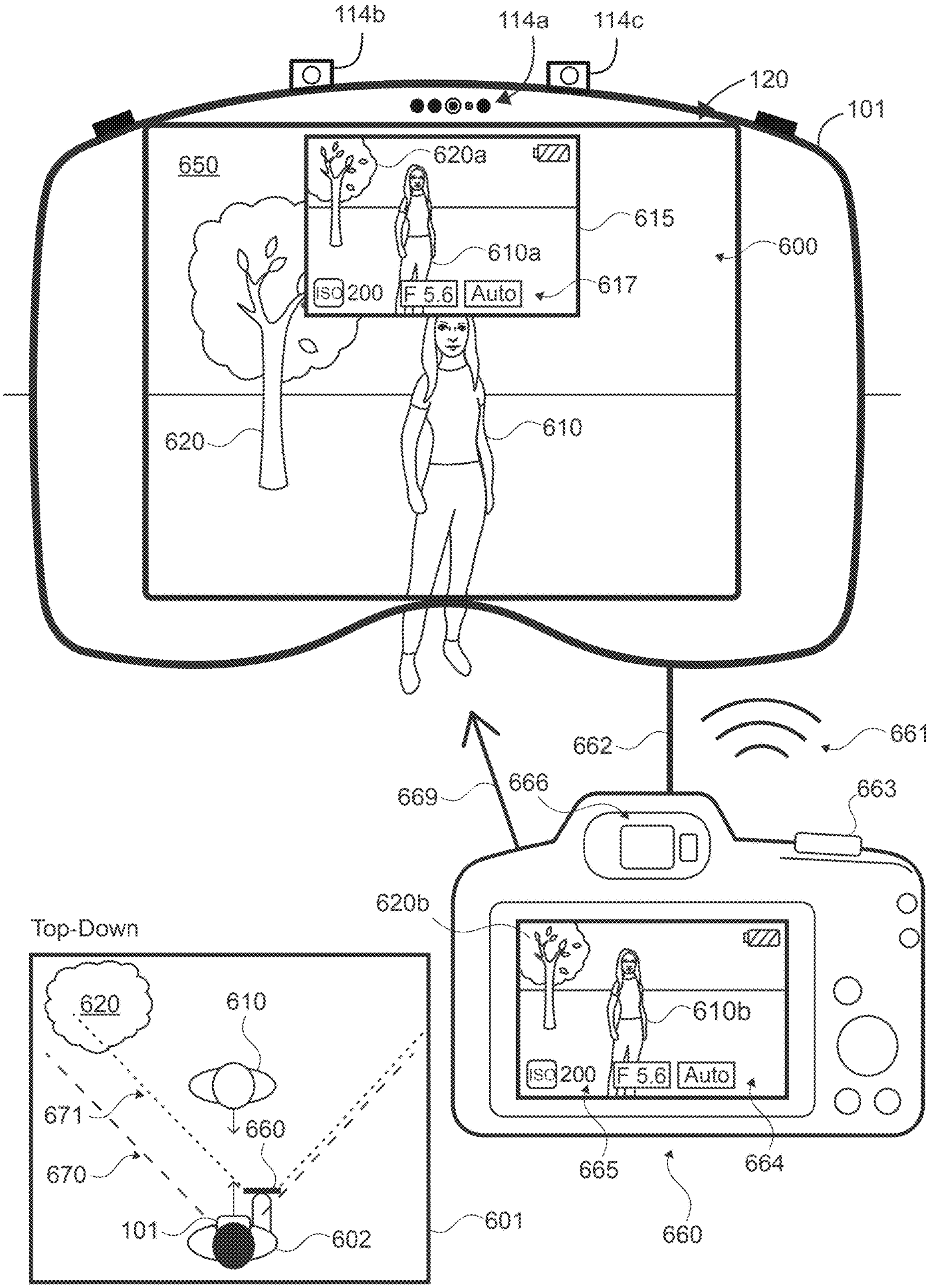

In some examples, as shown in FIG. 6D, in response to receiving the image data from the standalone camera 660, the electronic device 101 (e.g., automatically) displays spatial image 622 corresponding to and/or using the image data captured by the standalone camera 660. In some examples, as shown in FIG. 6D, the electronic device 101 displays the spatial image 622 in place of the viewfinder 615 at the display 120. For example, in FIG. 6D, the electronic device 101 ceases display of the virtual viewfinder 615 in the three-dimensional environment 650 when displaying the spatial image 622. In some examples, as shown in FIG. 6D, the electronic device 101 displays the spatial image 622 at a predetermined location on the display 120, such as a location corresponding to a center of the field of view of the electronic device 101. Additionally or alternatively, in some examples, the electronic device 101 displays the spatial image 622 in response to receiving an indication from the standalone camera 660 of a request to preview (e.g., display) the spatial image 622 on the electronic device 101. For example, as shown in FIG. 6D, the standalone camera 660 has detected a selection of (e.g., push or press on) play button 667 of the standalone camera 660 provided by hand 603 of the user 602, which causes the standalone camera 660 to display image 622*a* (e.g., corresponding to the spatial image 622) on the display 664 and transmit data or other instructions to the electronic device 101 for displaying the spatial image 622 in the three-dimensional environment 650. In some examples, as illustrated in FIG. 6D, the spatial image 622 corresponds to the view of the virtual viewfinder 615 illustrated in FIGS. 6B-6C when the input provided by the user 602 was detected. For example, in FIG. 6D, the spatial image 622 includes the representation of the person 610*a* and the representation of the tree 620*a*, which were previously included in the virtual viewfinder 615 in the three-dimensional environment 650 (e.g., in accordance with the second viewpoint of the standalone camera 660 as discussed above).

In some examples, as shown in FIG. 6D, when the spatial image 622 is displayed in the three-dimensional environment 650, the electronic device 101 applies visual effect 609 to at least a portion of the three-dimensional environment 650 that surrounds the spatial image 622. For example, as indicated in FIG. 6D, the electronic device 101 displays and/or applies a dimming, tinting, blurring, or other visual treatment to the passthrough of the physical environment 600 (e.g., including the person 610 and/or the tree 620) that is included in the three-dimensional environment 650 and that surrounds the spatial image 622, such that a visual prominence of the passthrough of the physical environment 600 is reduced relative to the spatial image 622. In some examples, the electronic device 101 applies the visual effect 609 to the at least the portion of the three-dimensional environment 650 to draw the attention of the user 602 to the spatial image 622 that is being displayed in the three-dimensional environment 650 and/or to facilitate clear and focused visibility of the content of the spatial image 622 for the user 602, as one benefit.

In some examples, a focus associated with capturing one or more spatial images at the standalone camera 660 (e.g., a focus point within a respective image that is being captured) is able to be controlled and/or adjusted based on input detected by the electronic device 101. Particularly, in some examples, a focus of the standalone camera 660 is able to be adjusted in response to gaze-based input directed to the virtual viewfinder 615 in the three-dimensional environment 650. For example, in FIG. 6E, the electronic device 101 detects the gaze 626 of the user 602 is directed to a respective location within the virtual viewfinder 615 in the three-dimensional environment 650, such as a center of the virtual viewfinder 615 in the three-dimensional environment 650. In some examples, the electronic device 101 detects the gaze 626 of the user 602 is directed to the respective location within the virtual viewfinder 615 for at least a threshold amount of time, such as for 1, 1.5, 2, 3, 4, 5, 10, etc. seconds.

In some examples, in response to detecting the gaze 626 of the user 602 directed to the respective location within the virtual viewfinder 615, the electronic device 101 transmits data or other instructions to the standalone camera 660 that causes the standalone camera 660 to adjust a lens of the standalone camera 660 to update the focus of the standalone camera 660 in accordance with the gaze-based input. For example, in FIG. 6E, the electronic device 101 transmits instructions (e.g., via the wireless communication 661 or the wired communication 662) to the standalone camera 660 for adjusting the camera lens to adjust the focus of the standalone camera 660 on a center point of the field of view of the standalone camera 660, as illustrated by focus 668 on the display 664.

In some examples, movement of the standalone camera 660 relative to the first viewpoint of the electronic device 101 can cause the electronic device 101 to selectively update display of the virtual viewfinder 615 in the three-dimensional environment 650. For example, in FIG. 6F, the electronic device 101 detects an indication of movement of the standalone camera 660 (e.g., in the physical environment 600) relative to the first viewpoint of the electronic device 101, such as in a direction that is toward the first viewpoint of the electronic device 101 and/or toward the field of view of the electronic device 101 as indicated by arrow 669. In some examples, detecting the indication of the movement of the standalone camera 660 includes detecting data, from the standalone camera 660 (e.g., transmitted via the wireless communication 661 or the wired communication 662), informing the electronic device 101 of the movement of the standalone camera 660. In some examples, detecting the indication of the movement of the standalone camera 660 includes detecting, via one or more input devices in communication with the electronic device 101 (e.g., image sensors, cameras, or other motion sensors), that the standalone camera 660 is physically being moved relative to the first viewpoint of the electronic device 101. As similarly discussed previously above and as illustrated in FIG. 6F, the electronic device 101 detects the indication of the movement of the standalone camera 660 while the standalone camera 660 is outside of the field of view of the electronic device 101.

Figure 6G:
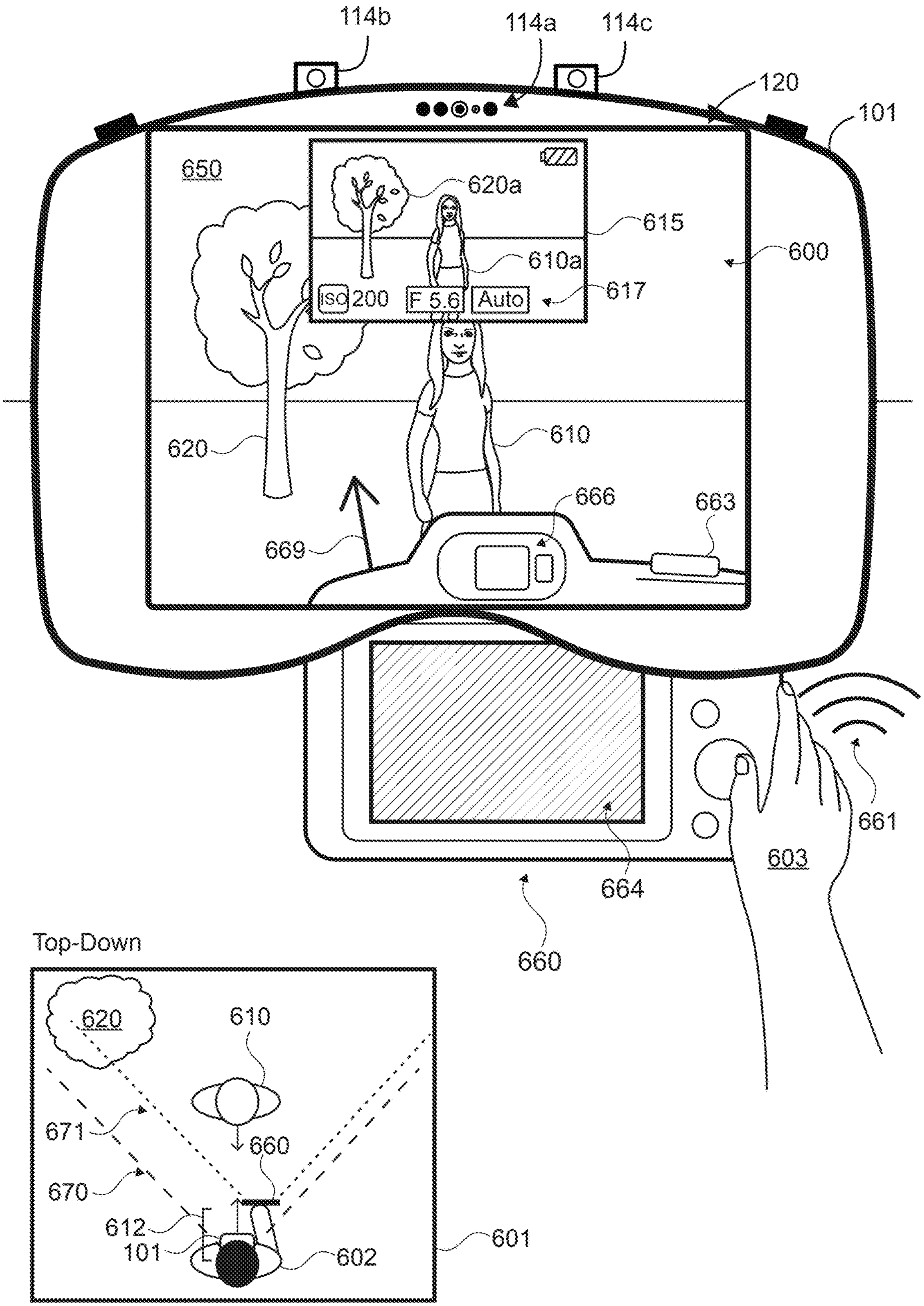

In some examples, as illustrated in FIG. 6G, in response to and/or while detecting the indication of the movement of the standalone camera 660 relative to the first viewpoint of the electronic device 101, the electronic device 101 updates display of the virtual viewfinder 615 in the three-dimensional environment 650. Particularly, as illustrated in FIG. 6G, the movement of the standalone camera 660 (e.g., by the hand 603 of the user 602 that is holding the standalone camera 660) in the physical environment 600 causes the second viewpoint of the standalone camera 660 to change. For example, in FIG. 6G, the standalone camera 660 has an updated second viewpoint (e.g., a third viewpoint) in the physical environment 600, such that a view of the physical environment 600 changes in accordance with an updated position of the standalone camera 660. As such, in some examples, the image data being transmitted to the electronic device 101 is updated in accordance with the updated second viewpoint of the standalone camera 660 in the physical environment 600, which causes the spatial image being displayed in the virtual viewfinder 615 to be updated accordingly in the three-dimensional environment 650 at the electronic device 101. For example, as shown in FIG. 6G, the locations of the representation of the person **610*a* and the representation of the tree 620*a* are updated (e.g., shifted) within the virtual viewfinder 615 in the three-dimensional environment 650 in accordance with the updated image data received from the standalone camera 660, which corresponds to the updated second viewpoint of the standalone camera 660 and the image data currently being captured by the standalone camera 660**.

Additionally or alternatively to the spatial image within the virtual viewfinder 615 being updated in the three-dimensional environment 650 when detecting the indication of the movement of the standalone camera 660, in some examples, the electronic device 101 ceases display of the virtual viewfinder 615 in the three-dimensional environment 650 altogether in accordance with a determination that the indication of the movement of the standalone camera 660 causes one or more criteria to be satisfied. In some examples, the one or more criteria for causing the electronic device 101 to cease displaying the virtual viewfinder in the three-dimensional environment 650 includes a criterion that is satisfied when the movement of the standalone camera 660 causes the display 664 to become visible in the field of view of the electronic device 101 from the first viewpoint of the electronic device 101. In FIG. 6G, the display 664 is not currently located within the field of view of the electronic device 101, such that the display 664 is not visible in the three-dimensional environment 650 from the first viewpoint of the electronic device 101; accordingly, the one or more criteria are not satisfied and the electronic device 101 maintains display of the virtual viewfinder in the three-dimensional environment 650.

In some examples, the one or more criteria for causing the electronic device 101 to cease displaying the virtual viewfinder in the three-dimensional environment 650 include a criterion that is satisfied when the movement of the standalone camera 660 causes the physical viewfinder 666 of the standalone camera to become visible in the field of view of the electronic device 101 from the first viewpoint of the electronic device 101. In some examples, the one or more criteria for causing the electronic device 101 to cease displaying the virtual viewfinder 615 in the three-dimensional environment 650 include a criterion that is satisfied when the movement of the standalone camera 660 causes the hand 603 of the user 602 that is holding the standalone camera 660 to become visible in the field of view of the electronic device 101 from the first viewpoint of the electronic device 101. For example, as shown in FIG. 6G, the hand 603 that is holding the standalone camera 660 is not visible in the field of view of the electronic device 101 in the three-dimensional environment 650; accordingly, the one or more criteria are not satisfied. Additionally or alternatively, in some examples, the one or more criteria include a criterion that is satisfied when the movement of the standalone camera 660 causes the physical viewfinder 666 of the standalone camera to be within a threshold distance of the first viewpoint of the electronic device 101 and/or within a threshold distance of the electronic device 101, such as within 0.15, 0.25, 0.5, 0.75, 1, 1.5, 2, etc. meters. In some examples, the one or more criteria for causing the electronic device 101 to cease displaying the virtual viewfinder in the three-dimensional environment 650 include a criterion that is satisfied when the movement of the standalone camera 660 causes the standalone camera 660 to be within a threshold distance (e.g., 0.15, 0.25, 0.5, 0.75, 1, 1.5, 2, etc. meters) of the first viewpoint of the electronic device 101 and/or within a threshold distance of the electronic device 101. For example, as illustrated in the top-down view 601 in FIG. 6G, the electronic device 101 determines that the standalone camera 660 and/or the physical viewfinder 666 of the standalone camera 660 are outside of threshold distance 612 of the electronic device 101 (e.g., and/or the first viewpoint of the electronic device 101), such as based on visual detection of the standalone camera 660 in one or more images captured by the external image sensors **114*b* and 114*c*, a strength of the wireless signal being communicated between the electronic device 101 and the standalone camera 660, and/or other indications detected by the electronic device 101 and/or the standalone camera 660. Accordingly, as illustrated in the example of FIG. 6G, the electronic device 101 maintains display of the virtual viewfinder 615 in the three-dimensional environment 650** in accordance with the determination that the one or more criteria are not satisfied.

In FIG. 6G, while displaying the virtual viewfinder 615 in the three-dimensional environment 650, the electronic device 101 detects an indication of further movement of the standalone camera 660 in the physical environment 600 relative to the first viewpoint of the electronic device 101. For example, as similarly discussed above, in FIG. 6G, the electronic device 101 detects that the user 602 of the electronic device 101 is moving (e.g., using the hand 603) the standalone camera 660 in a direction that is further toward the first viewpoint of the electronic device 101 and/or toward the field of view of the electronic device 101, as indicated by the arrow 669.

Figure 6H:
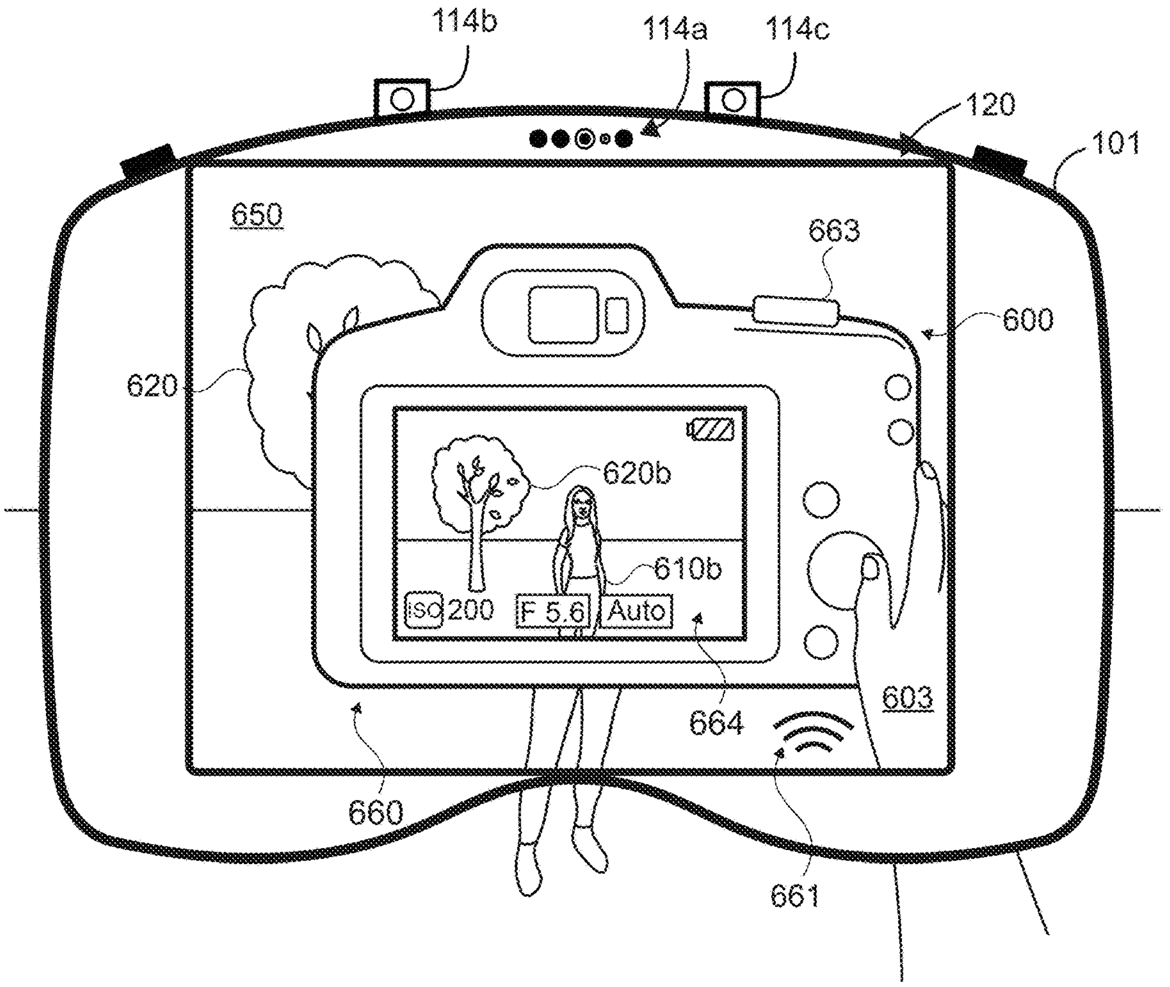
Figure 6H:
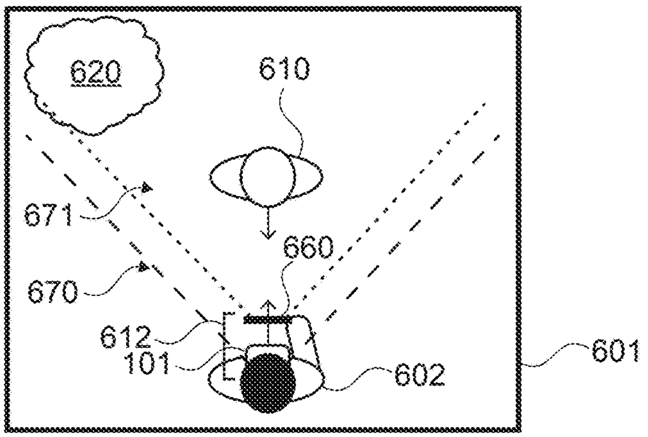

In some examples, in FIG. 6H, in response to and/or while detecting the indication of the movement of the standalone camera 660 relative to the first viewpoint of the electronic device 101, the electronic device 101 updates display of the virtual viewfinder 615 in the three-dimensional environment 650. Particularly, as illustrated in FIG. 6H, the electronic device 101 determines that the movement of the standalone camera 660 (e.g., by the hand 603 of the user 602 that is holding the standalone camera 660) in the physical environment 600 causes the one or more criteria for causing the electronic device 101 to cease displaying the virtual viewfinder in the three-dimensional environment 650 to be satisfied. Accordingly, as shown in FIG. 6H, the electronic device 101 ceases display of the virtual viewfinder 615 in the three-dimensional environment 650.

In some examples, the electronic device 101 determines that the one or more criteria are satisfied because the movement of the standalone camera 660 causes the display 664 of the standalone camera 660 to be moved in and/or detectable within the field of view of the electronic device 101. For example, as shown in FIG. 6H, the three-dimensional environment 650 includes the display 664 of the standalone camera 660 that is visible from the first viewpoint of the electronic device 101, which causes the one or more criteria to be satisfied. In some examples, the electronic device 101 determines that the one or more criteria are satisfied because the movement of the standalone camera 660 causes the physical viewfinder 666 of the standalone camera 660 to be moved in and/or detectable within the field of view of the electronic device 101. In some examples, the electronic device 101 determines that the one or more criteria are satisfied because the movement of the standalone camera 660 causes the physical viewfinder 666 and/or the standalone camera 660 to be within the threshold distance of the first viewpoint of the electronic device 101 and/or within the threshold distance of the electronic device 101. For example, as shown in the top-down view 601 in FIG. 6H, the standalone camera 660 is positioned within the threshold distance 612 of the electronic device 101, which causes the one or more criteria to be satisfied.

Additionally, in some examples, when the electronic device 101 ceases display of the virtual viewfinder 615 in the three-dimensional environment 650, the standalone camera 660 optionally powers on the display 664 of the standalone camera 660, which is visible in the three-dimensional environment 650 from the first viewpoint of the electronic device 101. Particularly, in some examples, as previously discussed above, if the display 664 of the standalone camera 660 is powered off and/or is operating in a lower power state while the virtual viewfinder 615 is displayed in the three-dimensional environment 650, the electronic device 101 transmits an indication or other instructions to the standalone camera 660 (e.g., via the wireless communication 661 or the wired communication 662) that causes the standalone camera 660 to power on the display 664. For example, in FIG. 6H, when the electronic device 101 determines that the one or more criteria above are satisfied and ceases display of the virtual viewfinder 615 in the three-dimensional environment 650, the electronic device 101 causes the standalone camera 660 to power on the display 664, such that the image displayed on the display 664 (e.g., including the representation of the person 610*b* and the representation of the tree 620*b*) corresponds to the view of the physical environment 600 from a current (e.g., updated) viewpoint of the standalone camera 660 and/or as viewable via the physical viewfinder 666 and/or the display 664 of the standalone camera 660. In some examples, if the display 664 is already powered on when the electronic device 101 ceases display of the virtual viewfinder 615 in the three-dimensional environment 650, the standalone camera 660 forgoes performing an operation in response to receiving the indication or other instructions from the electronic device 101 for powering on the display 664 of the standalone camera 660. Thus, because the content of the virtual viewfinder 615 is otherwise provided to (e.g., is visible to) the user 602 via the display 664 of the standalone camera 660, ceasing display of the virtual viewfinder 615 in the three-dimensional environment 650 (e.g., in response to determining the one or more criteria are satisfied) avoids duplicate display of information for the user 602 which could hinder or distract from the visibility of the display 664 and/or the physical viewfinder 666 of the standalone camera 660, thereby improving user-device interaction, as one benefit.

Figure 6I:
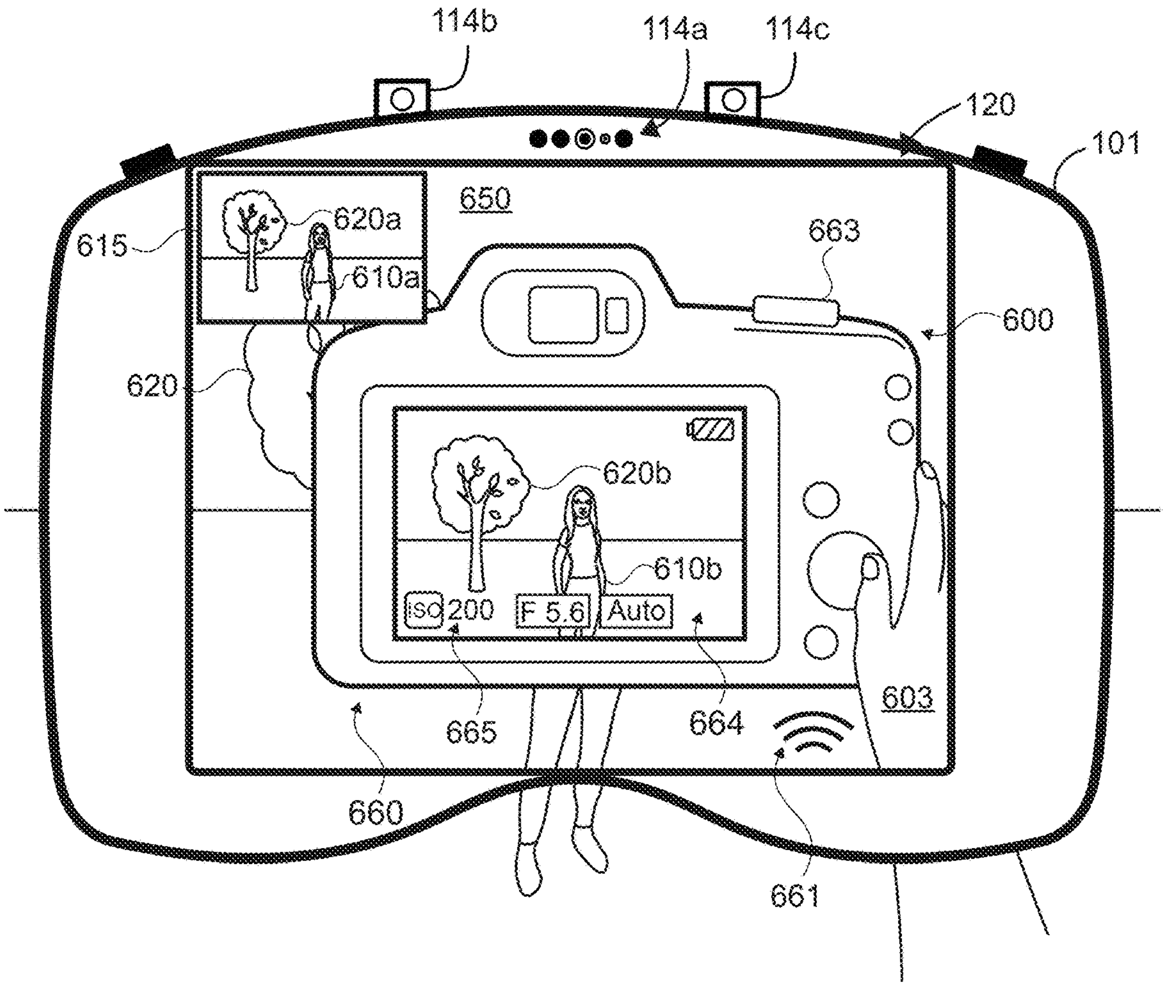
Figure 6I:
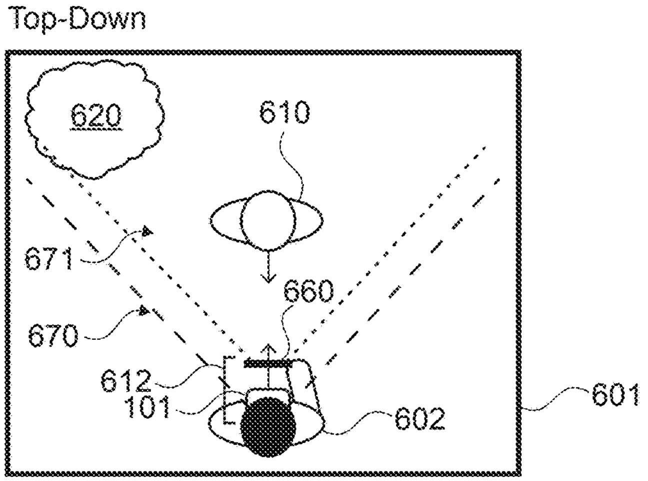

In some examples, as an alternative to ceasing display of the virtual viewfinder 615 in the three-dimensional environment 650 in accordance with the determination that the one or more criteria discussed above are satisfied, the electronic device 101 updates display of the virtual viewfinder 615 in the three-dimensional environment 650 in a manner that maintains visibility of the display 664 and/or the physical viewfinder 666 of the standalone camera 660 from the first viewpoint of the electronic device 101. For example, as shown in FIG. 6I, the electronic device 101 minimizes display of the virtual viewfinder 615 in the three-dimensional environment 650. In some examples, as shown in FIG. 6I, minimizing display of the virtual viewfinder 615 includes updating a size at which the virtual viewfinder 615 is displayed in the three-dimensional environment 650, such as decreasing the size and/or scale of the virtual viewfinder 615 on the display 120. In some examples, as shown in FIG. 6I, minimizing display of the virtual viewfinder 615 includes updating a location at which the virtual viewfinder 615 is displayed in the three-dimensional environment 650, such as moving and/or repositioning the virtual viewfinder 615 to an edge or corner of the display 120. In some examples, as shown in FIG. 6I, minimizing display of the virtual viewfinder 615 includes updating the content and/or information that is displayed with the virtual viewfinder 615 in the three-dimensional environment 650, such as ceasing display of the information 617 that is displayed with (e.g., overlaid on) the virtual viewfinder 615 on the display 120. In this way, the display of the virtual viewfinder 615 is maintained in the three-dimensional environment 650 while maintaining visibility of the display 664 and/or the physical viewfinder 666 of the standalone camera 660 in the three-dimensional environment 650 from the first viewpoint of the electronic device 101.

It is understood that, in the examples illustrated in FIGS. 6H-6I above, after the display of the virtual viewfinder 615 in the three-dimensional environment 650 has been updated (e.g., the virtual viewfinder 615 ceases to be displayed or the virtual viewfinder 615 is minimized on the display 120) after detecting the movement of the standalone camera 660 that satisfies the one or more criteria discussed above, subsequent movement of the standalone camera 660 that causes the one or more criteria to no longer be satisfied causes the electronic device 101 to restore the previous display of the virtual viewfinder 615 in the three-dimensional environment 650. For example, in FIG. 6H, while the virtual viewfinder 615 is not displayed in the three-dimensional environment 650, if the electronic device 101 detects an indication of further movement of the standalone camera 660 relative to the first viewpoint of the electronic device 101 that causes the one or more criteria to no longer be satisfied, the electronic device 101 redisplays the virtual viewfinder 615 in the three-dimensional environment 650 as similarly shown in FIG. 6G. As another example, in FIG. 6I, while the virtual viewfinder 615 is minimized on the display 120, if the electronic device 101 detects an indication of further movement of the standalone camera 660 relative to the first viewpoint of the electronic device 101 that causes the one or more criteria to no longer be satisfied, the electronic device 101 restores the display of (e.g., reverses the minimization of) the virtual viewfinder 615 in the three-dimensional environment 650 as similarly shown in FIG. 6G.

Figure 6J:
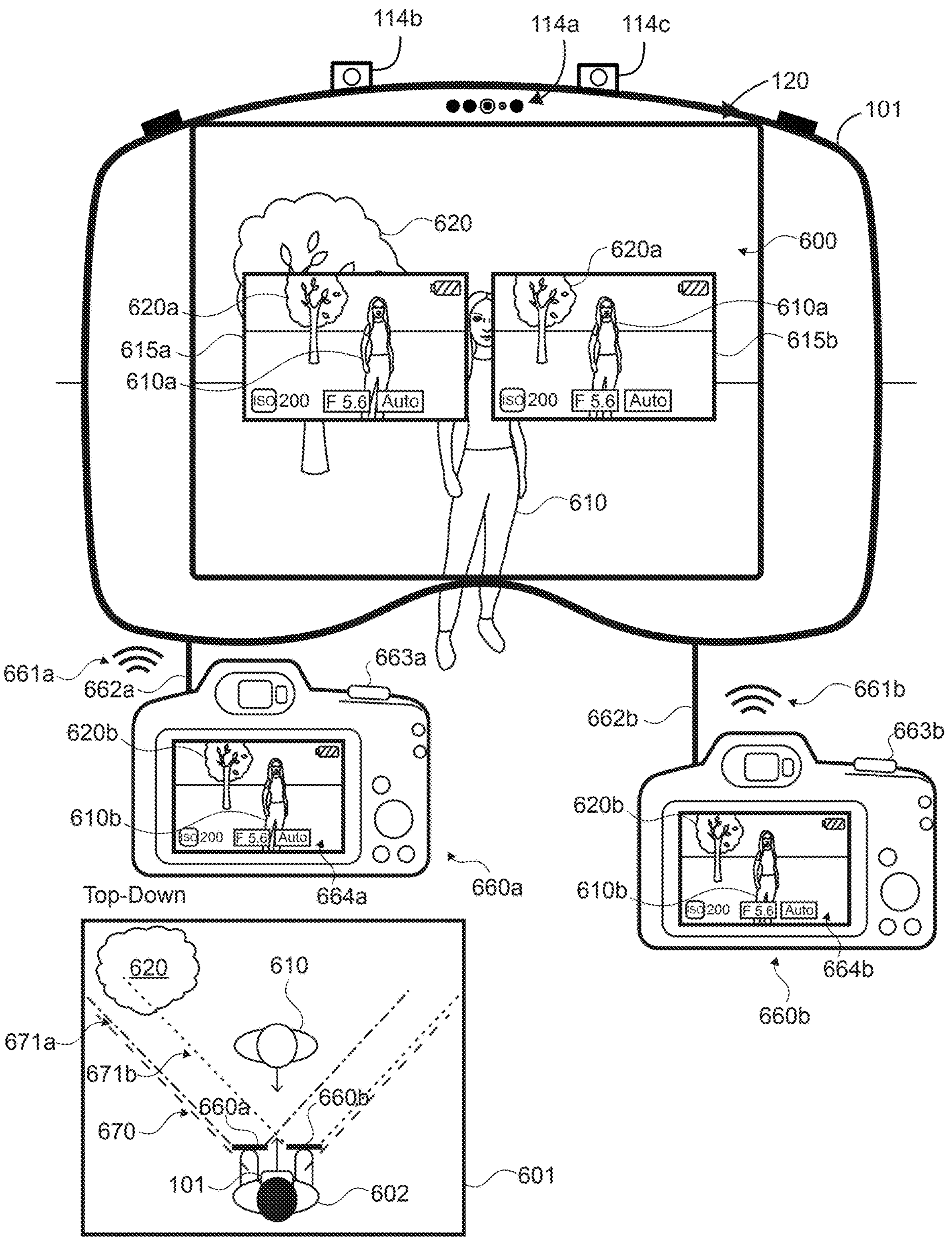

In some examples, a plurality of standalone cameras (e.g., a multi-camera system, workstation, or similar setup) is able to be in communication with the electronic device 101, such that a plurality of virtual viewfinders corresponding to the fields of view of the plurality of standalone cameras is provided on the display 120 of the electronic device 101. For example, as shown in FIG. 6J, the electronic device 101 is (e.g., concurrently) in communication with a first standalone camera 660*a* and a second standalone camera 660*b*. In some examples, the first standalone camera 660*a* and the second standalone camera 660*b* have one or more characteristics of standalone camera 660 described above. In some examples, the first standalone camera 660*a* is different from the second standalone camera 660*b*. For example, the first standalone camera 660*a* and the second standalone camera 660*b* are different types of consumer electronic cameras, such as different brands of, different models of, different generations of, have different components and/or accessories, etc. of mirrorless cameras. In some examples, the first standalone camera 660*a* and the second standalone camera 660*b* are the same type of camera.

In some examples, as shown in FIG. 6J, the first standalone camera 660*a* is in wireless communication 661*a* or wired communication 662*a* with the electronic device 101, and the second standalone camera 660*b* is in wireless communication 661*b* or wired communication 662*b* with the electronic device 101. Additionally, as shown in FIG. 6J, the first standalone camera 660*a* includes first display 664*a* and first capture button 663*a*, and the second standalone camera 660*b* includes second display 664*b* and second capture button 664*b*. In FIG. 6J, the first display 664*a* of the first standalone camera 660*a* is displaying a digital representation of a current view of the first standalone camera 660*a* and the second display 664*b* of the second standalone camera 660*b* is displaying a digital representation of a current view of the second standalone camera 660*b* of the physical environment 600. For example, as shown in FIG. 6J, the first display 664*a* and the second display 664*b* include a representation of the person 610*b* and a representation of the tree 620*b*, but from the unique viewpoints of the first standalone camera 660*a* and the second standalone camera 660*b*, respectively. Particularly, as illustrated in the top-down view 601 in FIG. 6J, the person 610 and the tree 620 are both located in a first field of view 671*a* of the first standalone camera 660*a* and a second field of view 671*b* of the second standalone camera 660*b*. It is understood that, though the top-down view 601 in FIG. 6J illustrates the first standalone camera 660*a* and the second standalone camera 660*b* being held by the user 602 of the electronic device 101 (e.g., in the hands of the user 602), the first standalone camera 660*a* and/or the second standalone camera 660*b* are alternatively positioned in a tripod or other stand-based arrangement in the physical environment 600.

In some examples, as shown in FIG. 6J, the electronic device 101 is configured to provide a virtual viewfinder for each of the first standalone camera 660*a* and the second standalone camera 660*b*. For example, as shown in FIG. 6J, the electronic device 101 is (e.g., concurrently) displaying a first virtual viewfinder 615*a* that is associated with the view of the physical environment 600 from the first standalone camera 660*a*, and a second virtual viewfinder 615*b* that is associated with the view of the physical environment 600 from the second standalone camera 660*b*, in the three-dimensional environment 650. In some examples, as similarly described above, the first virtual viewfinder 615*a* includes a first spatial image corresponding to the view of the physical environment 600 being captured by the first standalone camera 660*a*, and the second virtual viewfinder 615*b* includes a second spatial image corresponding to the view of the physical environment 600 being captured by the second standalone camera 660*b*. For example, as shown in FIG. 6J, the first virtual viewfinder 615*a* includes a representation of the person 610*a* and a representation of the tree 620*a* corresponding to the digital image displayed on the first display 664*a* of the first standalone camera 660*a*, and the second virtual viewfinder 615*b* includes a representation of the person 610*a* and a representation of the tree 620*a* corresponding to the digital image displayed on the second display 664*b* of the second standalone camera 660*b*. In some examples, as shown in FIG. 6J, the first virtual viewfinder 615*a* and the second virtual viewfinder 615*b* are displayed at predetermined locations on the display 120. For example, the first virtual viewfinder 615*a* and the second virtual viewfinder 615*b* are displayed overlaid on the captured portions of the physical environment 600 (e.g., captured by the external image sensors 114*b* and 114*c*) that are included in and/or that are visible in the three-dimensional environment 650 from the first viewpoint of the electronic device 101. In some examples, the first virtual viewfinder 615*a* and/or the second virtual viewfinder 615 have one or more characteristics of the virtual viewfinder 615 described above.

In some examples, while displaying the first virtual viewfinder 615*a* and the second virtual viewfinder 615*b* in the three-dimensional environment 650, the user is able to interact with the standalone cameras 660*a* and 660*b* in manners similar to those described above with reference to the standalone camera 660. For example, in FIG. 6J, the user 602 is able to: capture spatial images that are viewable (e.g., and/or able to be previewed) in the three-dimensional environment 650 (e.g., via selections of the capture buttons 663*a* and 663*b*), as similarly shown in FIGS. 6B-6D; adjust a focus of the first standalone camera 660*a* and/or the second standalone camera 660*b* (e.g., via gaze-based input that is detected as being directed to a location within the first virtual viewfinder 615*a* and/or a location within the second virtual viewfinder 615*b*, respectively, in the three-dimensional environment 650), as similarly shown in FIG. 6E; adjust and/or alter display of the spatial image being presented within the first virtual viewfinder 615*a* and/or within the second virtual viewfinder 615*b* (e.g., via movement of the first standalone camera 660*a* and/or the second standalone camera 660*b*, which changes the respective viewpoints of the first standalone camera 660*a* and/or the second standalone camera 660*b* in the physical environment 600), as similarly shown in FIGS. 6F-6G; and/or update display of (e.g., cease display of and/or minimize display of) the first virtual viewfinder 615*a* and/or the second virtual viewfinder 615*b* in the three-dimensional environment 650 (e.g., via movement of the first standalone camera 660*a* and/or the second standalone camera 660*b* that satisfies the one or more criteria described previously herein), as similarly shown in FIGS. 6H-6I. Thus, it is understood that, as outlined above, one or more of the operations performed by the electronic device 101 and/or the standalone camera 660 similarly and/or correspondingly apply to the first standalone camera 660*a* and/or the second standalone camera 660*b* in the example of FIG. 6J (e.g., and/or additional or alternative consumer electronic cameras (e.g., mirrorless cameras) that are in communication with the electronic device 101). Additionally, it is understood that, in some examples, one or more of the interactions described previously above with reference to electronic device 101 and second electronic device 160 (e.g., illustrated in FIGS. 3A-4H) similarly and/or correspondingly apply to the standalone camera 660.

Accordingly, as outlined above, providing a virtual viewfinder in a three-dimensional environment that includes a spatial image corresponding to a view of a physical environment of a standalone camera at an electronic device enables a user of the electronic device to more easily and effectively capture and save spatial images at the standalone camera, without requiring the user to rely on the limited display capabilities of the standalone camera, thereby improving user-device interaction. Additionally, as another benefit, (e.g., automatically) providing a preview of the captured spatial image in the three-dimensional environment at the electronic device after the standalone camera captures the image in response to user input provides immediate visual feedback to the user that the spatial image has been captured, and/or reduces the number of inputs required for previewing captured spatial images of the standalone camera.

Figure 7:
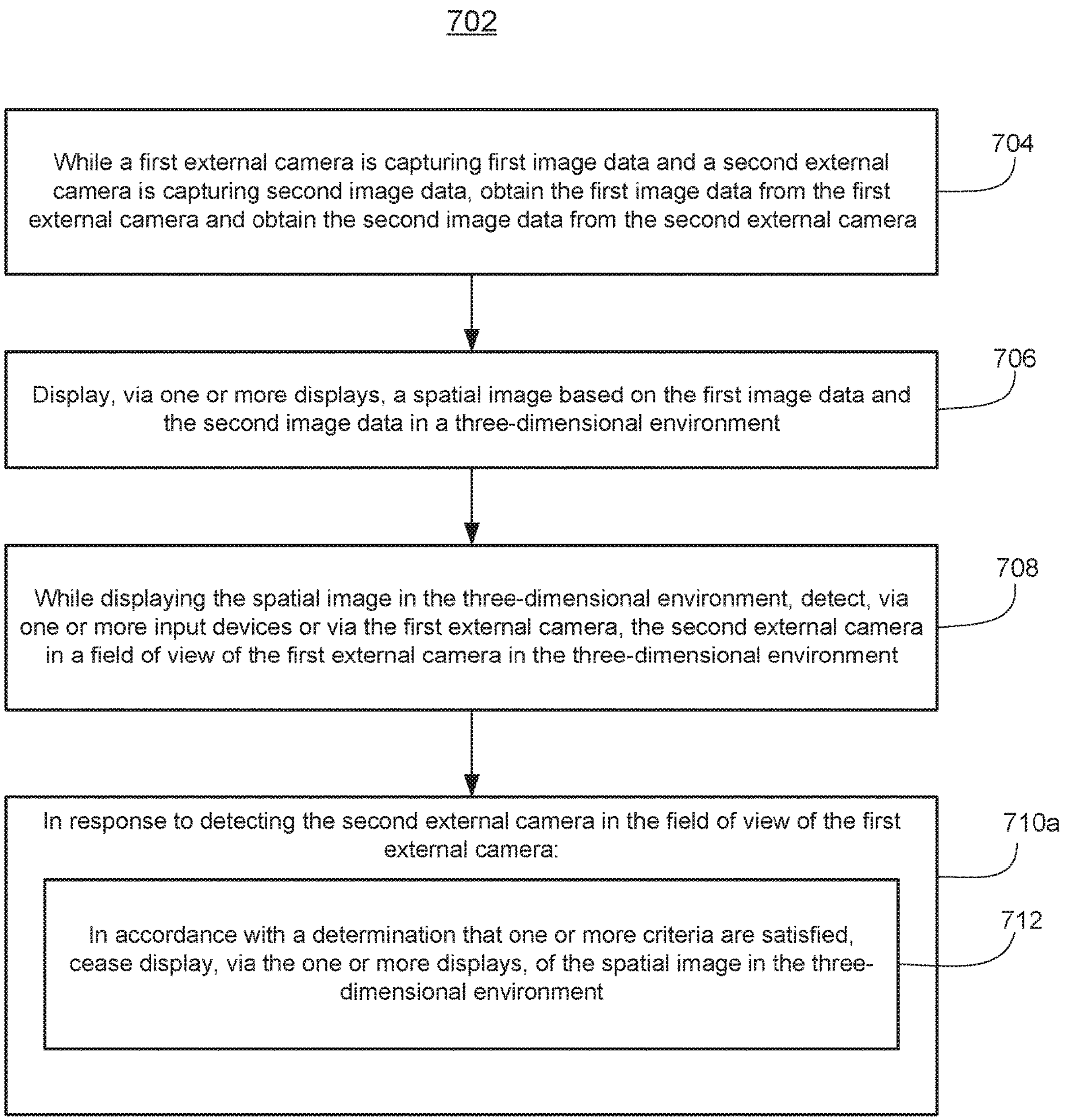
FIG. 7 is a flowchart illustrating an example method of updating display of spatial images in a three-dimensional environment that are captured by a standalone camera according to some examples of the disclosure.

FIG. 7 is a flowchart illustrating an example method of updating display of spatial images in a three-dimensional environment that are captured by a standalone camera according to some examples of the disclosure. In some examples, process 702 begins at an electronic device in communication with one or more displays, one or more input devices, a first external camera with a first viewpoint, and a second external camera with a second viewpoint, different from the first viewpoint. In some examples, the electronic device is optionally a head-mounted display similar or corresponding to electronic device 201 of FIG. 2A or a mobile electronic device similar or corresponding to electronic device 260 of FIG. 2B. As shown in FIG. 7, in some examples, at 704, while the first external camera is capturing first image data and the second external camera is capturing second image data, the electronic device obtains the first image data from the first external camera and obtaining the second image data from the second external camera. For example, as described with reference to FIG. 6A, electronic device 101 is capturing image data of physical environment 600 using external image sensors 114*b* and 114*c* from a first viewpoint, and standalone camera 660 is capturing image data of the physical environment 600 from a second viewpoint.

In some examples, at 706, the electronic device displays, via the one or more displays, a spatial image based on the first image data and the second image data in a three-dimensional environment. For example, as shown in FIG. 6A, the electronic device 101 is displaying virtual viewfinder 615 in three-dimensional environment 650 overlaid on portions of the physical environment 600 that are visible and/or represented in the three-dimensional environment 650 from the first viewpoint of the electronic device 101. In some examples, at 708, while displaying the spatial image in the three-dimensional environment, the electronic device detects, via the one or more input devices or via the first external camera, the second external camera in a field of view of the first external camera in the three-dimensional environment. For example, as described with reference to FIGS. 6F-6G, the electronic device 101 detects movement of the standalone camera 660 to at least partially within a field of view of the electronic device 101 in the three-dimensional environment 650.

In some examples, at 710*a*, in response to detecting the second external camera in the field of view of the first external camera, at 712, in accordance with a determination that one or more criteria are satisfied, the electronic device ceases display, via the one or more displays, of the spatial image in the three-dimensional environment. For example, as shown in FIG. 6H, the electronic device 101 ceases display of the virtual viewfinder 615 in the three-dimensional environment 650. In some examples, as described with reference to FIGS. 6G-6H, the one or more criteria include a criterion that is satisfied when the display 664 of the standalone camera 660 is visible in the field of view of the electronic device 101 in the three-dimensional environment 650. In some examples, the one or more criteria include a criterion that is satisfied when the standalone camera 660 is moved to within a threshold distance 612 (e.g., illustrated in top-down view 601) of the first viewpoint of the electronic device 101, as illustrated in FIG. 6H. Additional examples of the one or more criteria are described above with reference to FIGS. 6G-6H.

It is understood that process 702 is an example and that more, fewer, or different operations can be performed in the same or in a different order. Additionally, the operations in process 702 described above are, optionally, implemented by running one or more functional modules in an information processing apparatus such as general-purpose processors (e.g., as described with respect to FIGS. 2A-2B) or application specific chips, and/or by other components of FIGS. 2A-2B.

In some examples, a first electronic device (that is optionally wearable) is in communication with one or more displays and in communication with a first external camera with a first viewpoint and a second external camera with a second viewpoint, different than the first viewpoint, such as the electronic device 101, the first external camera 171, and the second external camera 170 shown in FIG. 3B. In some examples, the first electronic device is a head mounted display or device (HMD) and/or a body-mounted display or device, a mobile device (e.g., a tablet, a smartphone, a media player, or a wearable device) including wireless communication circuitry, optionally in communication with one or more of headphones and/or earbuds that optionally includes one or more cameras and/or inertial measurement units (IMU), a mouse (e.g., external), trackpad (optionally integrated or external), touchpad (optionally integrated or external), remote control device (e.g., external), another mobile device (e.g., separate from the first electronic device), a handheld device (e.g., external), and/or a controller (e.g., external). In some examples, the first electronic device includes one or more sensors configured to detect a position and/or orientation of the first electronic device. For example, the first electronic device optionally includes a plurality of orientation sensors (e.g., accelerometers, gyroscopes, magnetometers, inertial measurement units (IMUs), tilt sensors/inclinometers, optical sensors, electromechanical gyros, fiber optic gyroscopes (FOGs), ring laser gyroscopes (RLGs), and/or Micro-electromechanical system (MEMS) gyroscopes) configured to optionally detect a change in orientation of the user of the wearable device, such as the user tilting their head upwards. In some examples, the first electronic device includes one or more display generation components that are a display integrated with the first electronic device (optionally a touch screen display), external display such as a monitor, projector, television, or a hardware component (optionally integrated or external) for projecting a user interface or causing a user interface to be visible to a user of the system. In some examples, the one or more display generation components includes a display generation component configured to view a three-dimensional environment. For example, the display generation component is optionally configured to be translucent, allowing the user of the system (e.g., the first electronic device) to view a real-world environment (e.g., three-dimensional environment).

In some examples, the first electronic device corresponds to a head-mounted display such as wearable glasses. For example, the first electronic device is optionally contained within the housing of wearable reading glasses, where the one or more displays are optionally disposed in an upper portion of the lens of the reading glasses, allowing the user to view a three-dimensional environment and content displayed by the one or more displays simultaneously. In some examples, the first external camera and/or the second external camera are included on a mobile device (e.g., a mobile phone or other mobile computing device such as a tablet and/or a laptop computer) configured to communicate with other first electronic devices (e.g., the first electronic device). In some examples, the first external camera and the second external camera are part of a common electronic device (e.g., second electronic device discussed below), and each camera is positioned at a different location on the electronic device such that the viewpoint of each camera is different from one another when viewing the three-dimensional environment. In some examples, the first external camera and/or the second external camera each corresponds to a camera configured to detect/record image data of the three-dimensional environment discussed in further detail below. In some examples, the first external camera is disposed within the three-dimensional environment such that the first external camera captures the three-dimensional environment from a first viewpoint.

In some examples, the second external camera is disposed within the three-dimensional environment such that the second external camera captures the three-dimensional environment from a second viewpoint, different than the first viewpoint. In some examples, the first external camera and the second external camera are included in a secondary electronic device in communication with the first electronic device. For example, the first external camera is optionally disposed on a first face (e.g., a display face) of the second electronic device, such as a mobile device, and the second external camera is optionally disposed on a second face (e.g., rear face) of the mobile device. In this configuration, the first external camera and the second external camera are disposed in locations such that each camera records a different viewpoint (e.g., first viewpoint, second viewpoint) of the three-dimensional environment. In some examples, the first/second viewpoint each include a predetermined field of view corresponding to the camera associated with the first external camera. For example, the first external camera optionally includes a 180-degree field of view configured to optionally capture the three-dimensional environment from the front side of the secondary electronic device. On the back side of the secondary electronic device, the second external camera optionally includes a 180-degree field of view optionally configured to capture the three-dimensional environment. In some examples, the first electronic device is communicatively coupled with the first external camera and/or the second external camera via a wired connection (e.g., High-Definition Multimedia Interface (HDMI) cable, auxiliary cable). In some examples, the first electronic device is communicatively coupled with the first external camera and/or the second external camera via a wireless connection (e.g., Wi-Fi, Bluetooth). For example, the first electronic device optionally transmits a request to connect over a local and/or global Wi-Fi network. While transmitting the request, the first external camera and/or the second external camera optionally detects the request and automatically accepts the request to connect. In some examples, the first external camera is capturing first image data (e.g., one or more images from the first viewpoint, one or more videos from the first viewpoint) and the second external camera is capturing second image data (e.g., one or more images from the second viewpoint, one or more videos from the second viewpoint) (at block 502).

In some examples, the first external camera and the second external camera capture the first image data and the second image data simultaneously. In some examples, the first external camera and the second external camera capture the first image data and the second image data during different time periods. For example, the first external camera optionally captures the first image data at a first time, such as immediately after optionally establishing a communication with the first electronic device, and the second external camera optionally captures the second image data at a second time, such as after a time threshold has been reached after optionally establishing a communication with the first electronic device. In some examples, in response to detecting an established communication between the first electronic device, the first external camera, and the second external camera, the cameras begin to capture the first image data and the second image data, respectively. In some examples, the first external camera and/or the second external camera capture the first and/or the second image data in response to a user input at the first external device and/or a respective external camera, such as the input provided by hand 103 at button 163 shown in FIG. 3C. For example, the first electronic device optionally detects a user touch input at the one or more displays and optionally transmits a command to the first external camera and/or the second external camera to optionally begin capturing the first and/or the second image data. In another example, the user touch input is optionally directed at the first external camera and/or the second external camera. In response to a respective external camera receiving the user touch input, the respective external camera optionally transmits to the other external camera a command to begin capturing the respective image data. In some examples, the first external camera and/or the second external camera capture the first image data and the second image data corresponding to an image/video of the three-dimensional environment that the first electronic device resides in. In some examples, the first external camera and the second external camera capture the first/second image data over a predetermined time period (e.g., set by a communication from the first electronic device). In some examples, the first external camera and/or the second external camera capture the first/second image data until the first electronic device transmits a communication to cease capturing. In some examples, the first electronic device obtains the first image data from the first external camera, obtains the second image data from the second external camera, or obtains spatial image data generated based on the first image data and the second image data (at block 504). In some examples, the first image data and/or the second image data corresponds to image and/or video data configured to be viewable by the user of the first electronic device as discussed in further detail below. For example, the first external camera and/or the second external camera optionally records video (e.g., first image data and second image data) of an environment (e.g., three-dimensional environment) corresponding to the location of the first electronic device. In some examples, the first external camera includes a high-resolution sensor and a wide-angle lens. This external camera is optionally mounted on a gimbal and optionally rotated to optionally capture an entire scene of the three-dimensional environment while continuously capturing spatial data (e.g., first image data and/or second image data). By optionally using image stitching and panoramic techniques, this external camera combines multiple images into a spatial image map. In some examples, the second external camera is configured to compliment the first external camera by capturing depth perception and fine details of the scene. This external camera optionally utilizes a telephoto lens to optionally capture high-detail images of the scene in the three-dimensional environment optionally from a different perspective. This external camera may optionally utilize depth-sensing technology (e.g., Light detection and ranging (LIDAR), stereoscopic imaging) to optionally calculate distances between objects in the scene. This information is optionally added to the captured scene by the first external camera to optionally create depth layers to the spatial map (e.g., spatial image data).

In some examples, the first image data and/or the second image data each include depth data. In some examples, the first image data and/or the second image data are received at the respective external camera and are transmitted to the second electronic device simultaneously. In some examples, the first image data and/or the second image data are received and processed at the respective external camera prior to transmitting the first image data and/or the second image data to the first electronic device. In some examples, the first electronic device obtains the first image data and/or the second image data via a wireless communication from the first external camera and/or the second external camera as described similarly above, such as wireless communication 161 and/or wired communication 162 shown in FIG. 3C. In some examples, the first electronic device combines the obtained first image data and the second image data to produce the spatial image data to be displayed at the one or more displays discussed in further detail below (504). For example, the spatial image is optionally a pair of two slightly different images (e.g., first image data, second image data), that when viewed together (e.g., at the first electronic device), optionally create the illusion of depth in the spatial image data. In some examples, the spatial image data includes the depth data of the first image data and/or the second image data.

In some examples, the first electronic device utilizes a plurality of spatial video processing algorithms to combine the first image data and the second image data to obtain the spatial image data (at block 504). In some examples, the spatial image data corresponds to a three-dimensional model of the three-dimensional environment (e.g., real-world environment including the first electronic device). In some examples, the first electronic device combines the first image data from the first viewpoint and the second image data from the second viewpoint to obtain the spatial image data based on a combination of the first viewpoint and the second viewpoint. For example, the first electronic device optionally obtains the first image data from the first external camera optionally comprising a field of view encapsulating a left portion of the three-dimensional environment (e.g., first viewpoint) relative to the user of the first electronic device. During this process, the first electronic device optionally obtains the second image data from the second external camera optionally comprising a field of view encapsulating a right portion of the three-dimensional environment (e.g., second viewpoint) relative to the user of the first electronic device. Using a combination of the left portion (e.g., first image data) and the right portion (e.g., second image data) of the three-dimensional environment, the first electronic device generates the spatial image data optionally corresponding to a field of view including the left and right portion of the three-dimensional environment. In some examples, in accordance with a determination that one or more first criteria are satisfied, the first electronic device displays (506), via the one or more displays, a spatial image based on the first image data and the second image data or the spatial image data generated based on the first image data and the second image data in a three-dimensional environment. In some examples, the one or more first criteria are satisfied when the first electronic device obtains the first image data and/or the second image data. In some examples, the one or more first criteria are satisfied according to one or more characteristics discussed in further detail below. In some examples, the first electronic device determines that the one or more first criteria are satisfied via a communication from the first external camera and/or the second external camera. For example, the first electronic device optionally receives an error transmission from the first and/or second external camera optionally indicating a failure to capture the first and/or second image data. In some examples, the electronic device does not display the spatial image if the one or more first criteria are not satisfied. In some examples, the spatial image is displayed in a first display of the one or more displays. In some examples, the spatial image is displayed in a plurality of displays of the one or more displays. In some examples, the one or more displays includes a display configured to display the three-dimensional environment, a display configured to display the first image data, and a display configured to display the second image data. In some examples, the one or more displays are configured to display the first image data, the second image data, and the three-dimensional environment simultaneously.

In some examples, the first external camera and the second external camera are included in a second electronic device in communication with the first electronic device (at block 502). In some examples, the second electronic device includes one or more characteristics of the secondary electronic device discussed above. In some examples, after the first external camera and/or the second external camera obtain the first image data and/or the second image data, the second electronic device stores the first image data and/or the second image data prior to communicating the respective image data to the first electronic device (at block 504). In some examples, the second electronic device corresponds to a mobile device such as discussed above. In some examples, the first external camera and the second external camera are each disposed at a distinct location at the second electronic device, respectively. In some examples, the first external camera and the second external camera view a common scene in the three-dimensional environment from their respective distinct locations at the second electronic device. In some examples, the first external camera and the second external camera view the common scene from distinct perspectives (e.g., first viewpoint, second viewpoint). In some examples, the first external camera, the second external camera, the second electronic device are concurrently in communication with the first electronic device.

In some examples, the second electronic device generates the spatial image data based on the first image data and the second image data and communicates the spatial image data to the first electronic device. In some examples, the second electronic device generates the spatial image data based on the first/second image data in a similar manner as discussed above. In some examples, the second electronic device continuously obtains the first image data and the second image data over a time period, and in response, continuously updates the spatial image data. For example, the first external camera and the second external camera optionally obtain the first image data and the second image data of a common scene optionally including an object at a first position in the three-dimensional environment optionally during a first time. During this time, the second electronic device optionally generates the spatial image data based on the first image data and the second image data. At a second time, the first external camera and the second external camera optionally obtains the first image data and the second image data of the common scene including the object at a second position in the three-dimensional environment and in response, the second electronic device updates the spatial image from including the object at the first position to the object at the second position based on the first image data and the second image data from the second time. In some examples, the second electronic device communicates the spatial image data to the first electronic device via one or more wired and/or wireless methods as discussed above. In some examples, the second electronic device processes the first image data and the second image data to generate the spatial image data in response to a user input denoting the respective device to generate the spatial image data. For example, while the first external camera and the second external camera are optionally capturing the first image data and the second image data, the user optionally selects the first electronic device to display the spatial image data. In response to this input, the second electronic device automatically begins to combine the obtained first image data and second image data to generate the spatial image data and subsequently transmit the spatial image data to the first electronic device. In some examples, the first electronic device automatically displays the spatial image data in response to receiving a transmission from the second electronic device that includes at least the spatial image data. For example, the second electronic device optionally combines the first image data and the second image data to produce the spatial image data and optionally transmits the spatial image data to the first electronic device, including a command to display the spatial image data at the one or more displays of the first electronic device.

In some examples, the first electronic device obtains the first image data and the second image data from the second electronic device, and the first electronic device generates the spatial image data based on the first image data and the second image data. In some examples, the second electronic device (discussed above) transmits the first image data and the second image data to the first electronic device after obtaining the respective image data. In some examples, the first electronic device generates the spatial image data in a similar manner as discussed above with reference to the second electronic device generating the spatial image data. In some examples, the first electronic device obtains the first image data and/or the second image data while the first external camera and/or the second external camera are capturing the first image data and/or the second image data. In some examples, the first electronic device obtains the first image data and/or the second image data after the first external camera and the second external camera have captured their respective image data. In some examples, the first electronic device generates the spatial image data at a time after the first external camera and/or the second external camera ceases to capture the first image data and/or the second image data transmits the respective image data to the first electronic device.

In some examples, the second electronic device includes a display, different from the one or more displays, configurable to display, on the display of the second electronic device, two-dimensional image data while the first external camera is capturing first image data and the second external camera is capturing second image data, such as the display 164 shown in FIG. 3D. In some examples, the display at the second electronic device includes at least one or more characteristics of the one or more displays discussed above. In some examples, the display corresponds to a display at a mobile device. In some examples, in response to the first external camera and the second external camera capturing the first/second image data, the second electronic device compiles the first/second image data to create the two-dimensional image data (e.g., generating a two-dimensional image based on the first and second image data.). In some examples, the two-dimensional image data includes at least one or more characteristics of the first image data and the second image data. For example, the two-dimensional image data optionally includes the first viewpoint associated with the first external camera and the second viewpoint associated with the second external camera. In some examples, the two-dimensional image data corresponds to a live video feed of the three-dimensional environment. In some examples, the two-dimensional image data corresponds to a static image of the three-dimensional environment. In some examples, the two-dimensional image data is continuously updated to correspond to a currently captured combination of the first image data and the second image data. In some examples, the second electronic display displays the three-dimensional environment prior to the first external camera and/or the second external camera captures the three-dimensional environment, and in response to the first external camera and/or the second external camera beginning to capture the first and/or the second image data, the second electronic device transmits the display of the three-dimensional environment to the one or more displays of the first electronic device. In some examples, the second electronic device transmits the display of the three-dimensional environment to the one or more displays of the first electronic device in response to a detection of a user input (e.g., button press) at the second electronic device and/or the first electronic device. In some examples, in response to the first electronic device connecting with the second electronic device, the second electronic device automatically transmits the display of the three-dimensional environment to the one or more displays of the first electronic device. In some examples, after transmitting the display of the three-dimensional environment from the second electronic device to the first electronic device, the second electronic device updates the display of the second electronic device to include a blurred or static image of the three-dimensional environment and populates the display with one or more controls at a control user interface configured to control the first and/or the second external camera(s). In some examples, the one or more controls correspond to one or more physical controls (e.g., buttons, switches) at the second electronic device).

In some examples, while displaying, via the display, the spatial image data in the three-dimensional environment, the two-dimensional image data has an appearance different than the first image data or the second image data. In some examples, the two-dimensional image data is displayed as a blurred image of first and/or second image data so as to indicate that the image data generated by the cameras of the second device are being displayed on the display of the first electronic device. In some examples, in response to obtaining the first image data and/or the second image data, the second electronic device updates the display from a representation of the three-dimensional environment to the aforementioned blurred image of the first and/or second image data. In some examples, the appearance of the two-dimensional image data indicates that the second electronic device is receiving the first and/or the second image data. For example, the display at the second electronic device optionally displays a user interface including a plurality of applications, and in response to optionally obtaining the first image data and/or the second image data, optionally displaying a representation of the three-dimensional environment (e.g., two-dimensional image data) with a darkened appearance as compared to the first and/or second image data. In some examples, the two-dimensional image data appearance includes a user interface with one or more icons indicating the second electronic device is obtaining the first image data and/or the second image data. For example, the two-dimensional image data appearance optionally includes a glowing recording icon, indicating that the second electronic device is obtaining the first and/or second image data, such as recording indication 166 shown in FIG. 3K. In some examples, the second electronic device displays the two-dimensional image data appearance as a static image of the first image data and/or the second image data. In some examples, the two-dimensional image data appearance is displayed as blank at the display of the second electronic device. In some examples, the appearance of the two-dimensional image data includes tinting encapsulating an outer portion of the two-dimensional image data.

In some examples, while displaying, via the display, the spatial image data in the three-dimensional environment, the two-dimensional image data includes a monoscopic representation of the first image data or the second image data, or a stereoscopic representation of the first image data and the second image data. In some examples, the second electronic device displays the two-dimensional image data with the monoscopic representation of the first/second image data and the stereoscopic representation of the first/second image data simultaneously. In some examples, the monoscopic representation of the first/second image data corresponds to a flat image that does not provide depth perception or a 3D effect, viewable from one perspective only. In some examples, the stereoscopic representation of the first/second image corresponds to a pair of two slightly different images (e.g., first image data and second image data), where one image is configured to be viewed by each eye of the user of the first electronic device, that create the illusion of depth and 3D perception when viewed together (e.g., spatial image data). In some examples, the stereoscopic representation includes one or more characteristics of the spatial image data discussed above. In some examples, the two-dimensional image data includes a first portion corresponding to the monoscopic representation of the first image data or the second image data displayed at the second electronic device, and a second portion corresponding to the stereoscopic representation of the first image data or the second image data displayed at the first electronic device. In some examples, the second electronic device determines a respective representation (e.g., monoscopic or stereoscopic) of the first image data or the second image data according to a user input. For example, the user optionally inputs a preferred representation input at the second electronic device prior to the second electronic device displaying the two-dimensional image data.

In some examples, the one or more first criteria include a criterion that is satisfied when the first electronic device receives an indication from an external electronic device to display the spatial image data generated based on the first image data and the second image data in the three-dimensional environment. In some examples, the first electronic device receives the indication via a wireless and/or wired communication from the external electronic device. In some examples, the external electronic device corresponds to the second electronic device. In some examples, the external electronic device corresponds to the first external camera and/or the second electronic camera. In some examples, the first electronic device displays the indication as a visual indication at the one or more displays configurable to receive a user input. For example, the one or more displays optionally display the indication as a visual indication optionally including an affordance that when detects the user input, initiates the display of the spatial image data at the one or more displays. In some examples, the first electronic device displays the indication at the one or more displays while displaying the spatial image data at the one or more displays. In some examples, the first electronic device receives the indication while the first external camera and/or the second external camera are capturing the first image data and/or the second image data. In some examples, the criterion is satisfied after the user of the first electronic device interacts with the indication. For example, the first electronic device optionally receives the user input at the indication, and in response, the first electronic device displays the spatial image data at the one or more displays.

In some examples, the spatial image data includes visual depth information. In some examples, the visual depth information includes one or more characteristics of the depth layers of the spatial map discussed above with reference to obtaining the first image data from the first external camera and obtaining the second image data from the second external camera. In some examples, the first external camera and/or the second external camera capture visual depth data associated with the first image data and/or the second image data prior to combining the first image data and the second image data to generate the spatial image data. In some examples, the visual depth refers to the three-dimensional perception achieved by presenting two slightly different images (e.g., first image data and second image data) to each eye of the user of the first electronic device, thereby emulating the natural depth perception of human vision. The variations between the images seen by each eye of the user enables the brain to interpret the spatial relationships and distances of objects, resulting in an illusion of depth (e.g., visual depth information).

In some examples, the first image data and the second image data correspond to video data, and wherein the spatial image data corresponds to a spatial video. This spatial image data corresponding to the spatial video may be displayed by the viewfinder 300. In some examples, when displaying spatial video at the viewfinder 300, this may be optionally referred to as displaying a spatial image. In some examples, the video data corresponds to a compilation of one or more captured fist image data and/or second image data. In some examples, the spatial video includes one or more characteristics of the first image data and/or the second image data as discussed above. For example, the video data optionally includes depth information optionally perceivable by the user of the first electronic device. In some examples, the video data includes one or more characteristics of the video of the three-dimensional environment as discussed above. In some examples, the spatial video includes depth and spatial information (similar to the spatial image data as discussed above), allowing for the representation of the three-dimensional environments and objects. As compared to traditional two-dimensional video, the spatial video optionally includes data that defines the position, orientation, and movement of objects within the three-dimensional environment.

In some examples, the first image data includes a plurality of first pixels and the second image data includes a plurality of second pixels, and wherein displaying the spatial image data comprises: In some examples, the plurality of first pixels corresponds to a two-dimensional array of pixels configured to display the first image data. In some examples, the plurality of second pixels corresponds to a two-dimensional array of pixels configured to display the second image data. In some examples, the first electronic device displays the plurality of first pixels and/or the plurality of second pixels as discussed in further detail below. In some examples, the first electronic device applies a pixel matching process to the first image data and the second image data prior to displaying the spatial image. In some examples, the first electronic device determines one or more matching pixels between the plurality of first pixels and the plurality of second pixels. In some examples, the pixel matching process corresponds to machine learning algorithm configured to detect associated pixels between the obtained first image data and the second image data. For example, the obtained first image data and the obtained second image data optionally include a representation of a chair in the three-dimensional environment from the first viewpoint and the second viewpoint, respectively. After capturing the representation of the chair, the plurality of first pixels and the plurality of second pixels optionally include a plurality of pixels associated with the representation of the chair. Using the pixel matching process, the first electronic device optionally identifies the plurality of pixels associated with the representation of the chair from the first plurality of pixels from the first viewpoint and the second plurality of pixels from the second viewpoint. In some examples, the spatial image data includes one or more matched pixels between the plurality of first pixels and the plurality of second pixels. In some examples, first electronic device applies the pixel matching process to the first image data and/or the second image data while the first external camera and/or the second external camera capture the first image data and/or the second image data.

In some examples, the one or more first criteria include a criterion that is satisfied when a stereo disparity between the first image data and the second image data is below a first threshold. In some examples, the stereo disparity corresponds to a difference between in the position of objects in the first image data and the second image data due to different camera (e.g., first external camera, second external camera) viewpoints. This difference optionally creates a parallax effect, which can be used to perceive depth and three-dimensional structure in the spatial image data. In some examples, the stereo disparity corresponds to a difference in the first viewpoint and the second viewpoint discussed above. For example, the first electronic device optionally detects an object in the first image data viewable from a first angle (e.g., first viewpoint) and optionally detects the object in the second image data viewable from a second angle (e.g., second viewpoint). Upon a determination that the first angle and the second angle are below the first threshold, the first electronic device optionally combines the first image data and the second image data to generate the spatial image data. In some examples, in accordance with a determination that the stereo disparity does not satisfy the criterion, the first electronic device displays, via the one or more displays, a non-spatial image based on the first image data and the second image data or the spatial image data. In some examples, the viewpoint of the first image data and viewpoint of the second image data (e.g., the stereo disparity) are larger than the first threshold, and in response, the first electronic device combines the first image data and the second image data in such a way that the depth data (described above) is not included. In some examples, the non-spatial image includes one or more characteristics of the spatial image discussed above. In some examples, the non-spatial image includes one or more characteristics of the two-dimensional image data discussed above. In some examples, the first electronic device determines that the spatial disparity does not satisfy the criterion while the first external camera and/or the second external camera obtain the first image data and/or the second image data. In some examples, the non-spatial image is displayed at the second electronic device.

In some examples, the one or more first criteria include a criterion that is satisfied when a focal length disparity between the first image data and the second image data is below a first threshold. In some examples, the focal length disparity corresponds to a difference in the focal lengths of the cameras used to capture the first image data and the second image data. The focal length of a respective camera lens (e.g., first external camera, second external camera) determines the angle of view and magnification of the image, essentially controlling how "zoomed in" or "zoomed out" the three-dimensional environment appears. When comparing (e.g., pixel matching process) the first image data and the second image data, a disparity in focal length can mean that one photo may have been taken with a wider-angle lens, capturing more of the three-dimensional environment, while the other might have been taken with a longer focal length, focusing on a narrower area and providing more detail on specific elements. This disparity can affect the visual characteristics of the photos, such as the depth of field, the sense of space, and the relative size of objects within the frame. In some examples, the first electronic device detects a first focal length associated with the first external camera, and a second focal length associated with the second external camera and calculates the focal length disparity based on the first focal length and the second focal length. In some examples, the second electronic device calculate the focal length disparity based on the first focal length and the second focal length. In some examples, the first threshold is a predetermined threshold generated by the first electronic device and/or the second electronic device. In some examples, the user of the first electronic device determines the first threshold prior to the first external camera and/or the second external camera obtains the first image data and/or the second image data. In some examples, in accordance with a determination that the focal length disparity does not satisfy the criterion, the first electronic device displays, via the one or more displays, a non-spatial image based on the first image data and the second image data or the spatial image data. In some examples, the first and/or the second electronic device determine that the focal length disparity is above the first threshold, failing to satisfy the criterion, and in response, forgoing displaying the spatial image data (discussed above) and displaying the non-spatial image data. In some examples, the first and/or the second electronic device determines that the criterion is not satisfied while the first external camera and/or the second external camera obtain the first image data and/or the second image data. In some examples, the non-spatial image data includes one or more characteristics of the two-dimensional image data as discussed above. In some examples, in response to the focal length disparity not satisfying the criterion, the first electronic device displays a non-spatial image and/or video based on the first image data, the second image data, or the spatial image data. In some examples, the first electronic device displays the first image data, the second image data, or the spatial image data until the focal length disparity no longer satisfies the criterion. For example, the first external camera and the second external camera optionally capturing the first image data and the second image data at a first time point that has a focal length disparity between them that is below the first threshold. During this time, the first electronic device optionally displays the first and/or the second image data. At a second time, the first external camera and the second external camera capture the first image data and the second image data that has a focal length disparity between them that is above the first threshold. During this time, the first electronic device ceases displaying the first image data and/or the second image data and generates the display of the non-spatial image.

In some examples, the first external camera and the second external camera are included in a second electronic device in communication with the first electronic device. In some examples, the one or more first criteria include a criterion that is satisfied in accordance with a determination that the second electronic device is in a first orientation. In some examples, in accordance with a determination that the second electronic device is in a second orientation, different from the first orientation, the first electronic device displays, via the one or more displays, a visual indication of an orientation of the second electronic device. In some examples, the second electronic device includes one or mor characteristics of the second electronic device discussed above. In some examples, the second electronic device includes one or more sensors configured to detect a position and/or orientation of the second electronic device. For example, the second electronic device optionally includes a plurality of orientation sensors (e.g., accelerometers, gyroscopes, magnetometers, inertial measurement units (IMUs), tilt sensors/inclinometers, optical sensors, electromechanical gyros, fiber optic gyroscopes (FOGs), ring laser gyroscopes (RLGs), and/or MEMS gyroscopes) configured to optionally detect a change in orientation of the second electronic device, such as the user tilting the second electronic device upwards. In some examples, the plurality of orientation sensors discussed above detect a change in orientation of the device. For example, the user of the device optionally alters the second electronic device from facing (e.g., first orientation) directly ahead in the three-dimensional environment to a viewpoint facing to the left (e.g., second orientation). In some examples, the first orientation corresponds to an orientation of the second electronic device within a cartesian coordinate system (e.g., an X-Y-Z coordinate system). For example, the first orientation optionally corresponds to an orientation along an x-axis and a y-axis (e.g., facing forward). In some examples, the first orientation corresponds to a range of acceptable orientation that satisfy the criterion. For example, the first orientation optionally includes a range of orientations from 0 degrees to 89 degrees, relative to a horizon of the three-dimensional environment. In the event that the second electronic device optionally detects an orientation outside the range of orientations (e.g., 90 degrees), the first electronic device optionally displays the visual indication. In some examples, the second electronic device determines that a detected orientation is outside the range of orientations as discussed above, and in response, transmits a command to the first electronic device to display the visual indication. In some examples, the second electronic device records an orientation and transmits orientation data to the first electronic device. In the event that the first electronic device determines that the orientation data corresponds to an orientation outside the range of orientations (discussed above), the first electronic device displays the visual indication at the one or more displays. In some examples, the one or more displays maintain displaying the first image data and/or the second image data while detecting the change in the orientation of the second electronic device to the second orientation. In some examples, the one or more display generation components cease displaying the first image data and/or the second image data in response to detecting the change in the orientation to the second orientation without displaying the visual indication of the orientation. In some examples, the one or more displays cease displaying the first image data and/or the second image data while maintaining the display of the three-dimensional environment in response to detecting the change in the orientation. In some examples, the first electronic device displays the visual indication overlaying at least a portion of the first image data and/or the second image data. In some examples, the visual indication corresponds to a visual warning, indicating an improper orientation to capture the first image data and/or the second image data. In some examples, the visual indication includes text and/or visual prompts to the user of the second electronic device to alter the orientation of the device to an orientation that satisfies the criterion.

In some examples, the first electronic device displays, via the one or more displays, the spatial image data from a first perspective relative to the user of the first electronic device, wherein the first perspective corresponds to the first orientation. In some examples, the first perspective corresponds to an orientation of the second electronic device (e.g., first orientation as discussed above). In some examples, the first external camera and the second external camera capture the first image data and the second image data from an orientation that corresponds to an orientation of the second electronic device. In some examples, the user and the second electronic device share the same orientation (e.g., first orientation). For example, the user optionally faces the second electronic device facing directly outward to the three-dimensional environment in parallel with the face of the user. In some examples, after displaying the spatial image data from the first perspective relative to the user, in accordance with the determination that the second electronic device changes from the first orientation to the second orientation, different from first orientation, the first electronic device modifies the display, via the one or more displays, of the spatial image data to be displayed from the first perspective to a second perspective relative to the user, different than the first perspective. In some examples, the second electronic device detects a user input that results in an alteration of the orientation of the second electronic device from the first orientation to the second orientation. In some examples, the first external camera and/or the second external camera update to the second orientation alongside the second electronic device. In some examples, the second electronic device modifies the display during and/or after the second electronic device changes from the first orientation to the second orientation. In some examples, the first external camera and the second external camera continue to capture the first image data and/or the second image data while the second electronic device changes from the first orientation to the second orientation. For example, the user optionally begins capturing the three-dimensional environment on their left side (e.g., first orientation) and while the cameras are capturing the scene, continuously rotates the phone to the right side of the three-dimensional environment (e.g., second orientation) such that the external cameras optionally capture a panoramic image of the three-dimensional environment. In some examples, the second electronic device modifies the display from the first perspective to the second perspective via an update animation (e.g., dissolve, swipe).

In some examples, in accordance with a determination that the first external camera has ceased capturing the first image data and the second external camera has ceased capturing the second image data, displaying the spatial image data. In some examples, the first and/or the second electronic device determine that the first and/or the second external camera has ceased capturing the first image data and/or the second image data. In some examples, the first/second external camera transmits an indication to the first and/or the second electronic device that the respective electronic device has ceased capturing the respective image data. In some examples, the spatial image data is displayed within a graphic user interface associated with the spatial image data. In some examples, the graphic user interface includes a plurality of controls configured to alter one or more aspects of the spatial image data as discussed in further detail below. In some examples, while displaying the spatial image data at a first time point, receiving first gesture input (e.g., swipe, press, pinch) from the second electronic device. In some examples, the first gesture input corresponds to a user input detected at the second electronic device. In some examples, the first gesture input includes one or more characteristics of touch input as discussed above. In some examples, the second electronic device receives the first gesture input at the display. In some examples, the first gesture input is directed at the graphic user interface discussed above. For example, the graphic user interface optionally displays the plurality of controls configured to alter one or more aspects of the spatial image data and optionally detects the first gesture input directed at a first control configured to alter a time point of the spatial image data as discussed in further detail below In some examples, the first gesture input (optionally directed at a control of the plurality of controls at the graphic user interface) causes the second electronic device to cease displaying the spatial image data. In some examples, the first gesture input shrinks the display size of the spatial image data from encompassing the entire display to a portion of the display at the second electronic device. In some examples, the first gesture input comprises a series of gestures. In some examples, in response to receiving the first gesture input from the second electronic device, updating the display of the spatial image data to correspond to a second time point within the spatial image data, different from the first time point. In some examples, the first gesture input is directed to a control of the graphic user interface associated with controlling a displayed time point (e.g., first time point, second time point) of the spatial image data. For example, the user optionally directs the first gesture input at the control, and in response, the second electronic device optionally begins a playback of the spatial image data (e.g., spatial video) at the first time point. The second electronic device optionally detects the first gesture input again and in response, the second electronic device begins playback of the spatial image data at the second time point.

In some examples, in accordance with a determination that the first external camera has ceased capturing the first image data and the second external camera has ceased capturing the second image data, the first electronic device displays the spatial image data and transmits a command to the second electronic device to display, on a display at the second electronic device, an editing user interface at the display of the second electronic device. In some examples, the second electronic device detects that the first and second external camera have ceased capturing the first image data and the second image data. In some examples, the first electronic transmits the command to the second electronic device in accordance with at least one of the external cameras (e.g., first or second) ceasing capturing their respective image data. In some examples, the editing user interface includes a plurality of controls configured to manipulate various aspects of the spatial image data. For example, the editing user interface optionally includes a control to edit a depth disparity (e.g., designating a particular depth of an object in the spatial image data) of the spatial image data. In some examples, the editing user interface includes one or more selection controls configured to allow the user to select captured images by the first and/or second external camera to manipulate. In some examples, the editing user interface includes controls to designate the spatial image data as monoscopic or stereoscopic as discussed in further detail above. In some examples, the editing user interface includes metadata information associated with the spatial image data (e.g., location tags, local time, file size).

In some examples, while displaying, via the one or more displays, the generated spatial data (e.g., the combination of the first image data and the second image data) at a first level of immersion and in accordance with a detection of a user input, the first electronic device modifies the display of the spatial from the first level of immersion to a second level of immersion, different than the first level of immersion. In some examples, the first level of immersion corresponds to displaying the generated spatial image data partially overlaying at least a portion of the three-dimensional environment relative to the viewpoint of the user of the first electronic device. In some examples, the first level of immersion refers to an amount the generated spatial data overlays the three-dimensional environment. In some examples, the user input corresponds to a user gesture interacting with physical hardware at the first electronic device (e.g., button, switches). In some examples, the magnitude of the user input corresponds to how immersive the second level of immersion is. For example, the first electronic device optionally detects the user input as a single press of a button at the first electronic device for a first range of time (e.g., 1 second, 2 seconds, 3 seconds). This user input optionally results in the generated spatial image data overlaying 10 percent of the three-dimensional environment (e.g., first level of immersion), to the generated spatial image data overlaying 50 percent of the three-dimensional environment (e.g., second level of immersion). If the first electronic device optionally detects the user input as the single press for a second range of time (e.g., 4 seconds, 5 seconds, 6 seconds), this user input optionally results in the generated spatial image data overlaying 10 percent of the three-dimensional environment (e.g., first level of immersion), to the generated spatial image data overlaying 80 percent of the three-dimensional environment (e.g., second level of immersion).

In some examples, while displaying the spatial image at a first location in the three-dimensional environment and in response to detecting, via one or more input devices, a user gesture, the first electronic device displays the spatial image at a second location in the three-dimensional environment, different than the first location. In some examples, the spatial image is displayed in the three-dimensional environment while the first external camera and/or the second external camera are capturing the first image data and/or the second image data. In some examples, the spatial image is displayed overlaying at least a portion of the three-dimensional environment. In some examples, the first location is a predetermined location. In some examples, the first location is determined by a user input as discussed in further detail below. In some examples, the one or more input devices correspond to one or more other physical user-interface devices, such as a touch-sensitive surface, a physical keyboard, a mouse, a joystick, a hand tracking device, an eye tracking device, a stylus, etc. In some examples, the one or more input devices correspond to non-physical methods of input capture such as motion detection, LIDAR, one or more cameras, and/or the like. In some examples, the user gesture (e.g., including single input element gestures, multi-element input gestures, etc.), include one or more tap gestures, swipe gestures, slide gestures, and/or the like. In some examples, spatial image is moved from the first location to the second location in a manner that mirrors the user gesture. For example, the user gesture optionally corresponds to a swiping motion from the left side of the user's viewpoint to the right side of the user viewpoint. In response, the first electronic device optionally displays the spatial image as continuously moving across the viewpoint (left to right) of the user in a swiping animation similar to the user gesture. In some examples, in response to detecting the user gesture, the first electronic device ceases displaying the spatial image at the first location and redisplays the spatial image at the second location according to the user gesture. For example, the user gesture optionally corresponds to a pinch gesture at the first location and a drag gesture to the second location, and in response, the second electronic device ceases displaying the spatial image data at the first location and redisplays the spatial image data at the second location corresponding to the direction of the pinch and drag gesture. In some examples, the first electronic device displays the spatial image as moving from the first location to the second location with a continuous movement animation in the direction of the user gesture (e.g., user gesture comprising a pinch and drag motion from left to right).

In some examples, the first external camera and the second external camera are included in a second electronic device (e.g., secondary electronic device, second electronic device discussed above) in communication with the first electronic device, wherein the second electronic device includes a display (e.g., display discussed above with reference to the second electronic device). In some examples, while displaying (e.g., display discussed above with reference to the second electronic device) the spatial image, the first electronic device transmits to the second electronic device, a command to apply a tint to an image (e.g., first image data, second image data, spatial image data) displayed on the display of the second electronic device. In some examples, the first electronic device transmits the command via a wired and/or a wireless connection. In some examples, the first electronic device transmits the command in response to a user input (e.g., input to begin capturing the first image data and/or the second image data. In some examples, the tint corresponds to a slight coloration or hue applied over a portion or subsection of the image, optionally altering its overall color balance. In some examples, the command includes an opacity level associated with the tint. For example, the command optionally includes instructions to lower the opacity of the image by 20 percent. In some examples, the command applies the tint to only a portion of the image. For example, in response to receiving the command, the second electronic device applies the tint as a ring surrounding an outer portion of the image. In some examples, the image corresponds to a static image and/or a video of the three-dimensional environment. In some examples, the command applies the tint to the entirety of the image. In some examples, the command to apply the tint corresponds to darkening at least a portion of the image. In some examples, the image corresponds to the graphic user interface discussed above with reference to updating the display of the spatial image data from the first time point to the second time point. In some examples, the image corresponds to a monoscopic image of the three-dimensional environment. In some examples, the image corresponds to the two-dimensional image data discussed above with reference to displaying two-dimensional image data at the second electronic device while the first external camera is capturing first image data and the second external camera is capturing second image data.

Some examples of the disclosure are directed to a method comprising, at a first electronic device in communication with one or more displays and in communication with a first external camera with a first viewpoint and a second external camera with a second viewpoint, different than the first viewpoint: while the first external camera is capturing first image data and the second external camera is capturing second image data, obtaining at least a portion of the first image data from the first external camera, obtaining at least a portion of the second image data from the second external camera, or obtaining spatial image data generated based on the first image data and the second image data; and in accordance with a determination that one or more first criteria are satisfied, displaying, via the one or more displays, a spatial image based on the at least the portion of the first image data and the at least the portion of the second image data or the spatial image data in a three-dimensional environment.

Additionally or alternatively, in some examples, the first external camera and the second external camera are included in a second electronic device in communication with the first electronic device. Additionally or alternatively, in some examples, the second electronic device generates the spatial image data based on the first image data and the second image data, and communicates the spatial image data to the first electronic device. Additionally or alternatively, in some examples, the first electronic device obtains the at least the portion of the first image data and the at least the portion of the second image data from the second electronic device, and the first electronic device generates the spatial image data based on the at least the portion of the first image data and the at least the portion of the second image data. Additionally or alternatively, in some examples, the second electronic device includes a display, different from the one or more displays, configurable to display two-dimensional image data while the first external camera is capturing first image data and the second external camera is capturing second image data. Additionally or alternatively, in some examples, while displaying, via the one or more displays of the first electronic device, the spatial image data in the three-dimensional environment, the two-dimensional image data has an appearance different than the first image data or the second image data. Additionally or alternatively, in some examples, while displaying, via the one or more displays of the first electronic device, the spatial image in the three-dimensional environment, the two-dimensional image data includes a monoscopic representation of the first image data or the second image data, or a stereoscopic representation of the first image data and the second image data. Additionally or alternatively, in some examples, the one or more first criteria include a criterion that is satisfied when the first electronic device receives an indication from an external electronic device to display the spatial image generated based on the first image data and the second image data in the three-dimensional environment. Additionally or alternatively, in some examples, the spatial image data includes visual depth information.

Additionally or alternatively, in some examples, the first image data and the second image data correspond to video data, and wherein the spatial image data corresponds to a spatial video. Additionally or alternatively, in some examples, the first image data includes a plurality of first pixels and the second image data includes a plurality of second pixels, and wherein displaying the spatial image comprises applying a pixel matching process to the first image data and the second image data prior to displaying the spatial image. Additionally or alternatively, in some examples, the one or more first criteria include a criterion that is satisfied when a stereo disparity between the first image data and the second image data is below a first threshold, and wherein the method further comprises in accordance with a determination that the stereo disparity is not below the first threshold, displaying, via the one or more displays, a non-spatial image based on the at least the portion of the first image data and the at least the portion of the second image data or the spatial image data. Additionally or alternatively, in some examples, the one or more first criteria include a criterion that is satisfied when a focal length disparity between the first image data and the second image data is below a first threshold, and wherein the method further comprises in accordance with a determination that the focal length disparity is not below the first threshold, displaying, via the one or more displays, a non-spatial image based on the at least the portion of the first image data and the at least the portion of the second image data or the spatial image data. Additionally or alternatively, in some examples, the first external camera and the second external camera are included in a second electronic device in communication with the first electronic device, and wherein the one or more first criteria include a criterion that is satisfied in accordance with a determination that the second electronic device is in a first orientation, and wherein the method further comprises in accordance with a determination that the second electronic device is in a second orientation, different from the first orientation, displaying, via the one or more displays, a visual indication of the second orientation of the second electronic device. Additionally or alternatively, in some examples, the method further comprises: displaying, via the one or more displays, the spatial image from a first perspective relative to a user of the first electronic device, wherein the first perspective corresponds to the first orientation; and after displaying the spatial image data from the first perspective relative to the user, in accordance with the determination that the second electronic device changes from the first orientation to the second orientation, different from first orientation, modifying the display of the spatial image to be displayed from the first perspective to a second perspective relative to the user, different than the first perspective.

Additionally or alternatively, in some examples, the method further comprises: in accordance with a determination that the first external camera has ceased capturing the first image data and the second external camera has ceased capturing the second image data, displaying, via the one or more displays, a representation of the spatial image; while displaying the representation of the spatial image at a first time point, receiving first gesture input from the second electronic device; and in response to receiving the first gesture input from the second electronic device, updating the display of the representation of the spatial image to correspond to a second time point within the spatial image, different from the first time point. Additionally or alternatively, in some examples, the method further comprises in accordance with a determination that the first external camera has ceased capturing the first image data and the second external camera has ceased capturing the second image data, displaying, via the one or more displays, a representation of the spatial image and transmitting a command to the second electronic device to display, on a display at the second electronic device, an editing user interface. Additionally or alternatively, in some examples, the spatial image is displayed at a first level of immersion, the method further comprising while displaying the spatial image at the first level of immersion: in accordance with a detection of a user input, modifying display of the spatial image from the first level of immersion to a second level of immersion, different than the first level of immersion. Additionally or alternatively, in some examples, the method further comprises, while displaying the spatial image at a first location in the three-dimensional environment, in response to detecting, via one or more input devices, a user gesture, displaying the spatial image at a second location in the three-dimensional environment, different than the first location. Additionally or alternatively, in some examples, the first external camera and the second external camera are included in a second electronic device in communication with the first electronic device, wherein the second electronic device includes a display, and wherein the method further comprises while displaying the spatial image, transmitting to the second electronic device, a command to apply a tint to an image displayed on the display of the second electronic device.

Some examples of the disclosure are directed to a method comprising, at an electronic device in communication with one or more displays, one or more input devices, a first external camera with a first viewpoint, and an image capture device having a second external camera with a second viewpoint, different from the first viewpoint, and a third external camera with a third viewpoint, different from the first viewpoint and the second viewpoint: while the first external camera is capturing first image data, the second external camera is capturing second image data, and the third external camera is capturing third image data, obtaining at least a portion of the first image data from the first external camera, obtaining at least a portion of the second image data from the second external camera, and obtaining at least a portion of the third image data from the third external camera; displaying, via the one or more displays, a spatial image based on the at least the portion of the first image data, the at least the portion of the second image data and the at least the portion of the third image data in a three-dimensional environment; while displaying the spatial image in the three-dimensional environment, detecting, via the one or more input devices or via the first external camera, the image capture device in a field of view of the first external camera in the three-dimensional environment; and in response to detecting the image capture device in the field of view of the first external camera, in accordance with a determination that one or more criteria are satisfied, ceasing display, via the one or more displays, of the spatial image in the three-dimensional environment.

Additionally or alternatively, in some examples, the one or more criteria include a criterion that is satisfied when a physical viewfinder of the image capture device is detected in the field of view of the first external camera in the three-dimensional environment. Additionally or alternatively, in some examples, the one or more criteria include a criterion that is satisfied when a physical display of the image capture device is detected in the field of view of the first external camera in the three-dimensional environment. Additionally or alternatively, in some examples, the one or more criteria include a criterion that is satisfied when the image capture device is within a threshold distance of the first viewpoint of the first external camera in the field of view of the first external camera in the three-dimensional environment. Additionally or alternatively, in some examples, the image capture device includes a physical display that is configured to display a representation of the spatial image, the method further comprising, while the first external camera is capturing first image data, the second external camera is capturing the second image data, and the third external camera is capturing the third image data and after displaying the spatial image based on the at least the portion of the first image data, the at least the portion of the second image data, and the at least the portion of the third image data in the three-dimensional environment, transmitting, to the image capture device, one or more instructions that cause the image capture device to cease operation of the physical display, such that the physical display is not displaying the representation of the spatial image. Additionally or alternatively, in some examples, the method further comprises: while displaying the spatial image in the three-dimensional environment, detecting, via the one or more input devices or via the first external camera, an indication of movement of the image capture device that causes the second viewpoint of the second external camera to be an updated second viewpoint and the third viewpoint of the third external camera to be an updated third viewpoint; and in response to detecting the indication of the movement of the image capture device, obtaining at least a portion of updated second image data from the second external camera that is captured relative to the updated second viewpoint and obtaining at least a portion of updated third image data from the third external camera that is captured relative to the updated third viewpoint, and updating display, via the one or more displays, of the spatial image based on the at least the portion of the first image data, the at least the portion of the updated second image data, and the at least the portion of the updated third image data in the three-dimensional environment.

Additionally or alternatively, in some examples, the method further comprises: while displaying the spatial image in the three-dimensional environment, receiving an indication of a request to save the spatial image; and after receiving the indication, receiving, from the image capture device, data corresponding to a representation of the spatial image. Additionally or alternatively, in some examples, the request to save the spatial image includes user input selecting a capture button of the image capture device. Additionally or alternatively, in some examples, the receiving the request to save the spatial image includes detecting, via the one or more input devices, a selection of a button that is selectable to cause the image capture device to generate the representation of the spatial image. Additionally or alternatively, in some examples, the button corresponds to a selectable option that is displayed with the spatial image in the three-dimensional environment. Additionally or alternatively, in some examples, the method further comprises in response to receiving the data corresponding to the representation of the spatial image, displaying, via the one or more displays, the representation of the spatial image in the three-dimensional environment. Additionally or alternatively, in some examples, displaying the representation of the spatial image in the three-dimensional environment includes reducing a visual prominence of portions of the three-dimensional environment surrounding the representation of the spatial image from the first viewpoint of the first external camera. Additionally or alternatively, in some examples, the method further comprises: while displaying the spatial image in the three-dimensional environment, detecting, via the one or more input devices, gaze of a user of the electronic device directed to a first location in the spatial image in the three-dimensional environment; and in response to detecting the gaze of the user directed to the first location in the spatial image, transmitting, to the image capture device, one or more instructions that cause the image capture device to adjust a focus of a lens of the second external camera and/or of the third external camera based on the first location in the spatial image.

Additionally or alternatively, in some examples, the spatial image is a first spatial image, and the electronic device is further in communication with a second image capture device that includes a fourth external camera having a fourth viewpoint, different from the second viewpoint and the third viewpoint, and a fifth external camera having a fifth viewpoint, different from the second viewpoint, the third viewpoint, and the fourth viewpoint, the method further comprising, while the first external camera is capturing the first image data, the second external camera is capturing the second image data, the third external camera is capturing the third image data, the fourth external camera is capturing fourth image data, and the fifth external camera is capturing fifth image data: obtaining at least a portion of the fourth image data from the fourth external camera, and obtaining at least a portion of the fifth image data from the fifth external camera; and displaying, via the one or more displays, a second spatial image based on the at least the portion of the first image data, the at least the portion of the fourth image data, and the at least the portion of the fifth image data in the three-dimensional environment concurrently with the first spatial image.

Some examples of the disclosure are directed to an electronic device comprising: one or more processors; memory; and one or more programs stored in the memory and configured to be executed by the one or more processors, the one or more programs including instructions for performing any of the above methods.

Some examples of the disclosure are directed to a non-transitory computer readable storage medium storing one or more programs, the one or more programs comprising instructions, which when executed by one or more processors of an electronic device, cause the electronic device to perform any of the above methods.

Some examples of the disclosure are directed to an electronic device comprising one or more processors, memory, and means for performing any of the above methods.

Some examples of the disclosure are directed to an information processing apparatus for use in an electronic device, the information processing apparatus comprising means for performing any of the above methods.

The foregoing description, for purpose of explanation, has been described with reference to specific examples. However, the illustrative discussions above are not intended to be exhaustive or to limit the disclosure to the precise forms disclosed. Many modifications and variations are possible in view of the above teachings. The examples were chosen and described in order to best explain the principles of the disclosure and its practical applications, to thereby enable others skilled in the art to best use the disclosure and various described examples with various modifications as are suited to the particular use contemplated.

What is claimed is:

1. A method comprising:

at an electronic device in communication with one or more displays, one or more input devices, a first external camera with a first viewpoint, and an image capture device having a second external camera with a second viewpoint, different from the first viewpoint, and a third external camera with a third viewpoint, different from the first viewpoint and the second viewpoint:

while the first external camera is capturing first image data, the second external camera is capturing second image data, and the third external camera is capturing third image data, obtaining at least a portion of the first image data from the first external camera, obtaining at least a portion of the second image data from the second external camera, and obtaining at least a portion of the third image data from the third external camera;

displaying, via the one or more displays, a spatial image based on the at least the portion of the first image data, the at least the portion of the second image data and the at least the portion of the third image data in a three-dimensional environment;

while displaying the spatial image in the three-dimensional environment, detecting, via the one or more input devices or via the first external camera, the image capture device in a field of view of the first external camera in the three-dimensional environment; and in response to detecting the image capture device in the field of view of the first external camera:

in accordance with a determination that one or more criteria are satisfied, ceasing display, via the one or more displays, of the spatial image in the three-dimensional environment.

2. The method of claim 1, wherein the one or more criteria include a criterion that is satisfied when:

a physical viewfinder of the image capture device is detected in the field of view of the first external camera in the three-dimensional environment;

a physical display of the image capture device is detected in the field of view of the first external camera in the three-dimensional environment; or the image capture device is within a threshold distance of the first viewpoint of the first external camera in the field of view of the first external camera in the three-dimensional environment.

3. The method of claim 1, wherein, the image capture device includes a physical display that is configured to display a representation of the spatial image, the method further comprising:

while the first external camera is capturing first image data, the second external camera is capturing the second image data, and the third external camera is capturing the third image data and after displaying the spatial image based on the at least the portion of the first image data, the at least the portion of the second image data, and the at least the portion of the third image data in the three-dimensional environment, transmitting, to the image capture device, one or more instructions that cause the image capture device to cease operation of the physical display, such that the physical display is not displaying the representation of the spatial image.

4. The method of claim 1, further comprising:

while displaying the spatial image in the three-dimensional environment, detecting, via the one or more input devices or via the first external camera, an indication of movement of the image capture device that causes the second viewpoint of the second external camera to be an updated second viewpoint and the third viewpoint of the third external camera to be an updated third viewpoint; and in response to detecting the indication of the movement of the image capture device:

obtaining at least a portion of updated second image data from the second external camera that is captured relative to the updated second viewpoint and obtaining at least a portion of updated third image data from the third external camera that is captured relative to the updated third viewpoint; and updating display, via the one or more displays, of the spatial image based on the at least the portion of the first image data, the at least the portion of the updated second image data, and the at least the portion of the updated third image data in the three-dimensional environment.

5. The method of claim 1, further comprising:

while displaying the spatial image in the three-dimensional environment, receiving an indication of a request to save the spatial image; and after receiving the indication, receiving, from the image capture device, data corresponding to a representation of the spatial image.

6. The method of claim 5, further comprising:

in response to receiving the data corresponding to the representation of the spatial image, displaying, via the one or more displays, the representation of the spatial image in the three-dimensional environment.

7. The method of claim 1, further comprising:

while displaying the spatial image in the three-dimensional environment, detecting, via the one or more input devices, gaze of a user of the electronic device directed to a first location in the spatial image in the three-dimensional environment; and in response to detecting the gaze of the user directed to the first location in the spatial image, transmitting, to the image capture device, one or more instructions that cause the image capture device to adjust a focus of a lens of the second external camera and/or of the third external camera based on the first location in the spatial image.

8. The method of claim 1, wherein the spatial image is a first spatial image, and the electronic device is further in communication with a second image capture device that includes a fourth external camera having a fourth viewpoint, different from the second viewpoint and the third viewpoint, and a fifth external camera having a fifth viewpoint, different from the second viewpoint, the third viewpoint, and the fourth viewpoint, the method further comprising:

while the first external camera is capturing the first image data, the second external camera is capturing the second image data, the third external camera is capturing the third image data, the fourth external camera is capturing fourth image data, and the fifth external camera is capturing fifth image data:

obtaining at least a portion of the fourth image data from the fourth external camera, and obtaining at least a portion of the fifth image data from the fifth external camera; and displaying, via the one or more displays, a second spatial image based on the at least the portion of the first image data, the at least the portion of the fourth image data, and the at least the portion of the fifth image data in the three-dimensional environment concurrently with the first spatial image.

9. An electronic device comprising:

one or more processors;

memory; and one or more programs stored in the memory and configured to be executed by the one or more processors, the one or more programs including instructions for performing a method comprising:

while a first external camera having a first viewpoint is capturing first image data and while an image capture device having a second external camera with a second viewpoint, different from the first viewpoint, and a third external camera with a third viewpoint, different from the first viewpoint and the second viewpoint, is capturing second image data using the second external camera and third image data using the third external camera:

obtaining at least a portion of the first image data from the first external camera, obtaining at least a portion of the second image data from the second external camera, and obtaining at least a portion of the third image data from the third external camera;

displaying, via one or more displays, a spatial image based on the at least the portion of the first image data, the at least the portion of the second image data and the at least the portion of the third image data in a three-dimensional environment;

while displaying the spatial image in the three-dimensional environment, detecting, via one or more input devices or via the first external camera, the image capture device in a field of view of the first external camera in the three-dimensional environment; and in response to detecting the image capture device in the field of view of the first external camera:

in accordance with a determination that one or more criteria are satisfied, ceasing display, via the one or more displays, of the spatial image in the three-dimensional environment.

10. The electronic device of claim 9, wherein the one or more criteria include a criterion that is satisfied when:

a physical viewfinder of the image capture device is detected in the field of view of the first external camera in the three-dimensional environment;

a physical display of the image capture device is detected in the field of view of the first external camera in the three-dimensional environment; or the image capture device is within a threshold distance of the first viewpoint of the first external camera in the field of view of the first external camera in the three-dimensional environment.

11. The electronic device of claim 9, wherein, the image capture device includes a physical display that is configured to display a representation of the spatial image, the method further comprising:

while the first external camera is capturing first image data, the second external camera is capturing the second image data, and the third external camera is capturing the third image data and after displaying the spatial image based on the at least the portion of the first image data, the at least the portion of the second image data, and the at least the portion of the third image data in the three-dimensional environment, transmitting, to the image capture device, one or more instructions that cause the image capture device to cease operation of the physical display, such that the physical display is not displaying the representation of the spatial image.

12. The electronic device of claim 9, wherein the method further comprises:

while displaying the spatial image in the three-dimensional environment, detecting, via the one or more input devices or via the first external camera, an indication of movement of the image capture device that causes the second viewpoint of the second external camera to be an updated second viewpoint and the third viewpoint of the third external camera to be an updated third viewpoint; and in response to detecting the indication of the movement of the image capture device:

obtaining at least a portion of updated second image data from the second external camera that is captured relative to the updated second viewpoint and obtaining at least a portion of updated third image data from the third external camera that is captured relative to the updated third viewpoint; and updating display, via the one or more displays, of the spatial image based on the at least the portion of the first image data, the at least the portion of the updated second image data, and the at least the portion of the updated third image data in the three-dimensional environment.

13. The electronic device of claim 9, wherein the method further comprises:

while displaying the spatial image in the three-dimensional environment, receiving an indication of a request to save the spatial image; and after receiving the indication, receiving, from the image capture device, data corresponding to a representation of the spatial image.

14. The electronic device of claim 13, wherein the method further comprises:

in response to receiving the data corresponding to the representation of the spatial image, displaying, via the one or more displays, the representation of the spatial image in the three-dimensional environment.

15. The electronic device of claim 9, wherein the method further comprises:

while displaying the spatial image in the three-dimensional environment, detecting, via the one or more input devices, gaze of a user of the electronic device directed to a first location in the spatial image in the three-dimensional environment; and in response to detecting the gaze of the user directed to the first location in the spatial image, transmitting, to the image capture device, one or more instructions that cause the image capture device to adjust a focus of a lens of the second external camera and/or of the third external camera based on the first location in the spatial image.

16. The electronic device of claim 9, wherein the spatial image is a first spatial image, and the electronic device is further in communication with a second image capture device that includes a fourth external camera having a fourth viewpoint, different from the second viewpoint and the third viewpoint, and a fifth external camera having a fifth viewpoint, different from the second viewpoint, the third viewpoint, and the fourth viewpoint, the method further comprising:

while the first external camera is capturing the first image data, the second external camera is capturing the second image data, the third external camera is capturing the third image data, the fourth external camera is capturing fourth image data, and the fifth external camera is capturing fifth image data:

obtaining at least a portion of the fourth image data from the fourth external camera, and obtaining at least a portion of the fifth image data from the fifth external camera; and displaying, via the one or more displays, a second spatial image based on the at least the portion of the first image data, the at least the portion of the fourth image data, and the at least the portion of the fifth image data in the three-dimensional environment concurrently with the first spatial image.

17. A non-transitory computer readable storage medium storing one or more programs, the one or more programs comprising instructions, which when executed by one or more processors of an electronic device, cause the electronic device to perform a method comprising:

while a first external camera having a first viewpoint is capturing first image data and while an image capture device having a second external camera with a second viewpoint, different from the first viewpoint, and a third external camera with a third viewpoint, different from the first viewpoint and the second viewpoint, is capturing second image data using the second external camera and third image data using the third external camera:

obtaining at least a portion of the first image data from the first external camera, obtaining at least a portion of the second image data from the second external camera, and obtaining at least a portion of the third image data from the third external camera;

displaying, via one or more displays, a spatial image based on the at least the portion of the first image data, the at least the portion of the second image data and the at least the portion of the third image data in a three-dimensional environment;

while displaying the spatial image in the three-dimensional environment, detecting, via one or more input devices or via the first external camera, the image capture device in a field of view of the first external camera in the three-dimensional environment; and in response to detecting the image capture device in the field of view of the first external camera:

in accordance with a determination that one or more criteria are satisfied, ceasing display, via the one or more displays, of the spatial image in the three-dimensional environment.

18. The non-transitory computer readable storage medium of claim 17, wherein the one or more criteria include a criterion that is satisfied when:

a physical viewfinder of the image capture device is detected in the field of view of the first external camera in the three-dimensional environment;

a physical display of the image capture device is detected in the field of view of the first external camera in the three-dimensional environment; or the image capture device is within a threshold distance of the first viewpoint of the first external camera in the field of view of the first external camera in the three-dimensional environment.

19. The non-transitory computer readable storage medium of claim 17, wherein, the image capture device includes a physical display that is configured to display a representation of the spatial image, the method further comprising:

while the first external camera is capturing first image data, the second external camera is capturing the second image data, and the third external camera is capturing the third image data and after displaying the spatial image based on the at least the portion of the first image data, the at least the portion of the second image data, and the at least the portion of the third image data in the three-dimensional environment, transmitting, to the image capture device, one or more instructions that cause the image capture device to cease operation of the physical display, such that the physical display is not displaying the representation of the spatial image.

20. The non-transitory computer readable storage medium of claim 17, wherein the method further comprises:

while displaying the spatial image in the three-dimensional environment, detecting, via the one or more input devices or via the first external camera, an indication of movement of the image capture device that causes the second viewpoint of the second external camera to be an updated second viewpoint and the third viewpoint of the third external camera to be an updated third viewpoint; and in response to detecting the indication of the movement of the image capture device:

obtaining at least a portion of updated second image data from the second external camera that is captured relative to the updated second viewpoint and obtaining at least a portion of updated third image data from the third external camera that is captured relative to the updated third viewpoint; and updating display, via the one or more displays, of the spatial image based on the at least the portion of the first image data, the at least the portion of the updated second image data, and the at least the portion of the updated third image data in the three-dimensional environment.

21. The non-transitory computer readable storage medium of claim 17, wherein the method further comprises:

while displaying the spatial image in the three-dimensional environment, receiving an indication of a request to save the spatial image; and after receiving the indication, receiving, from the image capture device, data corresponding to a representation of the spatial image.

22. The non-transitory computer readable storage medium of claim 21, wherein the method further comprises:

in response to receiving the data corresponding to the representation of the spatial image, displaying, via the one or more displays, the representation of the spatial image in the three-dimensional environment.

23. The non-transitory computer readable storage medium of claim 17, wherein the method further comprises:

while displaying the spatial image in the three-dimensional environment, detecting, via the one or more input devices, gaze of a user of the electronic device directed to a first location in the spatial image in the three-dimensional environment; and in response to detecting the gaze of the user directed to the first location in the spatial image, transmitting, to the image capture device, one or more instructions that cause the image capture device to adjust a focus of a lens of the second external camera and/or of the third external camera based on the first location in the spatial image.

24. The non-transitory computer readable storage medium of claim 17, wherein the spatial image is a first spatial image, and the electronic device is further in communication with a second image capture device that includes a fourth external camera having a fourth viewpoint, different from the second viewpoint and the third viewpoint, and a fifth external camera having a fifth viewpoint, different from the second viewpoint, the third viewpoint, and the fourth viewpoint, the method further comprising:

while the first external camera is capturing the first image data, the second external camera is capturing the second image data, the third external camera is capturing the third image data, the fourth external camera is capturing fourth image data, and the fifth external camera is capturing fifth image data:

obtaining at least a portion of the fourth image data from the fourth external camera, and obtaining at least a portion of the fifth image data from the fifth external camera; and displaying, via the one or more displays, a second spatial image based on the at least the portion of the first image data, the at least the portion of the fourth image data, and the at least the portion of the fifth image data in the three-dimensional environment concurrently with the first spatial image.

* * * * *